United States Patent
Kawanai

(10) Patent No.: US 11,634,132 B2
(45) Date of Patent: Apr. 25, 2023

(54) VEHICLE DECELERATION CONTROL SYSTEM

(71) Applicant: TOYOTA JIDOSHA KABUSHIKI KAISHA, Toyota (JP)

(72) Inventor: Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 399 days.

(21) Appl. No.: 16/996,442

(22) Filed: Aug. 18, 2020

(65) Prior Publication Data

US 2021/0061272 A1   Mar. 4, 2021

(30) Foreign Application Priority Data

Aug. 29, 2019   (JP) .............................. JP2019-157004

(51) Int. Cl.
*B60W 30/09*   (2012.01)
*B60W 30/14*   (2006.01)
(Continued)

(52) U.S. Cl.
CPC .......... *B60W 30/146* (2013.01); *B60W 30/09* (2013.01); *B60W 30/18163* (2013.01); *B60W 50/085* (2013.01); *B60W 30/08* (2013.01)

(58) Field of Classification Search
CPC ......... B60W 30/146; B60W 30/18163; B60W 50/085; B60W 30/16; B60W 2554/4042;
(Continued)

(56) References Cited

U.S. PATENT DOCUMENTS

| 6,401,024 B1 | 6/2002 | Tange et al. |
| 2009/0012703 A1 | 1/2009 | Aso et al. |

(Continued)

FOREIGN PATENT DOCUMENTS

| JP | 2017-194827 A | 10/2017 |
| JP | 2019-096235 A | 6/2019 |
| WO | 2007/102405 A1 | 9/2007 |

OTHER PUBLICATIONS

Notice of Allowance dated Jun. 24, 2022, issued in U.S. Appl. No. 17/005,998.
(Continued)

*Primary Examiner* — Donald J Wallace
*Assistant Examiner* — Daniel M. Robert
(74) *Attorney, Agent, or Firm* — Sughrue Mion, PLLC

(57) ABSTRACT

In deceleration set processing, first-class and second-class deceleration are specified. The first-class deceleration is deceleration of the vehicle corresponding to a first-class state. The first-class state is a state of a slowdown target of the vehicle. The second-class deceleration is deceleration of a following moving body corresponding to a second-class state. The second-class state is a state of the vehicle as viewed from the following moving body. If a minimum value of the first-class deceleration (a first-class minimum value) is equal to or greater than a minimum value of the second-class deceleration (a second-class minimum value), target deceleration is set to the first-class minimum value. Otherwise, based on a second-class minimum value phase, the target deceleration is set to deceleration equal to or greater than the second-class minimum value. The second-class minimum value phase is a phase to which the second-class minimum value belongs in a second deceleration feature.

14 Claims, 27 Drawing Sheets

(51) Int. Cl.
*B60W 50/08* (2020.01)
*B60W 30/18* (2012.01)
*B60W 30/08* (2012.01)

(58) Field of Classification Search
CPC ..... B60W 2554/802; B60W 2554/804; B60W 2720/106; B60W 30/095; B60W 60/0015; B60W 2520/10; B60W 2552/50; B60W 30/09; B60W 30/08; B60W 10/18; B60W 30/18109; G08G 1/19
See application file for complete search history.

(56) References Cited

U.S. PATENT DOCUMENTS

| | | | | |
|---|---|---|---|---|
| 2010/0228419 | A1* | 9/2010 | Lee | B62D 15/0255 |
| | | | | 701/25 |
| 2015/0134223 | A1* | 5/2015 | Kim | B60W 30/14 |
| | | | | 701/93 |
| 2015/0232090 | A1* | 8/2015 | Jeon | B60W 50/14 |
| | | | | 701/1 |
| 2016/0207530 | A1* | 7/2016 | Stanek | B60W 10/184 |
| 2017/0129488 | A1 | 5/2017 | Noumura | |
| 2017/0308093 | A1 | 10/2017 | Urano et al. | |
| 2017/0327094 | A1 | 11/2017 | Inoue et al. | |
| 2019/0031189 | A1* | 1/2019 | Patana | B60W 10/20 |
| 2019/0031190 | A1* | 1/2019 | Choi | B60W 10/04 |
| 2019/0071084 | A1* | 3/2019 | Tuncali | B60W 30/165 |
| 2019/0232962 | A1* | 8/2019 | Broll | G08G 1/162 |
| 2019/0308617 | A1* | 10/2019 | Groult | B60Q 1/50 |
| 2019/0315343 | A1* | 10/2019 | Steffey | B60W 50/0097 |
| 2020/0324748 | A1* | 10/2020 | Hiraga | B60T 7/22 |
| 2021/0061309 | A1 | 3/2021 | Kawanai | |
| 2021/0232157 | A1 | 7/2021 | Dieckmann et al. | |

OTHER PUBLICATIONS

U.S. Appl. No. 17/005,998, filed Aug. 28, 2020.
Non Final Office Action dated Apr. 15, 2022, issued in U.S. Appl. No. 17/005,998.

* cited by examiner

Case 1: $-a_{M3\_min} = -a(d_{Bi}, v_{Bj})$

Case 2: $-a_{M3\_min}$
$= \min\{-a(d_{Bi-1}, v_{Bj-1}), -a(d_{Bi-1}, v_{Bj}), -a(d_{Bi}, v_{Bj-1}), -a(d_{Bi}, v_{Bj}), -a(d_{Bi}, v_{Bj+1}), -a(d_{Bi+1}, v_{Bj-1}), -a(d_{Bi+1}, v_{Bj})\}$

VEHICLE DECELERATION CONTROL SYSTEM

CROSS-REFERENCE TO RELATED APPLICATION

The present application claims priority under 35 U.S.C. § 119 to Japanese Patent Application No. 2019-157004, filed Aug. 29, 2019. The contents of this application are incorporated herein by reference in their entirety.

TECHNICAL FIELD

The present disclosure relates to a control system of a vehicle.

BACKGROUND

JP2017-194827A disclose a system in which automated driving control of a vehicle is executed. The system generates a path of the vehicle based on various types of information. The path of the vehicle is a driving trajectory that defines a collection of target positions at which the vehicle should arrive in the future. Each target position has information on driving state of the vehicle. The driving state includes, for example, velocity and steering angle of the vehicle. In the automated driving control, actuators of the vehicle are controlled such that the driving state is implemented in each of the target positions.

Suppose the system detects an obstacle on the driving trajectory. Then the system determines a risk to collide to the obstacle. And if it is determined that the risk is high, the system changes the information on the driving state. At least one of a brake actuator and a steering actuator is operated in accordance with the change of the information on the driving state. However, a series of the operation is executed after the system detects the presence of the obstacle based on the various types of the information. That is, the series of the operation is not executed prior to the presence of the obstacle being detected by the system.

However, even prior to the detection of the presence of the obstacle, it is desirable to execute some kind of vehicle control in consideration of driving safety aspect if the presence is suspected. This is because, in a case of manual driving, a driver who has found an object that appears to be obstacle in a travel direction of the vehicle manipulates the vehicle in consideration of a possibility that this object is the obstacle. However, if the system is forced to execute such vehicle control, driving efficiency of the system may be lowered.

The problem described above also applies to the slowdown of the vehicle under a situation where a following moving body such as a following vehicle exists. Ignoring the presence of the following moving body and starting the slowdown of the vehicle, there is an increased risk of a rear-end collision from the following moving body during the slowdown. Therefore, even prior to detecting the presence of the following moving body, it is desirable to modify driving plan and execute vehicle control if the presence is suspect. However, excessive attention to the following moving body may lead to a decrease in the driving efficiency.

One object of the present disclosure is to provide a system capable of executing automated driving control that makes driving safety and driving efficiency compatible even if information on a state of an object or that of a following moving body for which a change in a driving state of a vehicle is to be considered is uncertain.

A first aspect is a vehicle control system which is configured to execute automated driving control of a vehicle.

The vehicle control system comprises an acquiring device and a controller.

The acquiring device is configured to acquire driving environment information of the vehicle.

The controller is configured to execute the automated driving control based on the driving environment information.

In the automated driving control, the controller is configured to execute deceleration setting processing in which a target deceleration is set based on first and second deceleration features.

The first deceleration feature defines a relationship between a first-class state indicating a state of a slowdown target of the vehicle and deceleration of the vehicle. The first-class state is divided into multiple phases by a first-class boundary.

The second deceleration feature defines a relationship between a second-class state indicating a state of the vehicle as viewed from a following moving body and deceleration of the following moving body. The second-class state is divided into multiple phases by a second-class boundary.

In the deceleration set processing, the controller is configured to:

specify, based on the driving environment information and the first deceleration feature, at least one first-class deceleration indicating deceleration of the vehicle corresponding to the first-class state;

specify a first-class minimum value indicating a minimum value of the at least one first-class deceleration;

specify, based on the driving environment information and the second deceleration feature, at least one second-class deceleration indicating deceleration of the following moving body corresponding to the second-class state;

specify a second-class minimum value indicating a minimum value of the at least one second-class deceleration;

compare the first-class minimum value and the second-class minimum value;

if the first-class minimum value is equal to or greater than the second-class minimum value, set the target deceleration to the first-class minimum value; and if the first-class minimum value is less than the second-class minimum value, set the target deceleration to deceleration equal to or more than the second-class minimum value, based on a second-class minimum value phase indicating a phase to which the second-class minimum value belongs in the second deceleration feature.

The second aspect further has the following feature in the first aspect.

In the deceleration set processing, the controller is configured to:

if the first-class minimum value is less than the second-class minimum value and the second-class minimum value is located closer to a rapid deceleration side than the second-class boundary deceleration, set the target deceleration to the second-class minimum.

The third aspect further has the following feature in the first aspect.

In the deceleration set processing, the controller is configured to:

if the first-class minimum value is less than the second-class minimum value and the second-class minimum value is located closer to a slow deceleration side than the second-class boundary deceleration, set the target deceleration to deceleration greater than the second-class minimum.

A fourth aspect is a vehicle control system which is configured to execute automated driving control of a vehicle.

The vehicle control system comprises an acquiring device and a controller.

The acquiring device is configured to acquire driving environment information of the vehicle.

The controller is configured to execute the automated driving control based on the driving environment information.

In the automated driving control, the controller is configured to execute deceleration setting processing in which a target deceleration is set based on first and second deceleration features.

The first deceleration feature defines a relationship between a first-class state indicating a state of a slowdown target of the vehicle and deceleration of the vehicle. The first-class state is divided into multiple phases by a first-class boundary.

The second deceleration feature defines a relationship between a second-class state indicating a state of the vehicle as viewed from a following moving body and deceleration of the following moving body. The second-class state is divided into multiple phases by a second-class boundary.

In the deceleration set processing, the controller is configured to:

specify, based on the driving environment information and the deceleration feature, at least one first-class deceleration indicating deceleration of the vehicle that corresponds to the first-class state;

calculate for each of the at least one first-class deceleration a first-class plausibility indicating an accuracy of information on the first-class state or the accuracy of information associated with the first-class state;

specify a first-class minimum value of the at least one first-class deceleration;

specify, based on the driving environment information and the second deceleration feature, at least one second-class deceleration indicating deceleration of the following moving body corresponding to the second-class state;

calculate, for each second-class deceleration, a second-class plausibility indicating an accuracy of information on the second-class state;

specify a second-class minimum value of the at least one second-class deceleration;

compare the first-class minimum value and the second-class minimum value;

if the first-class minimum value is equal to or greater than the second-class minimum value, the first-class minimum value is reflected in a first-class reflection degree of 0 to 100%, based on a first-class minimum value phase indicating a phase to which the first-class minimum value belongs in the second deceleration feature and the first-class plausibility corresponding to the first-class minimum value; and if the first-class minimum value is less than the second-class minimum value, the second-class minimum value is reflected in a second-class reflection degree of 0 to 100%, based on a second-class minimum value phase indicating a phase to which the second-class minimum value belongs in the second deceleration feature and the second-class plausibility corresponding to the second-class minimum value.

The fifth aspect further has the following feature in the fourth aspect.

The first-class boundary includes a first-class maximum deceleration.

The first-class maximum deceleration indicates a maximum deceleration of the vehicle.

In the deceleration set processing, the controller is configured to:

set the first reflection degree to 100%, if the first-class minimum value is equal to or greater than the second-class minimum value and the first-class minimum value phase is located closer to a rapid deceleration side than the first-class maximum deceleration, regardless of the first-class plausibility corresponding to the first-class minimum value.

The sixth aspect further has the following feature in the fourth aspect.

The first-class boundary deceleration includes a first-class minimum deceleration.

The first-class minimum deceleration indicates minimum deceleration of the vehicle.

In the deceleration set processing, the controller is configured to:

set the first reflection degree to 0%, if the first-class minimum value is equal to or greater than the second-class minimum value and the first-class minimum value phase is located closer to a slow deceleration side than the first-class minimum deceleration, regardless of the first-class plausibility corresponding to the first-class minimum value.

The seventh aspect further has the following features in the fourth aspect.

The first-class boundary deceleration includes a first-class maximum deceleration, a first-class minimum deceleration, and a first-class middle deceleration.

The first-class maximum deceleration indicates a maximum deceleration of the vehicle.

The first-class minimum deceleration indicates minimum deceleration of the vehicle.

The first-class middle deceleration is between the first-class maximum deceleration and the first-class minimum deceleration.

In the deceleration set processing, the controller is configured to:

if the first-class minimum value is equal to or greater than the second-class minimum value and the first-class minimum value phase is located between the first-class maximum deceleration and the first-class middle deceleration, change the first reflection degree according to specified total number of the first-class deceleration.

The first reflection degree is set to 100% if the specified total number is one.

If the specified total number is two or more, the first reflection degree is set to a value between 0 and 100% depending on the first-class plausibility corresponding to the first-class minimum value.

An eighth aspect further has the following features in the fourth aspect.

The first-class boundary deceleration includes a first-class maximum deceleration, a first-class minimum deceleration, and a first-class middle deceleration.

The first-class maximum deceleration indicates a maximum deceleration of the vehicle.

The first-class minimum deceleration indicates minimum deceleration of the vehicle.

The first-class middle deceleration is between the first-class maximum deceleration and the first-class minimum deceleration.

In the deceleration set processing, the controller is configured to:

if the first-class minimum value is equal to or greater than the second-class minimum value and the first-class minimum value phase is located between the first-class middle deceleration and the first-class minimum deceleration, change the first reflection degree according to a result of comparing the minimum value plausibility corresponding the first-class minimum value with a first-class threshold.

The first reflection degree is set to 100% if the first-class plausibility corresponding to first-class minimum value is more than the first-class threshold.

The first reflection degree is set to 0% if the first-class plausibility corresponding to first-class minimum value is less than the first-class threshold.

A ninth aspect further has the following feature in the fourth aspect.

The second-class boundary includes a second-class maximum deceleration.

The second-class maximum deceleration indicates a maximum deceleration of the following moving body.

In the deceleration set processing, the controller is configured to:

If the first-class minimum value is less than the second-class minimum value and the second-class minimum value phase is located in a rapid deceleration side than the second-class maximum deceleration, set the second reflection degree to 100%, regardless of the second-class plausibility corresponding to the second-class minimum value.

A tenth aspect further has the following features in the fourth aspect.

The second-class boundary includes a second-class minimum deceleration.

The second-class minimum deceleration indicates a minimum deceleration of following moving body.

In the deceleration set processing, the controller is configured to:

if the first-class minimum value is less than the second-class minimum value and the second-class minimum value phase is located in a slow deceleration side than the second-class minimum deceleration, set the second reflection to 0%, regardless of the second-class plausibility corresponding to the second-class minimum value.

An eleventh aspect further has the following features in the fourth aspect.

The second-class boundary deceleration includes a second-class maximum deceleration, a second-class minimum deceleration, and a second-class middle deceleration.

The second-class maximum deceleration indicates a maximum deceleration of the following moving body.

The second-class minimum deceleration indicates a minimum deceleration of the following moving body.

The second-class middle deceleration is between the second-class maximum deceleration and the second-class minimum deceleration.

In the deceleration set processing, the controller is configured to:

if the first-class minimum value is less than the second-class minimum value and the second-class minimum value phase is located between the second-class maximum deceleration and the second-class middle deceleration, change the second reflection degree according to specified total number of the second-class deceleration.

The second reflection degree is set to 100% if the specified total number is one.

If the specified total number is two or more, the second reflection degree is set to a value between 0 and 100% according to the second-class plausibility corresponding to the second-class minimum value.

A twelfth aspect further has the following features in the fourth aspect.

The second-class boundary deceleration includes a second-class maximum deceleration, a second-class minimum deceleration, and a second-class middle deceleration.

The second-class maximum deceleration indicates a maximum deceleration of the following moving body.

The second-class minimum deceleration indicates a minimum deceleration of the following moving body.

The second-class middle deceleration is between the second-class maximum deceleration and the second-class minimum deceleration.

In the deceleration set processing, the controller is configured to:

if the first-class minimum value is less than the second-class minimum value and the second-class minimum value phase is located between the second-class middle deceleration and the second-class minimum deceleration, change the second reflection degree according to a result of comparing the second-class plausibility corresponding to the second-class minimum value with a second-class threshold.

The second reflection degree is set to 100% if the second-class plausibility corresponding to the second-class minimum value is equal to or more than the second-class threshold.

The second reflection degree is set to 0% if the second-class plausibility corresponding to second-class minimum value is less than the second-class threshold.

A thirteenth aspect further has the following features in any one of the fourth aspect.

The slowdown target is a nearest moving or static obstacle of the vehicle on a driving trajectory of the vehicle.

The following moving body is a moving body present behind the vehicle.

The driving environment information includes a first-class distance indicating a distance from the moving or static obstacle to the vehicle, a second-class distance indicating a distance from the following moving body to the vehicle, first-class relative speed indicating relative speed of the moving or static obstacle, and second-class relative speed indicating relative speed of the following moving body.

The first-class state is the first-class distance and the first-class relative speed.

The second-class state is the second-class distance and the second-class relative speed.

The first-class plausibility is an accuracy of the first-class distance and the first-class relative speed.

The second-class plausibility is an accuracy of the second-class distance and the second-class relative speed.

A fourteenth aspect further has the following features in the fourth aspect.

The slowdown target is a nearest traffic signal of the vehicle on a driving trajectory of the vehicle.

The following moving body is a moving body present behind the vehicle.

The driving environment information includes a first-class distance indicating a distance from the traffic light to the vehicle, a second-class distance indicating a distance from the following moving body to the vehicle, first-class relative speed indicating relative speed of the traffic light, and second-class relative speed indicating relative speed of the following moving body.

The first-class state is the first-class distance and the first-class relative speed.

The second-class state is the second-class distance and the second-class relative speed.

The first-class plausibility is an accuracy where lighting color of traffic light is red or yellow, associated with the first-class distance and the first-class relative speed.

The second-class plausibility is an accuracy of the second-class distance and the second-class relative speed.

A fifteenth aspect further has the following features in the first aspect.

The automated driving control includes lane change control in which a cruising lane of the vehicle is changed from a first lane to a second lane.

The driving environment information includes information on a plurality of objects on the second lane.

In the deceleration set processing which is executed during the execution of the lane change control, the controller is configured to:

set a potential position of the vehicle between the plurality of objects adjacent to each other;

specify the first-class minimum value by applying the first deceleration feature to a future slowdown target, existing in front of the potential position, among the vehicle of the plurality of objects adjacent to each other; and specify the second-class minimum value by applying the second deceleration feature to a future following moving body, existing behind of the potential position, among the plurality of objects adjacent to each other.

The sixteenth aspect further has the following features in the fifteenth aspect.

In the deceleration set processing, the controller is further configured to:

set a search area of the potential position;

if a plurality of the potential positions are set in the search area, calculate a candidate of the target deceleration for each of the plurality of potential positions; and set the candidate of the target deceleration that minimizes a difference from current acceleration or deceleration of the vehicle as the target deceleration.

According to the first aspect, the deceleration set processing is executed. In the deceleration set processing, the first-class and second-class minimum values are specified. Here, the first-class minimum value is a minimum value of at least one deceleration of the vehicle (i.e., the first-class deceleration) corresponding to the state of the slowdown target (i.e., the first-class state). And the second-class minimum value is a minimum value of at least one deceleration of the following moving body (i.e., the second-class deceleration) corresponding to state of the vehicle as viewed from the following moving body (i.e., the second-class state). Therefore, the fact that the first-class and second-class minimum values are specified has the following means. That is, the deceleration of the vehicle and that of the following moving body are specified even if the information on the state of the slowdown target as viewed from the vehicle or that that of the vehicle as viewed from the following moving body (if considering the vehicle as a reference, this is the state of the following moving body as viewed from the vehicle) is uncertain.

In the deceleration set processing, further, if the first-class minimum value is equal to or greater than the second-class minimum value, the target deceleration is set to the first-class minimum value. The fact that the first-class minimum value is equal to or greater than the second-class minimum value means that the following moving body executes more rapid deceleration than that the vehicle executes. Therefore, by setting the target deceleration to the first-class minimum value, it is possible to avoid the vehicle from colliding with the slowdown target while avoiding collision from the following moving body during the deceleration of the vehicle.

In the deceleration set processing, furthermore, if the first-class minimum value is less than the second-class minimum value, the target deceleration is set to deceleration equal to or greater than the second-class minimum value based on the second-class minimum value phase. The fact that the first-class minimum value is less than the second-class minimum value means that the vehicle executes more rapid deceleration than that the following moving body executes. Therefore, in this case, there is a possibility that a rear-end collision of the vehicle from the following moving body. In this regard, since the second-class minimum value phase indicates the phase to which the second-class minimum value belongs in the second deceleration feature, it is possible to judge the possibility of the rear-end collision by using the second-class minimum value phase. As a consequence of this judgement, by setting the target deceleration to the deceleration equal to or higher than the second-class minimum value, it is possible to avoid the vehicle from colliding with the slowdown target while avoiding the collision from the following moving body during the deceleration of the vehicle.

As described above, according to the first aspect, even if the information on the state of the slowdown target and that of the following moving body is uncertain, it is possible to set the target deceleration flexibly based on the judgement result of the possibility of the rear-end collision. Therefore, it is possible to execute the automated driving control in which the driving safety and the driving efficiency are compatible with each other.

According to the second aspect, if the first-class minimum value is less than the second-class minimum value and the second-class minimum value is located closer to the rapid deceleration side than the second-class boundary deceleration, the target deceleration is set to the second-class minimum. The fact that the first-class minimum value is less than the second-class minimum value means that the vehicle executes more rapid deceleration than that the following moving body executes. Also, the fact that the second-class minimum value is located closer to the rapid deceleration side than the second-class boundary deceleration means that the following moving body is more likely to collide with the vehicle. In this regard, if the target deceleration is set to the second-class minimum value, the deceleration during the deceleration of the vehicle matches that of the following moving body. Therefore, it is possible to avoid the rear-end collision from the following moving body.

According to the third aspect, if the first-class minimum value is less than the second-class minimum value and the second-class minimum value is located closer to the slow deceleration side than the second-class boundary deceleration, the target deceleration is set to the deceleration greater than the second-class minimum. The fact that the second-class minimum value is located closer to the slow deceleration side than that the second-class boundary deceleration means that the following moving body is unlikely to collide with the vehicle. Therefore, by setting the target deceleration to the decceleation greater than the second-class minimum, it is possible to avoid the rear-end collision from the following body while suppressing the decrease in the driving efficiency.

According to the fourth aspect, the deceleration based on the deceleration set processing described in the first aspect is executed. The difference between the deceleration set processing in the fourth aspect and that in the first aspect is that the first-class and second-class plausibilities are taken into account in the reflection on the target deceleration of the first-class or second-class minimum value. Here, the first-class plausibility indicates the accuracy of the information on the first-class state or that of the information associated with the first-class state. The second-class plausibility indicates the accuracy of the information on second-class state.

Therefore, by considering the first-class and second-class plausibilites, it is possible to reflect the first-class or second-class minimum value flexibly on target deceleration to execute the automated driving control in which the driving safety and the driving efficiency are compatible with each other.

According to the fifth aspect, if the first-class minimum value is equal to or greater than the second-class minimum value and the first-class minimum value phase is located closer to the rapid deceleration side than the first-class maximum deceleration, the first reflection degree is set to 100% regardless of the first-class plausibility corresponding to the first-class minimum value. In the rapid deceleration side than the first-class maximum deceleration, the maximum deceleration of the vehicle is applied to the target deceleration. Therefore, according to the fifth aspect, it is possible to execute the automated driving control focusing on avoiding the rear-end collision from the following moving body during the deceleration of the vehicle.

According to the sixth aspect, if the first-class minimum value is equal to or greater than the second-class minimum value and the first-class minimum value phase is located in the slow deceleration side than the first-class minimum deceleration, the first reflection degree is set to 0% regardless of the first-class plausibility corresponding to the first-class minimum value. In the slow deceleration side than the first minimum deceleration, the minimum deceleration of the vehicle is applied to the target deceleration or the slowdown of the vehicle is not executed. Therefore, according to the sixth aspect, it is possible to execute the automated driving control focusing on the driving efficiency.

According to a seventh aspect, if the first-class minimum value is equal to or greater than the second-class minimum value and the first-class minimum value phase is located between the first-class maximum deceleration and the first-class middle deceleration, the first reflection degree is changed according to specified total number of the first-class deceleration. If the specified total number is one, the first reflection degree is set to 100%. If the specified total number is tow or mode, the first reflection degree is set between 0% and 100% depending on the first-class plausibility corresponding to the first-class minimum value. Therefore, according to the seventh aspect, it is possible to execute appropriate automated driving control in accordance with current situation.

According to the eighth aspect, if the first-class minimum value is equal to or greater than the second-class minimum value and the first-class minimum value phase is located between the first-class middle deceleration and the first-class minimum deceleration, the first reflection degree is changed according to the result of comparing the minimum value plausibility corresponding the first-class minimum value with the first-class threshold. If the first-class plausibility corresponding to first-class minimum value is more than the first-class threshold, the first reflection degree is set to 100%. If the first-class plausibility corresponding to first-class minimum value is less than the first-class threshold, the first reflection degree is set to 0%. Therefore, according to the eighth aspect, it is possible to execute the automated driving control in which a balance of the driving safety and the driving efficiency is maintained.

According to the ninth aspect, if the first-class minimum value is less than the second-class minimum value and the second-class minimum value phase is located in the rapid deceleration side than the second-class maximum deceleration, the second reflection degree is set to 100% regardless of the second-class plausibility corresponding to the second-class minimum value. In the rapid deceleration side than the second-class maximum deceleration, the maximum deceleration of the following moving body is applied to the target deceleration. Therefore, according to the ninth aspect, it is possible to obtain the same effect as that according to the fifth aspect.

According to the tenth aspect, if the first-class minimum value is less than the second-class minimum value, and the second-class minimum value phase is located in the slow deceleration side than the second-class minimum deceleration, the second reflection is set to 0% regardless of the second-class plausibility corresponding to the second-class minimum value. In the slow deceleration side than the second minimum deceleration, the minimum deceleration of the following moving body is applied to the target deceleration or the slowdown of the vehicle is not executed. Therefore, according to the tenth aspect, it is possible to obtain the same effect as that according to the sixth aspect.

According to the eleventh aspect, if the first-class minimum value is less than the second-class minimum value and the second-class minimum value phase is located between the second-class maximum deceleration and the second-class middle deceleration, the second reflection degree is changed according to the specified total number of the second-class deceleration. If the specified total number is one, the second reflection degree is set to 100%. If the specified total number is two or more, the second reflection degree is set between 0% and 100% depending on the second-class plausibility corresponding to the second-class minimum value. Therefore, according to the eleventh aspect, it is possible to obtain the same effect as that according to the seventh aspect.

According to the twelfth aspect, if the first-class minimum value is less than the second-class minimum value and the second-class minimum value phase is located between the second-class middle deceleration and the second-class minimum deceleration, the second reflection degree is changed according to the result of comparing the second-class plausibility corresponding to the second-class minimum value with the second-class threshold. If the second-class plausibility corresponding to the second-class minimum value is equal to or greater than the second-class threshold, the second reflection degree is set to 100%. If the second-class plausibility corresponding to second-class minimum value is less than the second-class threshold, the second reflection degree is set to 0%. Therefore, according to the twelfth aspect, it is possible to obtain the same effect as that according to the eighth aspect.

According to the thirteenth aspect, it is possible to execute the automated driving control in which the driving safety and the driving efficiency are compatible with each other in a case where the nearest moving or static obstacle on the driving trajectory corresponds to the slowdown target and the moving body behind the vehicle corresponds to the following moving body.

According to the fourteenth, it is possible to execute the automated driving control in which the driving safety and the driving efficiency are compatible with each other in a case where the nearest traffic signal on the driving trajectory corresponds to the slowdown target and the moving body behind the vehicle corresponds to the following moving body.

According to the fifteenth aspect, when the lane change control is executed from the first lane to the second lane, the first-class minimum value is specified by applying the first deceleration feature to the future slowdown target which exists in front of the potential position. Also, the second-class minimum value is specified by applying second deceleration feature to the future following moving object which exists behind the potential position. Therefore, even if the future slowdown target and future following moving body exist on the second lane, it is possible to set the target deceleration flexibly by using the judgment result of the possibility of the rear-end collision.

According to the sixteenth aspect, the candidate of the target deceleration, calculated for each of the plurality of the potential positions, that minimizes the difference from current acceleration or deceleration of the vehicle is set as the target deceleration. If the candidate of the target deceleration that minimizes the difference is set to the target deceleration, it is possible to execute the lane change control focusing on the driving efficiency.

Embodiments of the present disclosure are described hereunder with reference to the accompanying drawings. However, structures or steps or the like described in conjunction with the following embodiments are not necessarily essential to embodiments of the present disclosure unless expressly stated or theoretically defined.

1. FIRST EMBODIMENT

First, a first embodiment will be described with reference to FIGS. 1 to 8.

1.1 Assumption

Figure 1:
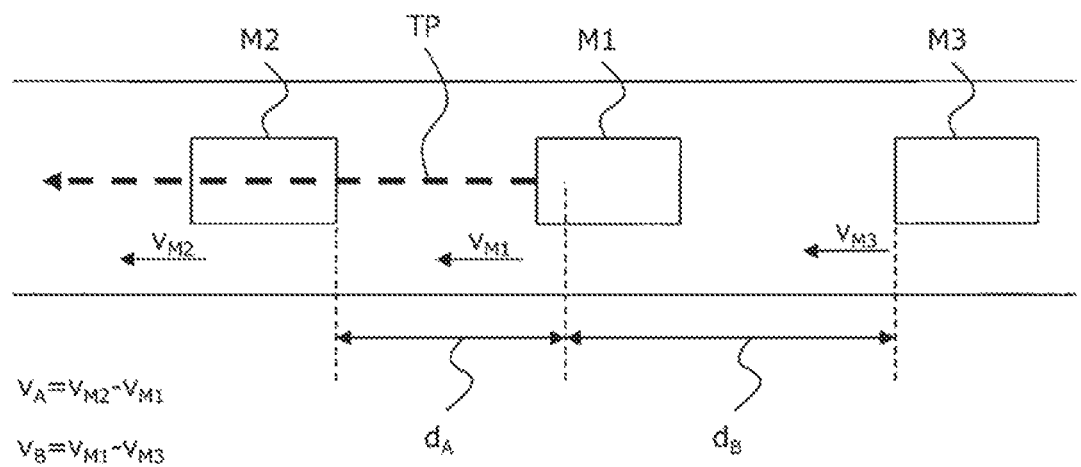
FIG. 1 is a diagram for illustrating a situation where a first embodiment is assumed.

FIG. 1 is a diagram for explaining a situation where the first embodiment is assumed. A vehicle M1 shown in FIG. 1 is a vehicle on which a vehicle control system according to the first embodiment (hereinafter also referred to as a "system" in the first embodiment) is mounted. Examples of the vehicle M1 include a vehicle in which an engine is used as a power source, an electronic vehicle in which a motor is used as the power source, and a hybrid vehicle having the engine and the motor.

The vehicle M1 has a plan to run on a driving trajectory TP at driving speed $v_{M1}$ according to automated driving control executed by the system. The driving trajectory TP defines a collection of target positions that a reference position of the vehicle M1 should reach. The reference position includes a gravity center of the vehicle M1 and a center of rear wheel shaft.

In front of the vehicle M1 by a distance of $d_A$, there is a vehicle M2 running at driving speed $v_{M2}$. The vehicle M2 is a preceding vehicle which exists on the driving trajectory TP. The vehicle M2 need not be equipped with a system similar to the system installed in the vehicle M1. Relative speed vs of the vehicle M2 for to vehicle M1 is represented by $v_{M2}$-$v_{M1}$. The vehicle M2 may be a moving body that differs from a vehicle or may be a stationary body. If the vehicle M2 is the stationary body, the relative speed $v_A$ of the stationary body is represented by $-v_{M1}$. For convenience of explanation, the distance $d_A$ is also referred to as a "first-distance $d_A$" and the relative speed $v_A$ is also referred to as "first-class $v_A$".

Behind the vehicle M1 by a distance $d_B$, a vehicle M3 runs at driving speed $v_{M3}$. The vehicle M3 corresponds to a "following moving body FMO". The vehicle M3 need not be equipped with a system similar to the system installed in the vehicle M1. The relative speed $v_B$ of the vehicle M1 to the vehicle M3 is represented by $v_{M1}$-$v_{M3}$. The vehicle M3 may be a moving body that differs from a vehicle. For convenience of explanation, the distance $d_B$ is also referred to as a "second-class $d_B$" and the relative speed $v_B$ is also referred to as "second-class $v_B$".

1.1.1 Conceptual of Deceleration Feature (1) First Deceleration Feature

Figure 2:
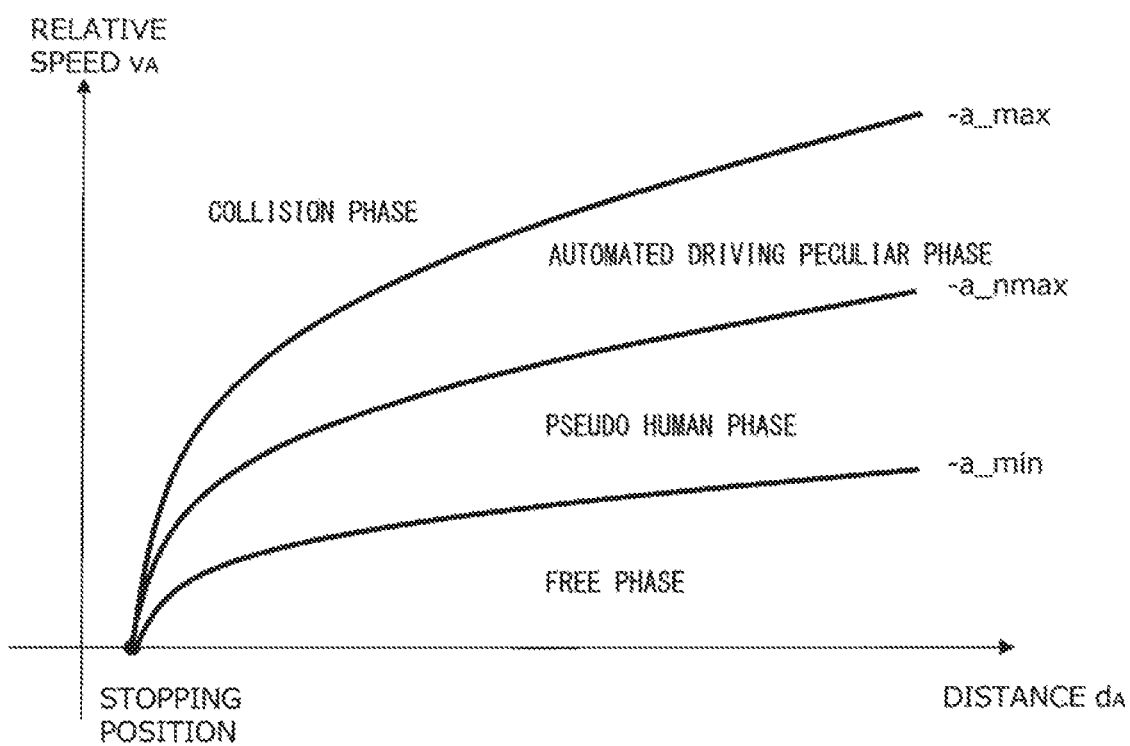
FIG. 2 is a conceptual diagram for showing a relationship between a distance and relative speed during a slowdown of a vehicle.

Under the situation shown in FIG. 1, suppose a case where an object OBJ for which a slowdown of the vehicle M1 should be considered (hereinafter referred to as a "slowdown target") is vehicle M2. In the first embodiment, the slowdown target OBJ corresponds to the nearest moving or static obstacle of the vehicle M1 on the driving trajectory TP. FIG. 2 is a conceptual diagram for showing a relationship between the first-class distance $d_A$ and the first-class relative speed $v_A$ during a slowdown of the vehicle M1. In the present disclosures, the relationship shown in FIG. 2 is referred to as a "first deceleration feature". For convenience of explanation, in the explanation of FIG. 2, it is assumed that the vehicle M2 is the static obstacle. It is also assumed that the presence of the vehicle M2 has been detected correctly and that the first-class distance $d_A$ and the first-class relative speed $v_A$ are calculated correctly.

Consider a situation where the vehicle M1 running at driving speed vim slows down and stops at a position behind the vehicle M2 by a predetermined amount of a first-class distance $d_{A0}$. In this case, a process in which the vehicle M1 approaches the vehicle M2 (hereinafter referred to as an "approaching process" in the first embodiment) is represented by three types of quadratic curves depending on deceleration $a_{M1}$ of the vehicle M1. A quadratic curve shown in a top of FIG. 2 represents the approaching process when the deceleration $-a_{M1}$ is a maximum deceleration approaching process if it is a maximum deceleration $-a\_max$ of the system (hereinafter also referred to a "first-class maximum deceleration"). The fact that a state of the vehicle M2 exists in a phase between this quadratic curve and the vertical axis (hereinafter also referred to a "first-class state" in the first embodiment) has the following meaning. That is, it means that the vehicle M1 cannot stop at the position mentioned above even when the slowdown with the first-class deceleration is performed after the detection of the vehicle M2. Thus, this phase is defined as a "collision phase".

The quadratic curve shown in a bottom of FIG. 2 represents the approaching process where the deceleration $-a_{M1}$ is a minimum deceleration a min of the system (hereinafter also referred to a "first-class minimum deceleration"). The fact that the first-class state exists in a phase between this quadratic curve and the horizontal axis has the following meaning. That is, it means that the vehicle M1 stops in front of a stopping position when the slowdown with the first-class minimum deceleration is performed after the detection of the vehicle M2. It also means that vehicle M1 stops in front of the stopping position even when the slowdown with the first-class minimum deceleration is not performed. Thus, this phase is defined as a "free phase".

The quadratic curve shown in a middle of FIG. 2 represents the approaching process when the deceleration $-a_{M1}$ is a maximum deceleration $-a\_nmax$ (hereinafter referred to as a "first-class middle deceleration") normally used by a human (a driver). When manual driving is performed, the driver is able to detect the obstacle on a roadway relatively far away. On the other hand, performance of a general automated drive system to detect this obstacle is limited. Therefore, the quadratic curve indicating the approaching process when the slowdown with the first-class middle deceleration is performed differs from that with the first-class minimum deceleration.

Therefore, the fact that when the first-class state is in a phase between the quadratic curve with the first-class minimum deceleration and that with the first-class middle deceleration has the following meaning. That is, it means that when the slowdown of the vehicle M1 between the first-class minimum deceleration and the first-class middle deceleration is performed after the detection of the vehicle M2, the slowdown similar to the one during the manual driving is performed. Thus, this phase is defined as a "pseudo human phase".

In addition, the fact that the state of the vehicle M2 is in a phase between the quadratic curve with the first deceleration and that with the third deceleration has the following meaning. That is, it means that when the slowdown of the vehicle M1 with the deceleration between the first deceleration and the third deceleration is performed after the detection of the vehicle M2, a characteristic slowdown is performed. Thus, this phase is defined as an "automated driving peculiar phase".

In summary, when the vehicle M2 as the slowdown target OBJ exists, the first-class is classified into the "collision phase", the "free phase", the "pseudo human phase" or the "automated driving peculiar phase".

When the vehicle M2 is the dynamic obstacle, the relationship between the first-class distance $d_A$ and the first-class relative speed $v_A$ during the slowdown of the vehicle M1 is explained as follows, using the explanation of FIG. 2. That is, in this case, each of the three types of the first-class deceleration lines described above moves toward the horizontal axis. Further, the stopping position shown in FIG. 2 moves to an intersection of $d_A=d_{A1}$ and $v_A=v_{M2}$. The first-class distance $d_{A1}$ is a proper inter-vehicular distance between the vehicle M1 and the vehicle M2. The proper inter-vehicular distance may be constant or may be changed in accordance with the driving speed $v_{M1}$.

(2) Second Deceleration Feature

The first deceleration feature explained in FIG. 2 is a characteristic of the deceleration of the vehicle M1 when focusing on the vehicle M2 as the slowdown target OBJ. Here, a positional relationship between the vehicle M2 and the vehicle M1 can be replaced by that between the vehicle M1 and the vehicle M3. Then, the vehicle M1 viewed from the vehicle M3 is recognized as an object for which the slowdown of the vehicle M3 should be considered. Then, the same deceleration feature as that of the first deceleration feature described in FIG. 2 is obtained as a deceleration feature of the vehicle M3. In first embodiment, the deceleration feature of the vehicle M3 when focusing on the vehicle M1 is referred to as a "second deceleration feature".

Suppose that a typical automated drive system is mounted on the vehicle M3. Then, a process in which the vehicle M3 approaches the vehicle M1 are shown in the second deceleration feature with three deceleration lines depending on the deceleration of the vehicle M3 $-a_{M3}$ (hereinafter referred to as "second-class deceleration"). These deceleration are referred to as a "second-class maximum deceleration", a "second-class minimum deceleration" and a "second-class middle deceleration". If such the automated drive system is not mounted on the vehicle M3, the second-class maximum deceleration is not expressed in the second deceleration feature. In this case, there is no "automated driving peculiar phase" in the second deceleration feature and the "collision phase" and the "pseudo human phase" are separated by the second-class middle deceleration.

1.1.2 Problems in First Deceleration Feature

As mentioned in the explanation of FIG. 2, the performance of the general automated drive system to detect the obstacle on the road is limited. This also applies to the performance of the system for detecting the vehicle M2. Therefore, the combinations of the first-class distance $d_A$ and the first-class relative speed $v_A$ when the vehicle M2 is not detected by the system at all should be represented in the first deceleration feature shown in FIG. 2. In addition, the combinations when the vehicle M2 is completely detected by the system should also be represented.

The performance limitation described above also is applied to the system of the vehicle M3 systems to detect the vehicle M1. Therefore, the combinations of the second-class distance $d_B$ and the second-class relative speed $v_B$ when the vehicle M1 is not detected by the system of the vehicle M3 at all should be represented in the second deceleration feature. In addition, the combinations when the vehicle M1 is completely detected by the system of the vehicle M3 should also be represented.

Figure 3:
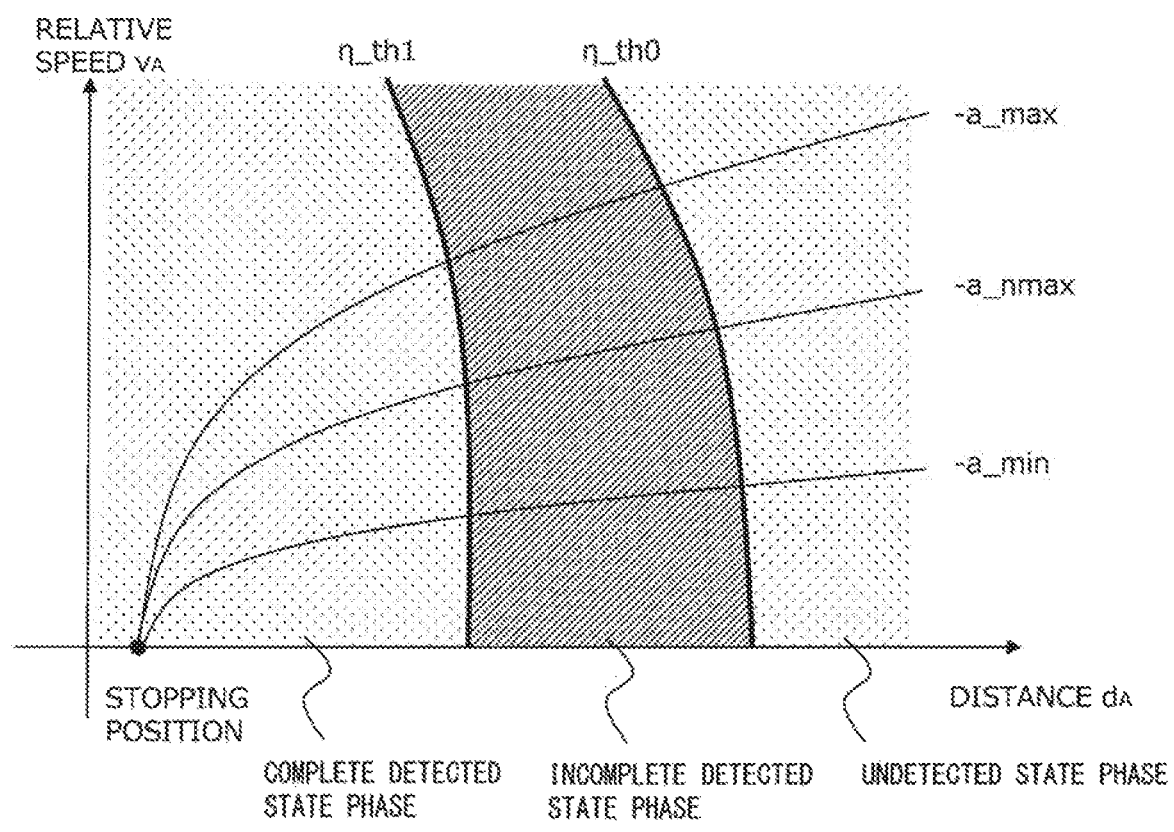
FIG. 3 is a diagram for showing the relationship between a first-class distance and first-class relative speed during the slowdown of a vehicle and an accuracy of detection of a preceding vehicle by the system.

FIG. 3 is a diagram for showing a relationship between the first-class distance $d_A$ and the first-class relative speed $v_A$ during the slowdown of the vehicle M1 and an accuracy of the detection of the vehicle M2 by the system. For convenience of explanation, it is also assumed in FIG. 3 that the vehicle M2 is the static obstacle. In FIG. 3, in addition to the three types of the quadratic curves described in FIG. 2, two types of curves are drawn along the longitudinal axis. The curve drawn on the right is a series of coordinates $(d_A, v_A)$ whose $_A$ in which a plausibility $\eta_A$ indicating the accuracy of the detection of the vehicle M2 matches a threshold $\eta\_th0$. The threshold $\eta_A\_th0$ corresponds to the plausibility $\eta_A$ when no vehicle M2 is detected by the system at all. Therefore, the phase located on the right of the curve of the threshold $\eta_A\_th0$ is defined as "undetected state phase". In the following explanation of the first embodiment, the plausibility $\eta_A$ is also referred to as a "first-class plausibility $\eta_A$", and a threshold $\eta_A\_thX$ is also referred to as a "first-class threshold $\eta_A\_thX$" (where X denotes an integer same as below).

On the other hand, the curve drawn on the left side of FIG. 3 are obtained by connecting the coordinates $(d_A, v_A)$ in which the accuracy of the detection of the vehicle M2 coincides with the first-class threshold $\eta_A\_th1$. The first-class threshold $\eta_A\_th1$ corresponds to the first-class plausibility $\eta_A$ when the vehicle M2 is completely detected by the system. The threshold $\eta_A\_th1$ satisfies $\eta_A\_th1 > \eta_A\_th0$. Therefore, the phase located on the left of the curve of the first-class threshold $\eta_A\_th1$ is defined as a "complete detected state phase".

When such the "undetected state phase" and the "complete detected state phase" are defined, an intermediate phase of the two is defined as an "incomplete detected state phase". When the first-class state is in the "incomplete detected state phase", the first-class plausibility $\eta_A$ of the coordinate $(d_A, v_A)$ corresponding to this state is greater than the first-class threshold $\eta_A\_th0$ and less than first-class threshold $\eta_A\_th1$. In the following explanation, among the coordinate $(d_A, v_A)$ corresponding to the first-class state, the coordinate $(d_A, v_A)$ having the first-class plausibility $\eta_A$ greater than the first-class threshold $\eta_A\_th0$ is referred to as a "coordinate $(d_A, v_A|\eta_A)$".

What is problematic here is that the first-class plausibility $\eta_A$ of coordinate $(d_A, v_A|\eta_A)$ is not high in the "incomplete detected state phase". The fact that the first-class plausibility $\eta_A$ is not high means that the first-class state is uncertain. If the detection of the first-class state is uncertain, it is difficult not only to determine the first-class state, but also to determine the presence of the vehicle M2.

A further concern is that more than one coordinate $(d_A, v_A|\eta_A)$ is present in the "incomplete detected state phase" at the same time. In the "complete detected state phase", a single coordinate $(d_A, v_A|\eta_A)$ with a high plausibility $\eta_A$ is specified. On the other hand, in the "incomplete detected state phase", two or more coordinates $(d_A, v_A|\eta_A)$ having a lower first-class plausibility $\eta_A$ exist at the same time. Then, it is difficult to determine which of these coordinates $(d_A, v_A|\eta_A)$ corresponds to a true state.

And the problems in the first deceleration feature also apply to the second deceleration feature. Therefore, in the explanation of FIG. 3, the "vehicle M2" is replaced with the "vehicle M1" and the "first-class state" is replaced with a "second-class state". Then, the "second-class state" is defined as a state of the vehicle M1 as viewed from the vehicle M3. If the vehicle M1 is recognized as a reference, the "second-class state" is defined as a state of the vehicle M3 as viewed from vehicle M1.

Also, in the explanation of FIG. 3, "$\eta_A$" which is used in the "plausibility $\eta_A$", the "threshold $\eta_A\_thX$", and the "coordinate $(d_A, v_A|\eta_A)$" is replaced with "$\eta_B$." Then the problems in the second deceleration feature are explained by this replacement. Here, the "plausibility $\eta_B$ is expressed as an accuracy of the detection of the vehicle M1 as viewed from the vehicle M3. However, if the vehicle M1 is recognized as the reference, the "plausibility $\eta_B$ is also expressed as an accuracy of the detection of the vehicle M3 as viewed from the vehicle M1. In the first embodiment, the latter representation is used as the definition of the "plausibility $\eta_B$". The "plausibility $\eta_B$" is also referred to as a "second-class plausibility $\eta_B$". Further, in this replacement, the coordinate $(d_A, v_A)$ is appropriately replaced with a coordinate $(d_B, v_B)$. The threshold $\eta_B\_thX$ is referred to as a "second-class threshold $\eta_B\_thX$".

1.2 Characteristic of First Embodiment

In view of the problems mentioned above, the first embodiment determines a driving policy of the vehicle M1 when at least one coordinate $(d_A, v_A|\eta_A)$ and at least one coordinate $(d_B, v_B|\eta_B)$ are preset. In addition, the first embodiment reflects the determined driving policy to a driving plan. Hereinafter, these characteristics will be described.

1.2.1. Determination of Driving Policy

The determination of the driving policy is based on the at least one coordinate $(d_A,$ and the at least one coordinate $(d_B, v_B|\eta_B)$. The reason for expressing the "at least one coordinate $(d_A, v_A|\eta_A)$" is that two cases are assumed: the former is that only one coordinate $(d_A, v_A|\eta_A)$ exists and the latter is that two or more coordinates $(d_A, v_A|\eta_A)$ exist. The reason for expressing the "at least one coordinate $(d_B, v_B|\eta_B)$" is the same as that for expressing the "at least one coordinate $(d_A, v_A|\eta_A)$".

When the coordinate $(d_A, v_A|\eta_A)$ and the coordinate $(d_B, v_B|\eta_B)$ exist one by one, the first-class deceleration $-a_{M1}$ corresponding to the coordinate $(d_A, v_A|\eta_A)$ is compared with the second-class deceleration $-a_{M3}$ corresponding to the coordinate $(d_B, v_B|\eta_B)$. A detailed description of the first-class deceleration $-a_{M1}$ corresponding to the coordinate $(d_A, v_A|\eta_A)$ and that of the second-class deceleration $-a_{M3}$ corresponding to the coordinate $(d_B, v_B|\eta_B)$ are given in the following section "1.3.1".

When two or more coordinates $(d_A, v_A|\eta_A)$ or two or more coordinates $(d_B, v_B|\eta_B)$ are present, a minimum value of the deceleration corresponding to the more than one coordinates is specified. For example, consider a case where two or more coordinates $(d_A, v_A|\eta_A)$ are present. Here, the minimum value of the first-class deceleration $-a_{M1}$ corresponding to each of these coordinates $(d_A, v_A|\eta_A)$ (hereinafter referred to as a "first-class minimum value $-a_{M1}\_min$") is specified. The first-class minimum value $-a_{M1}\_min$ is a safest deceleration of the first-class deceleration $-a_{M1}$ expected on the first deceleration feature. The first-class minimum value $-a_{M1}\_min$ is compared with the second-class deceleration $-a_{M3}$ corresponding to the coordinate $(d_B, v_B|\eta_B)$.

Here, if there is only one coordinate $(d_A, v_A|\eta_{IA})$, the first-class deceleration $-a_{M1}$ corresponding to the coordinate $(d_A, v_A|\eta_A)$ is considered to be a substantial first-class minimum value $-a_{M1}\_min$. If there is only one coordinate $(d_B, v_B|\eta_B)$, the second-class deceleration $-a_{M3}$ corresponding to the coordinate $(d_B, v_B|\eta_B)$ is considered to be a substantial second-class minimum value $-a_{M3}\_min$. The "second-class minimum value $-a_{M3}\_min$" is defined as a minimum value of the second-class decelerations $-a_{M3}$ corresponding to each of these coordinates $(d_B, v_B|\eta_B)$ when there are two or more coordinate $(d_B, v_B|\eta_B)$. The second-class minimum value $-a_{M3}\_min$ is a safest deceleration of the second-class deceleration $-a_{M3}$ expected on the second deceleration feature. In the following description, regardless of the total number of the coordinate $(d_A, v_A|\eta_A)$ or the coordinate $(d_B, v_B|\eta_B)$, the coordinate $(d_A, v_A|\eta_A)$ having the first-class minimum value $-a_{M1}\_min$ is referred to as a "coordinate $(d_A, v_A|\eta_A|-a_{M1}\_min)$", and the coordinate $(d_B, v_B|\eta_B)$ having the second-class minimum value $-a_{M3}\_min$ called a "coordinate $(d_B, v_B|\eta_B|-a_{M3}\_min)$".

The driving policy is determined by comparing the first-class minimum value $-a_{M1}\_min$ and the second-class minimum value $-a_{M3}\_min$. The magnitude relation of these minimum values is expressed as follows.

$$-a_{M1}\_min \geq -a_{M3}\_min \quad (i)$$

$$-a_{M1}\_min < -a_{M3}\_min \quad (ii)$$

1.2.1.1 In Case of Magnitude Relationship (i)

The driving policy of the relationship (i) is determined to slowdown the vehicle M1 immediately with the first-class minimum value $-a_{M1}\_min$. The reason for this is that in the case of the magnitude relationship (i), the rear-end collision from the vehicle M3 does not occur during the slowdown of the vehicle M1. Therefore, by performing the slowdown of the vehicle M1 with the first-class minimum value $-a_{M1}\_min$, the collision of the vehicle M1 with vehicle M2 can be avoided.

1.2.1.2 In Case of Magnitude Relationship (ii)

The driving policy of the relationship (ii) is determined based on a second-class minimum value phase. The "second-class minimum value phase" is defined in the second deceleration feature as a phase to which the coordinate $(d_B, v_B|\eta_{IB}|-a_{M3}\_min)$ belongs. The reason why the second-class minimum value phase is considered is that, in the case of the magnitude relationship (ii), there is a possibility that a rear-end collision from the vehicle M3 occurs during the slowdown of the vehicle M1.

Figure 4:
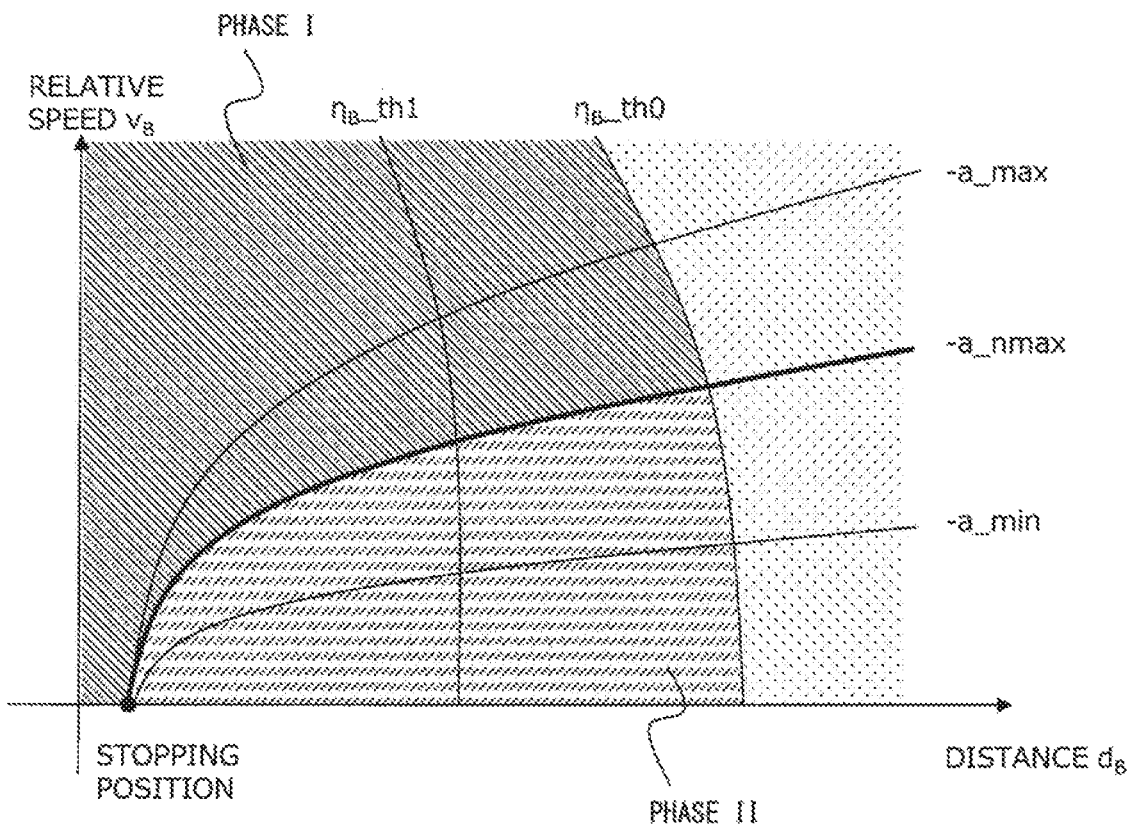
FIG. 4 is a diagram showing a classification example of the second deceleration feature in the first embodiment.

The driving policy of magnitude relationship (ii) will be described with reference to FIG. 4. FIG. 4 is a diagram showing a classification example of the second deceleration feature in the first embodiment. In FIG. 4, the boundaries of the phases described with reference to FIGS. 2 and 3 are drawn. In FIG. 4, a part on the left side (i.e., a part closer to the vertical axis) of the boundary that separates the "undetected state phase" and the "incomplete detected state phase" described in FIG. 3 (i.e., the second-class threshold $\eta_B\_th0$) is divided into phases I and II. The phases I and II are divided with the second-class middle deceleration as the boundary. Therefore, in the first embodiment, the second-class middle deceleration corresponds to the "second-class boundary deceleration" which divides the first deceleration feature.

The phase I is the part on the left side of the second-class threshold $\eta_B\_th0$ in the "collision phase" and the "automated driving peculiar phase" described in FIG. 2. If the second-class minimum value phase corresponds to the phase I, the driving policy is determined to "immediately perform the slowdown of the vehicle M1 with the second-class minimum value $-a_{M3}\_min$." The reason for this is that if the second-class minimum value phase corresponds to the phase I, it is determined that the vehicle M3 is more likely to collide with the vehicle M1. Therefore, in this case, the driving policy is determined as described above.

The phase II is the part on the left side of the second-class threshold $\eta_B\_th0$ in the "free phase" and the "pseudo human phase" described in FIG. 2. If the second-class minimum value phase is the phase II, the driving policy is determined to "postpone a start of the slowdown of the vehicle M1 until the first-class minimum value $-a_{M1}\_min$ is equal to or greater than the second-class minimum value $-a_{M3}\_min$". Alternatively, the driving policy is determined to "perform the slowdown of the vehicle M1 with deceleration greater than the second-class minimum value $-a_{M3}\_min$." This is because it is determined in this case that there is a low possibility that the vehicle M3 collides with the vehicle M1. Note that if the start of the slowdown of the vehicle M1 is postponed, current acceleration or deceleration of vehicle M1 is maintained. If the slowdown of the vehicle M1 with the deceleration greater than the second-class minimum value $-a_{M3}\_min$ is performed, any deceleration greater than the second-class minimum value $-a_{M3}\_min$ is set.

1.2.2 Reflection of Driving Policy

The reflection of the driving policy is performed in the driving plan. The driving plan is planned for each preset time elapsed while the automated driving control is executed. The driving plan includes a driving trajectory TP. The target positions that constitutes the driving trajectory TP have the information on the driving state (i.e., a target acceleration $a_{M1}\_tgt$ and target steering angle $\theta_{M1}\_tgt$ of the vehicle M1). When the driving policy is determined, the information on the driving state is updated according to contents of the driving policy.

Focusing on the first-class minimum value phase, the second-class minimum value phase and the magnitude relationship between the first-class minimum value $-a_{M1}\_min$ and the second-class minimum value $-a_{M3}\_min$, the driving policies described above are summarized as follows.

(i) In case of $-a_{M1}\_min \geq -a_{M3}\_min$

Perform the slowdown of the vehicle M1 immediately with the first-class minimum value $-a_{M1}\_min$ (ii) In case of $-a_{M1}\_min < -a_{M3}\_min$ (ii-a) In case of the second-class minimum value phase is in the phase I Perform the slowdown of the vehicle M1 immediately with the second-class minimum value $-a_{M3}\_min$ (ii-b) In case of the second-class minimum value phase is in the phase II Postpone the start of the slowdown of the vehicle M1 until the first-class minimum value $-a_{M1}\_min$ is equal to or greater than the second-class minimum value $-a_{M3}\_min$, or Perform the slowdown of the vehicle M1 with the deceleration greater than the second-class minimum value $-a_{M3}\_min$ According to the driving policy (i), the first-class minimum value $-a_{M1}\_min$ is immediately reflected to the target acceleration $a_{M1}\_tgt$. According to the driving policy (ii-a), the second-class minimum value $-a_{M3}\_min$ is immediately reflected to the target acceleration $a_{M1}\_tgt$. According to the driving policy (ii-b), the deceleration greater than the second-class minimum value $-a_{M3}\_min$ is reflected to target acceleration $a_{M1}\_tgt$, or neither the first-class minimum value $-a_{M1\_}$min nor the second-class minimum value $-a_{M3\_}$min is reflected to the target acceleration $a_{M1\_}$tgt.

1.2.3 Effect

According to the characteristics of the first embodiment, the driving policy of the vehicle M1 is determined when the presence of the at least one coordinate $(d_A, v_A|\eta_A)$ and the at least one coordinate $(d_B, v_B|\eta_B)$ is found. If the driving policy is determined, the first-class minimum value $-a_{M1\_}$min or the deceleration equal to or greater the second-class minimum value $-a_{M3\_}$min is reflected to the target acceleration $a_{M1\_}$tgt. Depending on the content of the driving policy, these minimum value are not reflected to the target acceleration $a_{M1\_}$tgt. Therefore, even when the first-class state and the second-class state are uncertain, it is possible to set the target acceleration $a_{M1\_}$tgt flexibly. Therefore, it is possible to execute the automated driving control in which the driving safety and the driving efficiency are compatible with each other.

1.3 Vehicle Control System

Next, a configuration example of the system in which the automated driving control including the characteristic processing is executed will be described.

1.3.1 System Configuration Example

Figure 5:
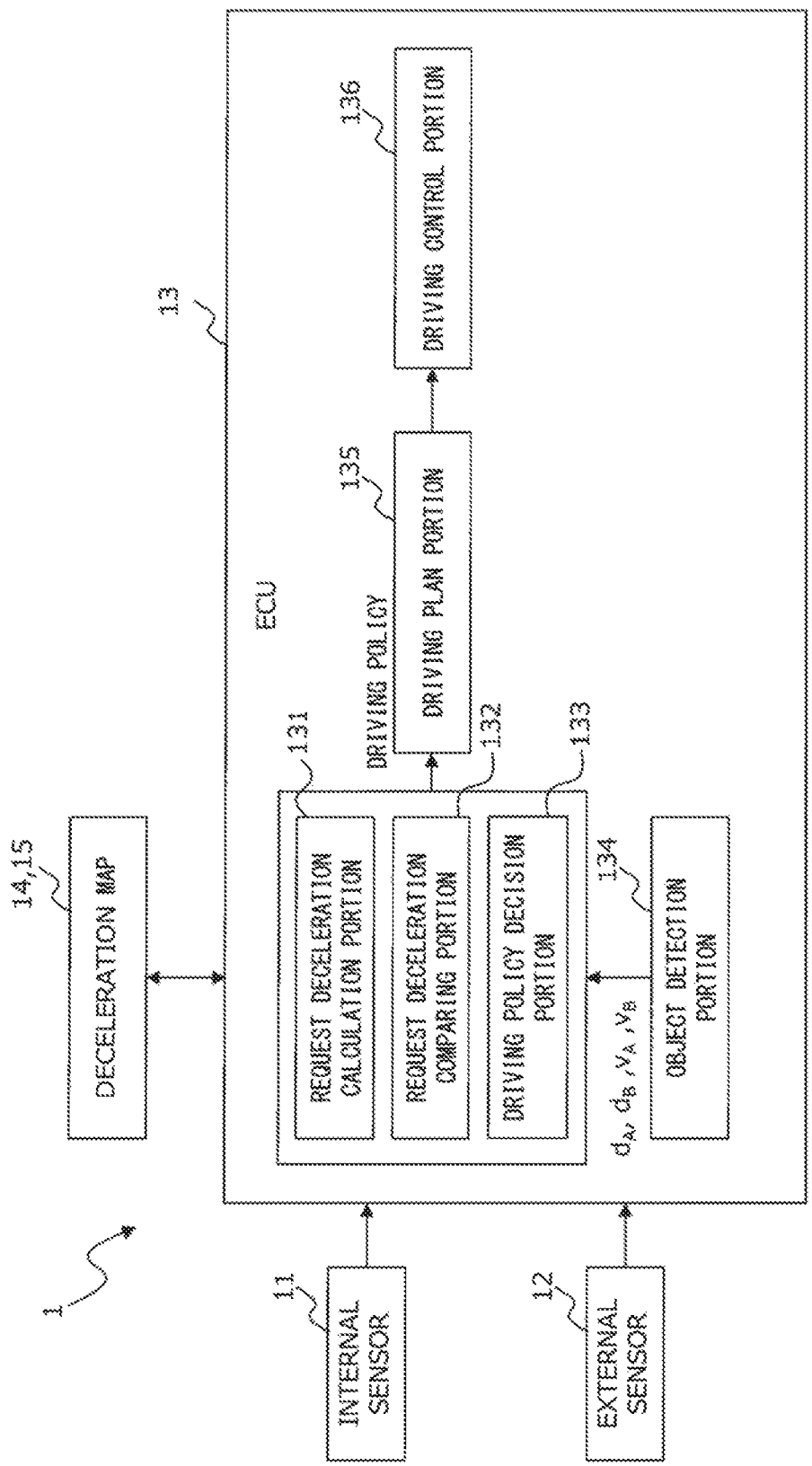
FIG. 5 is a block diagram for showing a configuration example of a vehicle control system according to a first embodiment.

FIG. 5 is a block diagram for showing a configuration example of a vehicle control system 1 according to the first embodiment. As shown in FIG. 5, the system 1 includes an internal sensor 11, an external sensor 12, an ECU (Electric Control Unit) 13 as a controller, and deceleration maps 14 and 15. As shown in FIG. 5, the system 1 includes an internal sensor 11, an external sensor 12, an Electric Control Unit 13 as a controller, and deceleration map 14 and 15.

The internal sensor 11 is a device that detects a driving state of the vehicle M1. The internal sensor 11 includes a vehicle speed sensor, an acceleration sensor and a yaw rate sensor. The vehicle speed sensor detects the driving speed $v_{M1}$. The acceleration sensor detects acceleration $a_{M1}$ of the vehicle M1. The yaw rate sensor detects yaw rate around a vertical axis of a center of gravity of the vehicle M1. The internal sensor 11 transmits the detected data to the ECU 13.

The external sensor 12 is a device that detects condition around the vehicle M1. The external sensor 12 includes a radar sensor and a camera. The radar sensors use radio waves (e.g., millimeter wave) or lights to detect an object around the vehicle M1. The object include the static object and the moving body. The static object includes a guard rail and a building. The moving body includes a walker, a bicycle, a motorcycle, and a vehicle other than the vehicle M1. The camera images situation outside the vehicle M1. The camera is mounted, for example, on a back side of a windshield. The camera may be mounted not only on the back side of the windshield but also on that of a rear glass. The external sensor 12 transmits the detected data to the ECU 13.

The information on the driving state of the vehicle M1 and the information on the situation around the vehicle M1 are included in the driving environment information of the vehicle M1. That is, the internal sensor 11 and the external sensor 12 are included in the "acquiring device to acquire the driving environment information".

The ECU 13 is a microcomputer that includes a processor, a memory, and an input interface and an output interface. The ECU 13 receives a variety of information via the input interface. The ECU 13 also executes automated driving control processing based on the received information. The ECU 13 includes a configuration to execute the automated driving control processing. Details of this configuration will be described in the following section "1.3.2".

The deceleration map 14 is a cell map in which the relationship is specified between the first-class deceleration $-a_{M1}$ the state of the slowdown target OBJ (i.e., the first-class distance $d_A$ and the first-class relative speed $v_A$). The deceleration map 14 is stored in a database that is able to communicate with the ECU 13. The database may be formed in a computer of a facility (e.g., a management center) capable of communicating with the vehicle M1. The deceleration map 14 is set, for example, for each velocity range having a predetermined width. Which deceleration map is used is determined based on a velocity range to which the driving speed $v_{mi}$ belongs.

Figure 6:
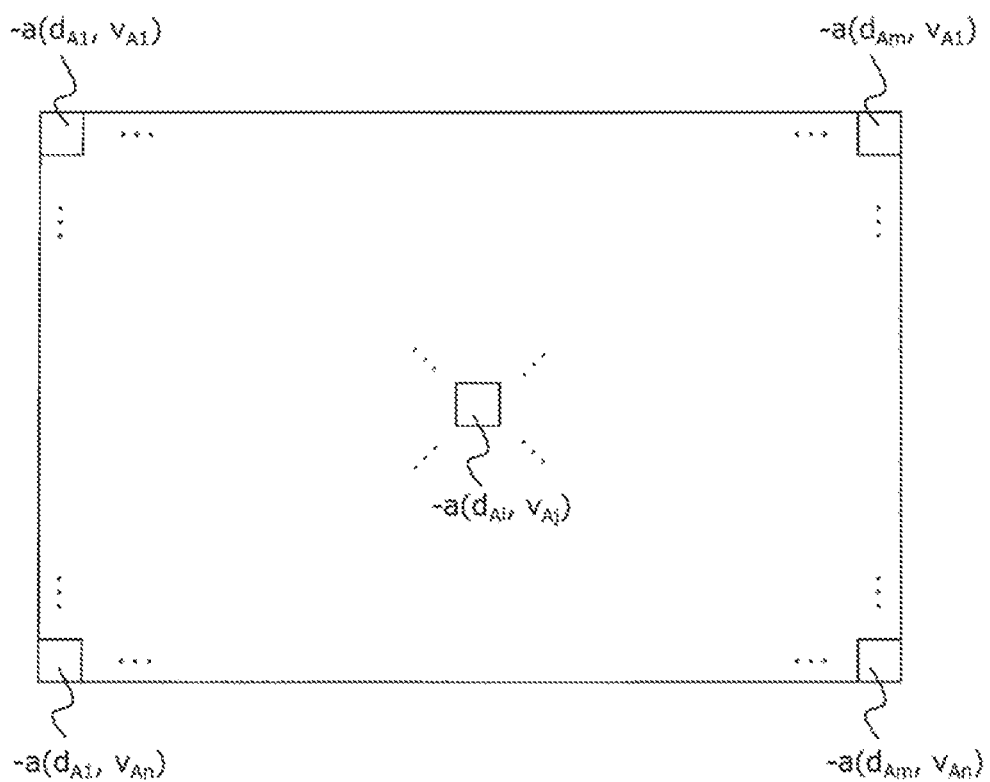
FIG. 6 is a diagram for illustrating an example of a deceleration map for the first-class deceleration.

FIG. 6 is a diagram for explaining an example of the deceleration map 14. As shown in FIG. 6, each of cells $(d_{Ai}, v_{Aj})$ in the deceleration map 14 has the first-class deceleration $-a_{M1}$. Here, "i" is a natural number that satisfies $1 \le i \le n$, "j" is the natural number that satisfies $1 \le j \le m$, and "n" and "m" are natural numbers of 2 or more. The first-class deceleration $-a_{M1}$ assigned to each cell $(d_{Ai}, v_{Aj})$ matches the first-class deceleration $-a_{M1}$ which was assigned to each coordinates $(d_{Ai}, v_{Aj})$ in the first deceleration feature described in FIG. 3. Some of the cells $(d_{Ai}, v_{Aj})$ may be further subdivided. In this case, the first-class deceleration $-a_{M1}$ is given to each of the segmented cells.

The first-class deceleration $-a_{M1}$ assigned to each cell $(d_{Ai}, v_{Aj})$ may not be different values from each other. For example, the first-class deceleration $-a (d_{Ai}, v_{Aj})$ assigned to the cell $(d_{Ai}, v_{Aj})$ and that $-a (d_{Ai+1}, v_{Aj})$ assigned to the cell $(d_{Ai+1}, v_{Aj})$ may be the same. The first-class deceleration $-a (d_{Ai}, v_{Aj})$ and that $-a (d_{Ai+1}, v_{Aj+1})$ assigned to the cell $(d_{Ai+1}, v_{Aj+1})$ may be the same. The first-class deceleration $-a (d_{Ai}, v_{Aj})$ and that $-a (d_{Ai+2}, v_{Aj+1})$ assigned to the cell $(d_{Ai+2}, v_{Aj+1})$ may be the same.

In the deceleration map 14, the cells $(d_{Ai}, v_{Aj})$ whose values of the first-class deceleration $-a_{M1}$ are equal to the value of the first-class boundary are connected from each other. Then the cells $(d_{Ai}, v_{Aj})$ of the deceleration map 14 are allocated to one of the two regions partitioned by the first-class boundary deceleration.

The deceleration map 15 is the cell map in which the relationship is specified between the second-class deceleration $-a_{M3}$ and the state of vehicle M1 as viewed from the vehicle M3 (i.e., the second-class distance $d_B$ and the second-class relative speed $v_B$). The basic configuration of the deceleration map 15 is the same as that of the deceleration map 14. In the explanation of FIG. 6, the "cell $(d_{Ai}, v_{Aj})$" is replaced with the "cell $(d_{Bi}, v_{Bj})$". Further, the "first-class deceleration $-a_{M1}$" is replaced with the "second-class deceleration $-a_{M3}$" and the "first-class boundary deceleration" is replaced with the "second-class boundary deceleration". Then the configuration of the deceleration map 15 is explained by this replacement.

1.3.2 Configuration Example of ECU

As shown in FIG. 5, the ECU 13 includes a request deceleration calculation portion 131, a request deceleration comparing portion 132, a driving policy decision portion 133, an object detection portion 134, a driving plan portion 135, and a driving control portion 136. These function blocks are realized when the processor of the ECU 13 executes various control programs stored in the memory. Hereinafter, for convenience of explanation, the request deceleration calculation portion 131, the request deceleration comparing portion 132 and the like are abbreviated as the "calculation portion 131", the "comparison portion 132" and the like.

The calculation portion 131 calculates a first-class request value. The first-class request value is a request value of the first-class deceleration $-a_{M1}$. The first-class request value is calculated by referring to the deceleration map 14. The deceleration map 14 is referenced by using the information on the state of the slowdown target OBJ. The first-class request value corresponds to all of the first-class deceleration $-a_{M1}$ that correspond to the cell $(d_{Ai}, v_{Aj})$ corresponding to this information. In other words, if there is only one cell $(d_{Ai}, v_{Aj})$ that corresponds to the information, only the first-class deceleration $-a$ $(d_{Ai}, v_{Aj})$ is the first-class request value. If there are two or more cells $(d_{Ai}, v_{Aj})$ that correspond to the information, each of the first-class deceleration $-a_{M1}$ corresponding to the cells is the first-class request value. The calculation portion 131 transmits the first-class request value to the comparison portion 132 and decision portion 133.

The calculation portion 131 also calculates a second-class request value. The second-class request value is a request value of the second-class deceleration $-a_{M3}$. The second-class request value is calculated by referring to the deceleration map 15. The deceleration map 15 is referenced by using the information on the state of the following moving body FMO. In the explanation of the first-class request value described above, the "cell $(d_{Ai}, v_{Aj})$" is replaced with the "cell $(d_{Bi}, v_{Bj})$", and the "first-class deceleration $-a$ $(d_{Ai}, v_{Aj})$" is replaced with the "second-class deceleration $-a$ $(d_{Bi}, v_{Bj})$". This replacement explains the second-class request value. The calculation portion 131 transmits the second-class request value to the comparison portion 132 and the decision portion 133.

The comparison portion 132 compares the first-class minimum value $-a_{M1\_min}$ with the second-class minimum value $-a_{M3\_min}$. The comparison portion 132 first specifies the first-class minimum value $-a_{M1\_min}$ based on the first-class request value received from the calculation portion 131. If only one first-class request value exists, the specified request value is the first-class minimum value $-a_{M1\_min}$. If two or more first-class request values exist, the minimum request value of the first-class deceleration $-a_{M1}$ is the first-class minimum value $-a_{M1\_min}$. The comparison portion 132 also specifies the second-class minimum value $-a_{M3\_min}$. The method to specify the second-class minimum value $-a_{M3\_min}$ is the same as that to specify the first-class minimum value $-a_{M1\_min}$. Then, the comparison portion 132 calculates the magnitude relationship between the two specified types of the minimum values. The comparison portion 132 transmits the result of the comparison to the decision portion 133.

The decision portion 133 determines the driving policy. The decision portion 133 first specifies the first-class minimum value $-a_{M1\_min}$ and the second-class minimum value $a_{M3\_min}$ based on the first-class and second-class request values received from the calculation portion 131. The method to specify these two types of minimum values are described in the explanation of the comparison portion 132. The decision portion 133 subsequently specifies the cell in the deceleration map 15 corresponding to the second-class minimum value $-a_{M3\_min}$ (hereinafter referred to as a "second-class minimum value cell").

Figure 7:
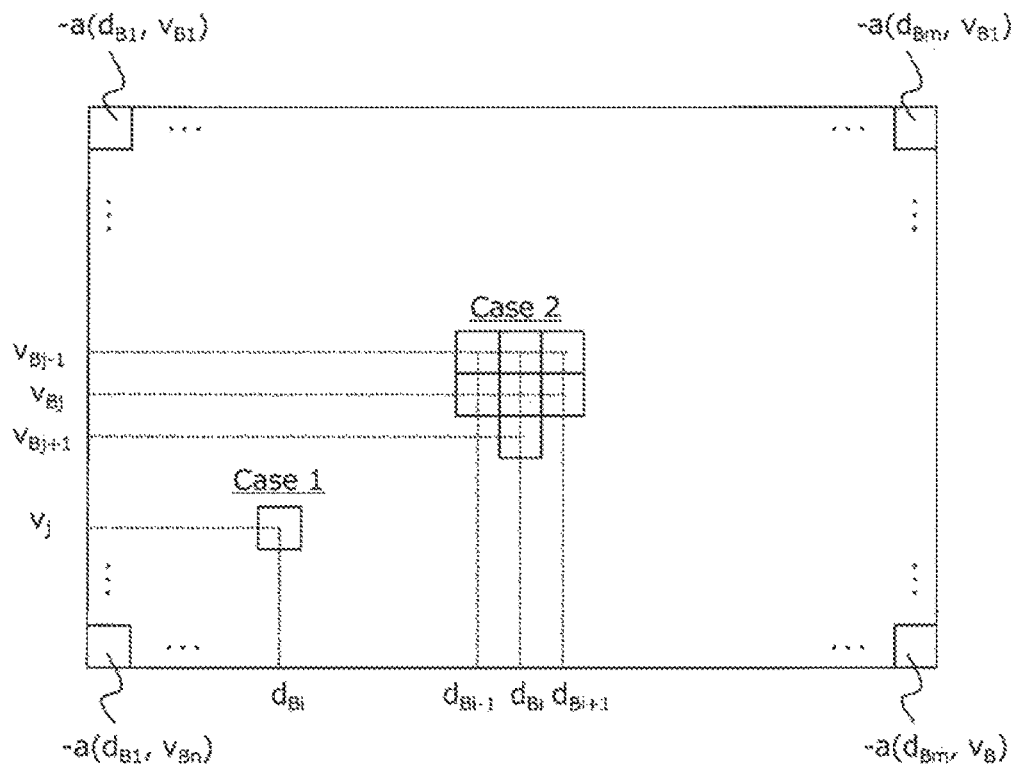
FIG. 7 is a diagram for illustrating an example to specify a segmented area to which a second-class minimum value cell belongs.

The decision portion 133 determines any one of (i) to (iii) below as the driving policy based on the segmented area to which the second-class minimum value cell belongs and the result of the comparison from the comparison portion 132, and transmits the driving policy to the planning portion 135.
(i) Perform the slowdown of the vehicle M1 immediately with the first-class minimum value $-a_{M1\_min}$
(ii) Perform the slowdown of the vehicle M1 immediately with the second-class minimum value $-a_{M3\_min}$
(iii) Postpone the start of the slowdown of the vehicle M1 until the first-class minimum value $-a_{M1\_min}$ is equal to or greater than the second-class minimum value $-a_{M3\_min}$ The above (iii) may be changed as follows.
(iii) Perform slowdown of the vehicle M1 with the deceleration greater than the second-class minimum value $-a_{M3\_min}$ FIG. 7 is a diagram for illustrating an example to specify the segmented area to which the second-class minimum value cell belongs. In FIG. 7, a first case (Case 1) and a second case (Case 2) are shown. In the first case, only the second-class deceleration $-a$ $(d_{Bi}, v_{Bj})$ is the second-class request value. Therefore, in the first case, the second-class deceleration $-a$ $(d_{Bi}, v_{Bj})$ corresponds to the second-class minimum value $-a_{M3\_min}$. Then, by comparing the second-class minimum value $-a_{M3\_min}$ with the second-class boundary deceleration, the second-class minimum value $-a_{M3\_min}$ is allocated to one of the two segmented areas.

In the second case, the second-class deceleration $-a$ $(d_{Bi-1}, v_{Bj-1})$, $-a$ $(d_{Bi-1}, v_{Bj})$, $-a$ $(d_{Bi}, v_{Bj-1})$, $-a$ $(d_{Bi}, v_{Bj})$, $-a$ $(d_{Bi}, v_{Bj+1})$, $-a$ $(d_{B+1}, v_{Bj-1})$, and $-a$ $(d_{Bi+1}, v_{B})$ are included in the second-class request value. Therefore, in the second case, a most rapid deceleration of these request values is the second-class minimum value $-a_{M3\_min}$. Then, by comparing the second-class minimum value $-a_{M3\_min}$ with the second-class boundary deceleration, the second-class minimum value $-a_{M3\_min}$ is allocated to one of the two segmented areas.

The detection portion 134 detects the object based on the information detected by the external sensor 12. The detection portion 134 extracts the information on the state of the slowdown target OBJ from the information on the detected object. Further, the detection portion 134 extracts the information on the state of the following moving body FOB from the information on the detected object. The detection portion 134 transmits the extracted data to the calculation portion 131.

The planning portion 135 plans the driving plan of the automated driving. The planning of the driving plan is executed by repeatedly setting the driving trajectory TP every time the preset time has elapsed, with the current time as a reference. The method to set the driving trajectory TP is not particularly limited, and a known method can be applied. When receiving the driving policy from the decision portion 132, the planning portion 135 changes the information on the driving state in the target position while referring to the plausibility η from the calculation portion 134 appropriately. The planning portion 135 transmits to the control portion 136 the information on the driving trajectory TP including the information on the driving state.

From the decision portion 133, one of the driving policies (i) to (iii) is transmitted. Depending on the contents of the received driving policy, the planning portion 135 reflects the first-class minimum value $-a_{M1\_min}$ or the second-class minimum value $-a_{M3\_min}$ to the target acceleration $a_{M1\_tgt}$, or does not reflect these minimum values to the target acceleration $a_{M1\_tgt}$. Specifically, when the planning portion 135 receives the driving policy (i), it immediately reflects the first-class minimum value $-a_{M1\_min}$ to target acceleration $a_{M1\_tgt}$. When the planning portion 135 receives the driving policy (ii), it immediately reflects the second-class minimum value $-a_{M3\_min}$ to the target acceleration $a_{M1\_tgt}$. When the planning portion 135 receives the driving policy (ii), planning portion 135 prohibits the first-class minimum value $-a_{M1\_min}$ or the second-class minimum value $-a_{M3\_min}$ from being reflected to the target acceleration $a_{M1\_tgt}$.

The control portion 136 determines control amount of the various driving devices based on the information on the driving state such that the vehicle M1 runs on the driving trajectory TP. The driving device is an electronically controlled device and includes a driving force for running output device, a steering device and a brake device.

1.4 Processing Example Executed by ECU

Figure 8:
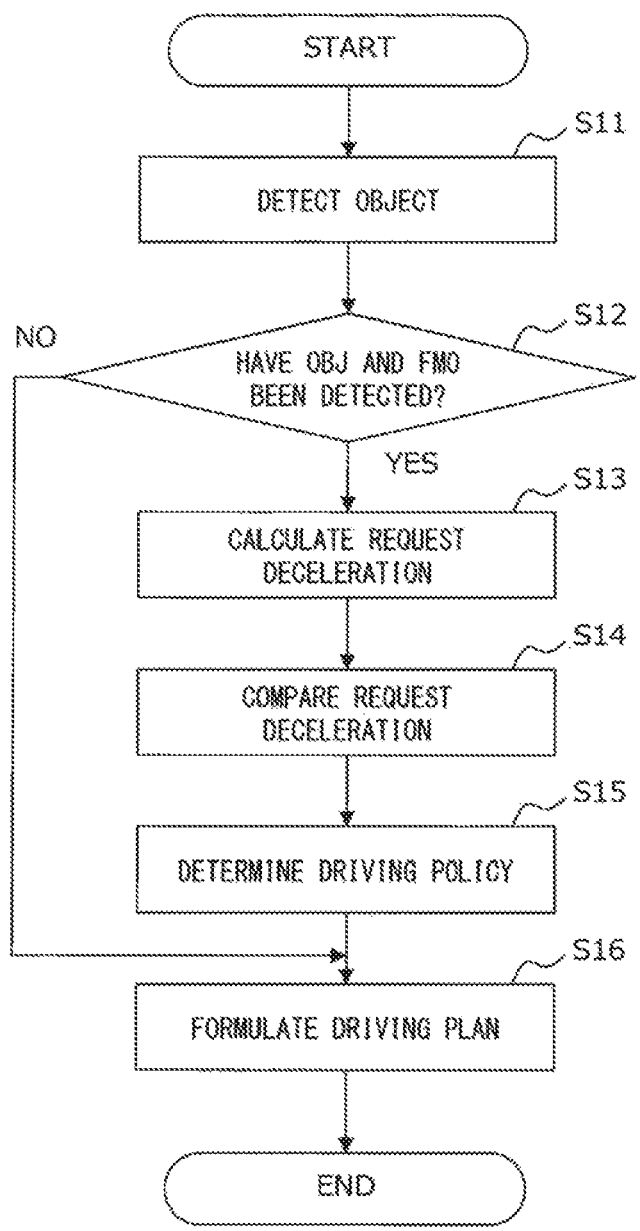
FIG. 8 is a flowchart for illustrating a flow of processing which is executed by an ECU for automated driving control in the first embodiment.

FIG. 8 is a flowchart illustrating a processing flow executed by the ECU 13 to execute the automated driving control. In the routine shown in FIG. 8, the ECU 13 first detects the object (step S11). Specifically, the ECU 13 detects the object based on the information detected by the external sensor 12.

Subsequent to the step S11, the ECU 13 determines whether or not the slowdown target OBJ and the following moving body FMO have been detected (step S12). Specifically, the ECU 13 determines whether or not the information on the object detected in the step S11 includes the information on the state of the slowdown target OBJ and that on the state of the following moving body FOB. If the judgement result of the step S12 is negative, the ECU 13 proceeds to the step S16.

If the judgement result of the step S12 is positive, the ECU 13 calculates the requested deceleration (step S13). Specifically, the ECU 13 calculates required deceleration (i.e., the first-class request value) by referring to the deceleration map 14 with the information on the extracted state of the slowdown target OBJ. The ECU 13 also calculates the requested deceleration (i.e., the second-class request value) by referring to the deceleration map 15 with the information on the extractor state of the following moving body FOB.

Subsequent to the step S13, the ECU 13 compares the requested deceleration (step S14). Specifically, the ECU 13 calculates the first-class minimum value $-a_{M1\_}$min and the second-class minimum value $-a_{M3\_}$min based on the requested deceleration calculated in the step S13. Subsequently, the ECU 13 compares the calculated two types of minimum values to determine the magnitude relationship between them.

Subsequent to the step S14, the ECU 13 determines the driving policy (step S15). Specifically, the ECU 13 calculates the first-class minimum value $-a_{M1\_}$min and the second-class minimum value $-a_{M3\_}$min based on the requested deceleration calculated in the step S13. Subsequently, the ECU 13 specifies the segmented area to which the second-class minimum value cell belongs. Then, the ECU 13 determines the driving policy based on the specified segmented area and the result of the comparison in the step S14. Note that when the second-class minimum value $-a_{M3\_}$min matches the second-class boundary deceleration, for example, the segmented area is specified as follows. First, roman numerals of the phases I and II, which are divided by the boundary deceleration are compared. Then a segmented area corresponding to the phase having a smaller roman numeral is defined as the segmented area to be specified.

In the step S16, the ECU 13 formulates the driving plan. Specifically, the ECU 13 sets the driving trajectory TP repeatedly every time preset time elapses. When the driving policy is determined in the step S15, the target acceleration $a_{M1\_}$tgt is set in accordance with this driving policy. In this way, the driving state in the target position is updated.

1.5 Another System Configuration Example

In another configuration example of the system, instead of the deceleration maps 14 and 15 described with reference to FIG. 6, two types of deceleration model are used. One deceleration model is constructed based on the relationship between the state of the slowdown target OBJ (i.e., the first-class distance $d_A$ and the relative speed $v_A$) and the first-class deceleration $-a_{M1}$. The other deceleration model is constructed based on the relationship between state of following moving body FOB (i.e., second-class distance $d_B$ and the relative speed $v_B$) and the second-class deceleration $-a_{M3}$. Therefore, when the states of the slowdown target OGJ and the following moving body FOB are applied to corresponding deceleration model, the first-class deceleration $-a_{M1}$ and the second-class deceleration $-a_{M3}$ are calculated likewise the case where the deceleration maps 14 and 15 are used. Note that the configuration example in which these deceleration models is used is also applied to the second to fifth embodiments described later.

2. SECOND EMBODIMENT

Next, a second embodiment will be described with reference to FIGS. 9 to 14. Note that descriptions overlapping with those in the first embodiment are omitted as appropriate.

2.1 Assumption

The second embodiment assumes the same situation as that of the first embodiment. Note that the vehicle control system related to the second embodiment is also referred to as a "system" in the following explanation of the second embodiment.

2.1.1 Conceptual of Deceleration Feature

The conceptual of the deceleration feature in the second embodiment is the same as that of the first embodiment. That is, in the second embodiment, the first and second deceleration features are represented.

2.1.2 Problems in Automated Driving Peculiar Phase

The problems of the first and second deceleration features described in the first embodiment also apply to the deceleration features in the second embodiment. First, in the "incomplete detected state phase", the first-class plausibility $\eta_A$ of the coordinate $(d_A, v_A|\eta_A)$ and the second-class plausibility $\eta_B$ of the coordinate $(d_B, v_B|\eta_B)$ are not so high. Further concern is that there is a possibility that more than one coordinate $(d_A, v_A|\eta_A)$ exists simultaneously in the "incomplete detected state phase" of the first deceleration feature. The same is applied to the "incomplete detected state phase" of the second deceleration feature. That is, there is a possibility that more than one coordinate $(d_B, v_B|\eta_B)$ exists simultaneously. Note that the definitions of the first-class plausibility $\eta_A$ and the second-class plausibility $\eta_B$ of the second embodiment are the same as those of the first embodiment.

The second embodiment focuses on the "automated driving peculiar phase" in the first deceleration feature described in FIG. 2, in addition to the "incomplete detected state phase". As described in the first embodiment, the vehicle M1 has the plan to run on the driving trajectory TP in accordance with the execution of the automated driving control. Therefore, it is possible to continue executing the current control until single coordinate $(d_A, v_A|\eta_A)$ is specified. However, if the single coordinate $(d_A, v_A|\eta_A)$ and the first-class is found to be in the "automated driving peculiar phase", the following problems arise. That is, since the slowdown of this case is performed with the deceleration between the first-class maximum deceleration and the first-class middle deceleration, the occupant may be anxious about the running behavior of the vehicle M1.

As described above, in the first deceleration feature, the first-class plausibility $\eta_A$ of the coordinate $(d_A, v_A|\eta_A)$ in a phase where the "automated driving peculiar phase" and the "incomplete detected state phase" overlap is a problem. The occurrence of this problem is unavoidable as long as the "incomplete detected state phase" is defined. On the other hand, in a phase where the "pseudo human phase" and the "incomplete detected state phase" overlap, it does not lead to such a big problem. This is because if the single coordinate $(d_A, v_A|\eta_A)$ is specified and it is found that the first-class state is in the "pseudo human phase", a slower deceleration than the slowdown in the first-class minimum deceleration will be performed. Under such the slower deceleration, the occupant is hardly anxious about the running behavior of the vehicle M1.

2.2 Characteristic of Second Embodiment

In view of the problems described above, in the second embodiment, the driving policy of the vehicle M1 is determined and then reflected to the driving plan as follows.

2.2.1 Determination of Driving Policy

The determination of the driving policy is based on the at least one coordinate $(d_A, v_A|\eta_A)$, and the at least one coordinate $(d_B, v_B|\eta_B)$. The significance of the at least one coordinate $(d_A, v_A|\eta_A)$ and the at least one coordinate $(d_B, v_B|\eta_B)$ is as described the section "1.1.1" of the first embodiment.

The driving policy is determined based on the result of the comparison between the first-class minimum value $-a_{M1}\_min$ and the second-class minimum value $-a_{M3}\_min$. The magnitude relationship of these minimum values is as follows.

$$-a_{M1}\_min \geq -a_{M3}\_min \quad (i)$$

$$-a_{M1}\_min < -a_{M3}\_min \quad (ii)$$

2.2.1.1 In Case of Magnitude Relationship (i)

In the first embodiment, the driving policy in the case (i) is determined to "decelerate the vehicle M1 immediately with the first-class minimum value $-a_{M1}\_min$." On the other hand, in the second embodiment, the driving policy in the case (i) is determined based on a first-class minimum value phase. The "first-class minimum value phase" is defined in the first deceleration feature as a phase to which the coordinate $(d_A, v_A|\eta_A|-a_{M1}\_min)$ belongs.

Figure 9:
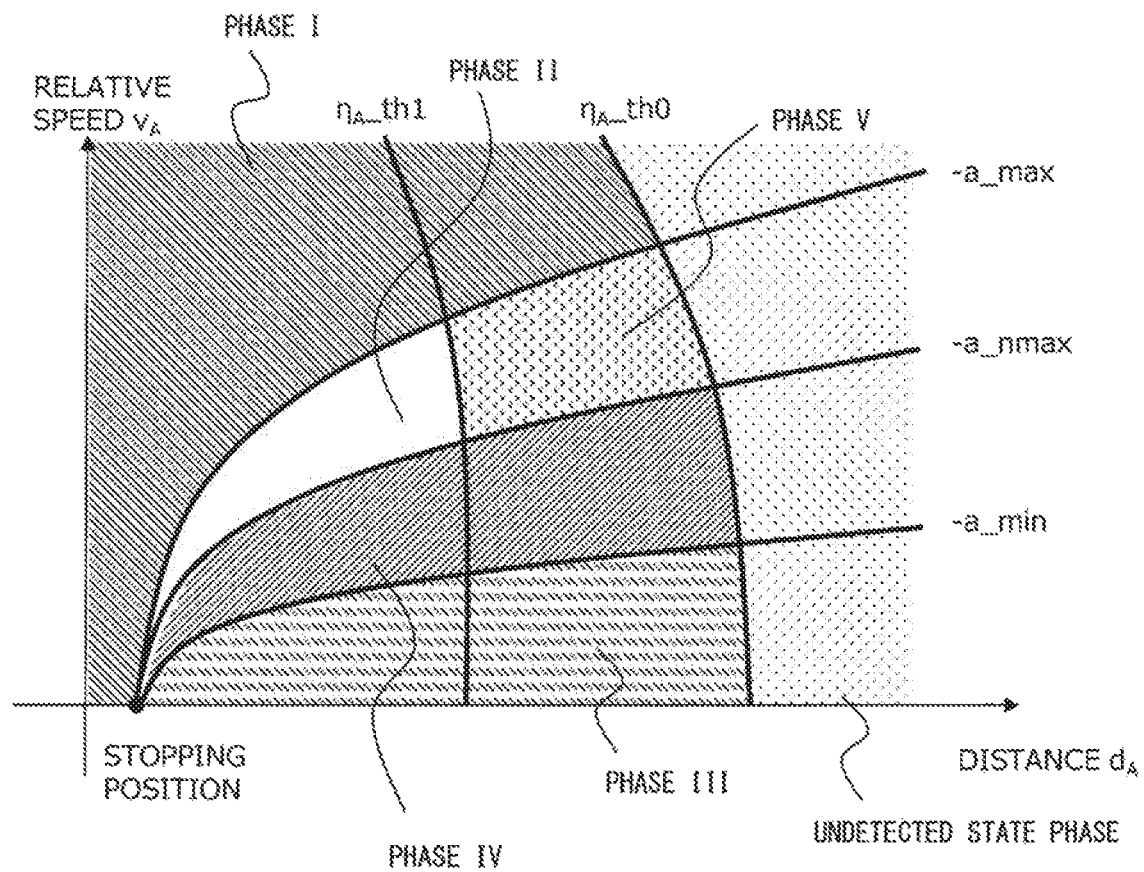
FIG. 9 is a diagram for showing a classification example of the first deceleration feature in the second embodiment.

The idea of the first-class minimum value phase in the second embodiment and determination method of the driving policy will be described with reference to FIG. 9. FIG. 9 is a diagram for showing a classification example of the first deceleration feature in the second embodiment. In FIG. 9, the boundaries of the phases described with reference to FIGS. 2 and 3. In FIG. 9, a part on the left side (i.e., a part closer to the vertical axis) of the boundary that separates the "undetected state phase" and the "incomplete detected state phase" described in FIG. 3 (i.e., the first-class threshold portion closer to the vertical axis $\eta_A\_th0$) is divided into phases I to V.

The phase I is the part on the left side of the first-class threshold $\eta_A\_th0$ in the "collision phase" described in FIG. 2. If the first-class minimum value phase corresponds to the phase I, the driving policy is determined to "decelerate the vehicle M1 immediately at the first-class minimum value $-a_{M1}\_min$." The reason for this is that if the first-class minimum value phase corresponds to the phase I, it is determined that the vehicle M1 is more likely to collide with the vehicle M2. Therefore, in this case, the driving policy is determined as described above.

The phase II is the part on the left side of the first-class threshold $\eta_A\_th1$ in the "automated driving peculiar phase" described in FIG. 2. If the first-class minimum value phase corresponds to the phase II, the driving policy is determined to "decelerate the vehicle M1 immediately with the first-class minimum value $-a_{M1}\_min$." The reason for this is the same as that described in the driving policy which is determined if the first-class minimum value phase corresponds to the phase I. As described above, in the case where the first-class minimum value phase corresponds to the phase I or II, the driving policy is selected to prioritize the driving safety (i.e., to avoid the collision with the vehicle M2) than the driving efficiency.

The phase III is a part on the left side of the first-class threshold $\eta_A\_th0$ in the "free phase" described in FIG. 2. If the first-class minimum value phase corresponds to the phase III, the driving policy is determined to "maintain current acceleration or deceleration". This is because the collision with the vehicle M2 can be easily avoided without performing the slowdown of the vehicle M1. As described above, if the first-class minimum value phase corresponds to the phase III, the driving policy is selected to prioritize the driving efficiency than the driving safety. In this case, "speedup of the vehicle M1 such that the driving speed $v_{M1}$ does not exceed an upper limit" may be applied as the driving policy.

The phase IV is the part on the left side of the first-class threshold $\eta_A\_th0$ in the "pseudo human phase" described in FIG. 2. If the first-class minimum value phase corresponds to the phase IV, the driving policy is determined to postpone the start of the slowdown until the first-class plausibility $\eta_A$ of the coordinate $(d_A, v_A|\eta_A|-a_{M1}\_min)$ is equal to or greater than a first-class threshold $\eta_A\_th2$. This is because there is a possibility that the collision with the vehicle M2 is avoided even if the slowdown of the vehicle M1 is not performed immediately. As described above, if the first-class minimum value phase corresponds to the phase IV, the driving policy is selected to perform appropriate driving in accordance with the current situation. Note that the first-class threshold $\eta_A\_th2$ corresponds to the first-class threshold $\eta_A$ when a certain accuracy is recognized in the detection of the vehicle M2. The first-class threshold $\eta_A\_th2$ satisfies $\eta_A\_th0 < \eta_A\_th2 < \eta_A\_th1$.

The phase V is the part between the first-class thresholds $\eta_A\_th0$ and $\eta_A\_th1$ in the "automated driving peculiar phase" described in FIG. 2. If the first-class minimum value phase corresponds to the phase V, the driving policy is determined to "perform the slowdown by changing the first-class minimum value $-a_{M1}\_min$ according to the first-class plausibility $\eta_A$ of coordinate $(d_A, \min)$". The reason for this is that the detection of the state of the vehicle M2 (hereinafter referred to as a "first-class state" in the following description in the second embodiment) is uncertain if the first-class minimum value phase corresponds to the phase V. Thus, in this case, the driving policy is selected to maintain a balance of the driving safety and the driving efficiency.

2.2.1.2 In Case of Magnitude Relationship (ii)

The driving policy of the relationship (ii) is determined based on the second-class minimum value phase. However, in the second embodiment, not only the first deceleration feature but also the second deceleration feature are classified into the phases I to V. Note that the phases I to V in the second deceleration feature are explained by replacing the explanation in FIG. 9. In this replacement, the replacement in the explanation of FIG. 3 is applied appropriately.

If the second-class minimum value phase corresponds to the phase I or II, the driving policy is determined to "perform the slowdown of the vehicle M1 immediately with the second-class minimum value $-a_{M3}\_min$." The reason for this is that if the second-class minimum value phase corresponds to the phase I or II, it is determined that the vehicle M1 is more likely to be collided from the vehicle M3. Therefore, if the second-class minimum value phase corresponds to the phase I or II, driving policy is selected to prioritize the driving safety (i.e., to avoid the rear-end collision from the vehicle M3) than the driving efficiency.

If the second-class minimum value phase corresponds to the phase III, the driving policy is determined to "maintain current acceleration or deceleration". This is because the rear-end collision from the vehicle M3 can be easily avoided without performing the slowdown of the vehicle M1. Therefore, if the second-class minimum value phase corresponds to the phase III, the driving policy is selected to prioritize the driving efficiency than the driving safety. In this case, "speedup of the vehicle M1 such that the driving speed $v_{M1}$ does not exceed an upper limit" may be applied as the driving policy.

If the second-class minimum value phase corresponds to the phase IV, the driving policy is determined to "postpone the start of the slowdown until the second-class plausibility $\eta_B$ of the coordinate $(d_B, v_B|\eta_B|-a_{M3}\_min)$ is equal to or greater than a second-class threshold $\eta_B\_th2$. This is because there is a possibility that the rear-end collision from the vehicle M3 is avoided even if the slowdown of the vehicle M1 is not performed immediately. As described above, when the second-class minimum value phase corresponds to the phase IV, the driving policy is selected to perform appropriate driving in accordance with the current situation. The second-class threshold $\eta_B\_th2$ corresponds to the second-class threshold $\eta_B$ when a certain accuracy is recognized in the detection of the vehicle M3. The second-class threshold $\eta_B\_th2$ satisfies $\eta_B\_th0 < \eta_B\_th2 < \eta_B\_th1$.

If the second-class minimum value phase corresponds to the phase V, the driving policy is determined to "perform the slowdown by changing the second-class minimum value $-a_{M3}\_min$ according to the second-class plausibility $\eta_B$ of the coordinate $(d_B, v_B|\eta_B|-a_{M3}\_min)$". The reason for this is that the detection of the state of the vehicle M1 as viewed from the vehicle M3 (hereinafter referred to as a "second-class state" in the following description in the second embodiment) is uncertain if the second-class minimum value phase corresponds to the phase V. As described above, if the second-class minimum value phase corresponds to the phase V, the driving policy is selected to maintain the balance of the driving safety and the driving efficiency.

2.2.2 Reflection of Driving Policy

The reflection of the driving policy is performed on the driving plan. The method to design the driving plan is basically the same as that of the first embodiment.

Focusing on the first-class minimum value phase, the second-class minimum value phase and the magnitude relationship between the first-class minimum value $-a_{M1}\_min$ and the second-class minimum value $-a_{M3}\_min$, the driving policies described above are summarized as follows.

(i) In case of $-a_{M1}\_min \geq -a_{M3}\_min$ (i-a) If the first-class minimum value phase corresponds to the phase I or II Perform the slowdown of the vehicle M1 immediately with the first-class minimum value $-a_{M1}\_min$ (i-b) If the first-class minimum value phase corresponds to the phase III Maintain current acceleration or deceleration (i-c) If the first-class minimum value phase corresponds to the phase IV Postpone the start of the slowdown until the first-class plausibility $\eta_A$ of the coordinate $(d_A, v_A|\eta_A|-a_{M1}\_min)$ is equal to or greater than the first-class threshold $\eta_A\_th2$ (i-d) If the first-class minimum value phase corresponds to the phase V Perform the slowdown by the first-class minimum value $-a_{M1}\_min$ according to the first-class plausibility $\eta_A$ of the coordinate $(d_A, v_A|\eta_A|-a_{M1}\_min)$ (ii) In case of $-a_{M1}\_min < -a_{M3}\_min$ (ii-a) in case of the second-class minimum value phase corresponds to the phase I or II Perform the slowdown of the vehicle M1 immediately with the second-class minimum value $-a_{M3}\_min$ (ii-b) In case of the second-class minimum value phase corresponds to the phase III Maintain current acceleration or deceleration (ii-c) In case of the second-class minimum value phase corresponds to the phase IV Postpone the start of the slowdown until the second-class plausibility $\eta_B$ of the coordinate $(d_B, v_B|\eta_B|-a_{M3}\_min)$ is equal to or greater than the second-class threshold $\eta_B\_th2$.

(ii-d) In case of the first-class minimum value phase corresponds to the phase V Perform the slowdown by changing the second-class minimum value $-a_{M3}\_min$ according to the second-class plausibility $\eta_B$ of the coordinate $(d_B, v_B|\eta_B|-a_{M3}\_min)$ According to the driving policy (i-a), the first-class minimum value $-a_{M1}\_min$ is immediately reflected to the target acceleration $a_{M1}\_tgt$. On the other hand, according to the driving policy (i-b), the first-class minimum value $-a_{M1}\_min$ is not reflected to the target acceleration $a_{M1}\_tgt$ at all. Here, focusing on a reflection degree of the first-class minimum value $-a_{M1}\_min$ to the target acceleration $a_{M1}\_tgt$ (hereinafter also referred to as a "first reflection degree"). Then the first reflection degree of the driving policy (i-a) is 100% and that of the driving policy (i-b) is 0%.

Figure 10:
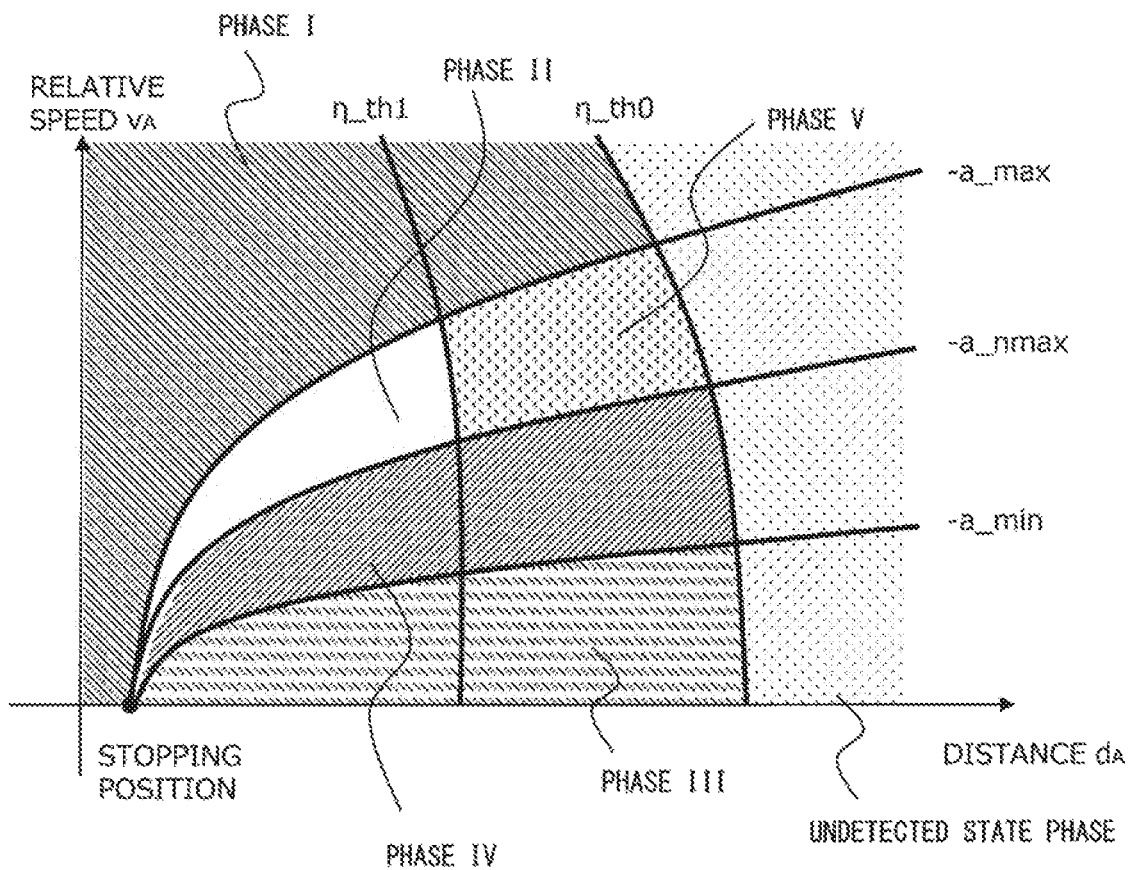
FIG. 10 is a diagram for explaining a reflection method of a driving policy (i-c)

According to the driving policy (i-c), the first reflection degree is changed according to the result of comparing with the first-class threshold $\eta_A\_th2$. FIG. 10 is a diagram for explaining the reflection method of the driving policy (i-c). In FIG. 10, the phases I to V explained in FIG. 9 are drawn. However, for convenience of explanation, the curve of the first-class threshold $\eta_A\_th0$ is omitted. In addition, a part of the curves of the first-class thresholds $\eta_A\_th1$ and $\eta_A\_th2$ are omitted. The black circle shown in the phase IV of FIG. 10 represents the coordinate $(d_A, v_A|\eta_A|-a_{M1}\_min)$. In the example shown in FIG. 10, it is assumed that the first-class threshold $\eta_A$ of coordinate $(d_A, v_A|\eta_A|-a_{M1}\_min)$ increases to a value equal to or greater than the first-class threshold $\eta_A\_th2$ during a process in which the vehicle M1 approaches the vehicle M2 (hereinafter referred to as an "approaching process" in the following explanation of the second embodiment).

According to the driving policy (i-c), if the first-class plausibility $\eta_A$ of the coordinate $(d_A, v_A|\eta_A|-a_{M1}\_min)$ is less than the first-class threshold $\eta_A\_th2$, the first-class minimum value $-a_{M1}\_min$ is not reflected to the target acceleration $a_{M1}\_tgt$. If the first-class plausibility $\eta_A$ of the coordinate $(d_A, v_A|\eta_A|-a_{M1}\_min)$ is equal to or greater than the first-class threshold $\eta_A\_th2$, the first-class minimum value $-a_{M1}\_min$ is reflected to the target acceleration $a_{M1}\_tgt$. Thus, according to the driving policy (i-c), the first reflection degree is changed between 0% and 100%.

In FIG. 10, two types of trajectories are drawn on the left side of the first-class threshold $\eta_A\_th2$. The trajectory shown in the solid line (i.e., Case 1) represents the approaching process where the detection of the vehicle M2 was correct. The trajectory shown in the broken line (i.e., Case 2) represents the approaching process where this detection was really wrong. Note that the broken line trajectory is a trajectory shown for convenience of explanation. This is because, in the case of the false detection, the coordinate $(d_A,$ $v_A|\eta_A|-a_{M1\_}$min) does not exist on the deceleration feature during the approaching process.

Figure 11:
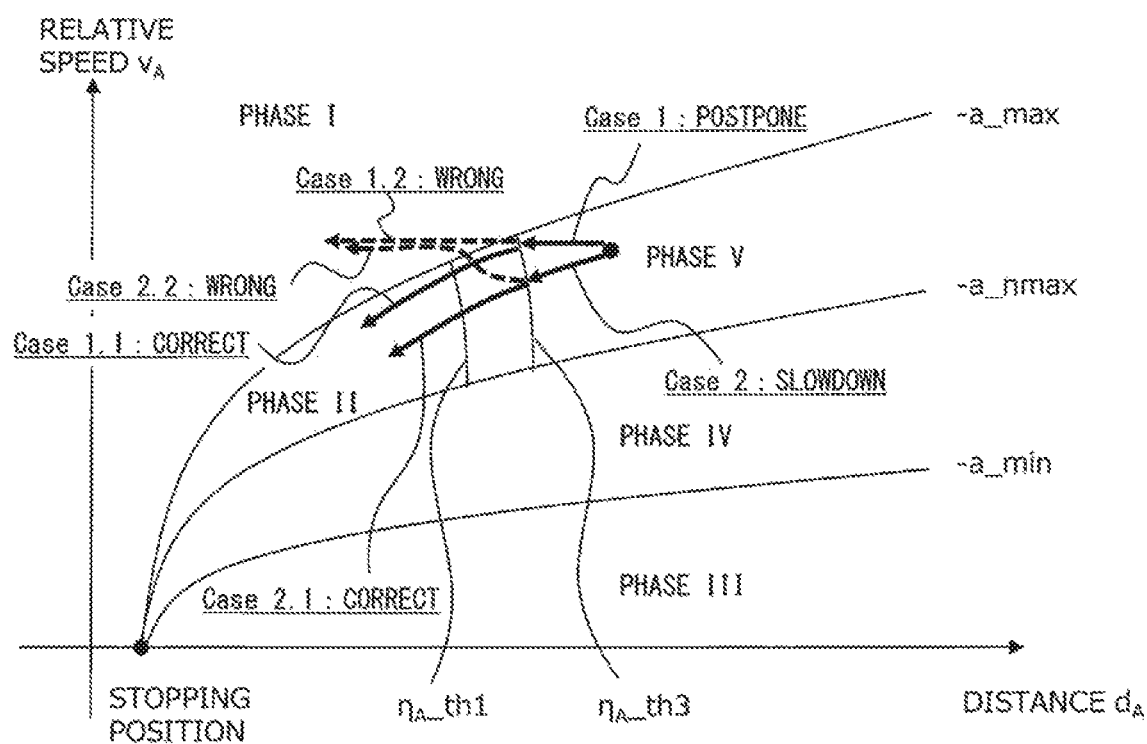
FIG. 11 is a diagram for explaining a reflection method of a driving policy (i-d)
Figure 12:
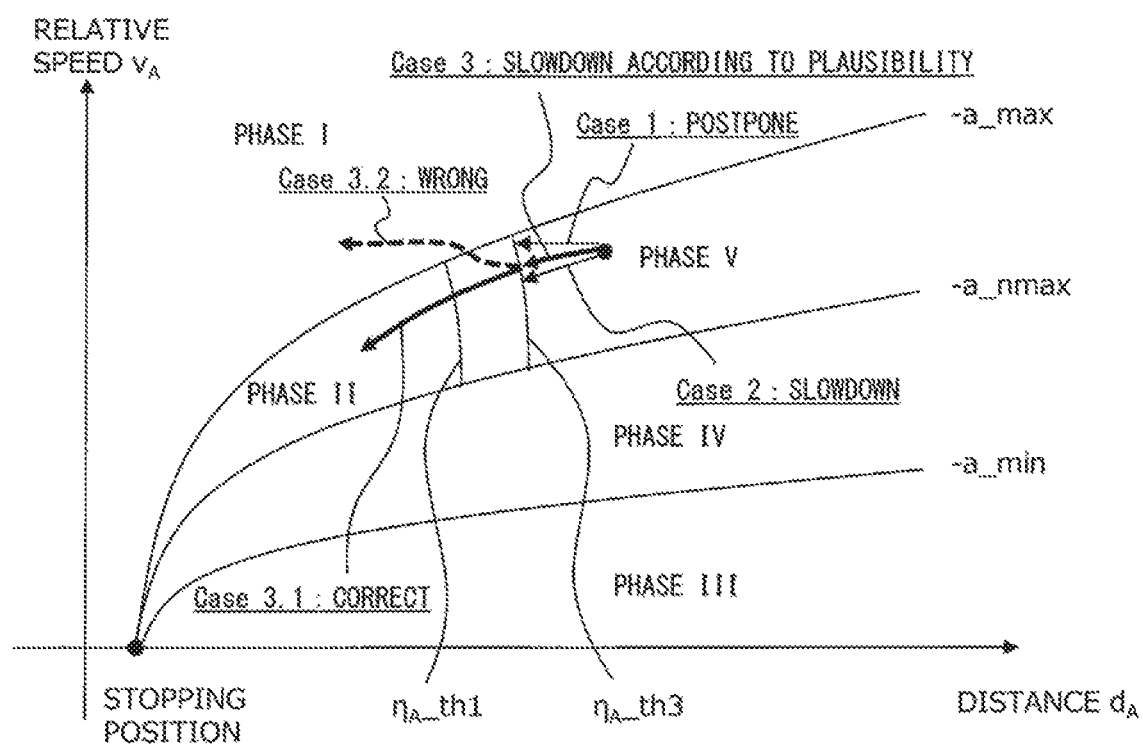
FIG. 12 is a diagram for explaining a reflection method of a driving policy (i-d)

According to the driving policy (i-d), the first reflection degree is change in accordance with the first-class threshold $\eta_A$ of the coordinate $(d_A, v_A|\eta_A|-a_{M1\_}$min). FIGS. 11 and 12 are diagrams for explaining the reflection method of the driving policy (i-d). The curves shown in these figures are basically the same as the curves shown in FIG. 10. However, in FIGS. 11 and 12, the curve of the first-class threshold $\eta_{A\_}$th3 is drawn instead of the curve of the first-class threshold $\eta_{A\_}$th2. The definition of the first-class threshold $\eta_{A\_}$th3 is the same as that of the first-class threshold $\eta_{A\_}$th2. The first-class threshold $\eta_{A\_}$th3 may be the same value as the first-class threshold $\eta_{A\_}$th2 or may be different value from the first-class threshold $\eta_{A\_}$th2. The black circles shown in the phase V of FIGS. 11 and 12 represents the coordinate $(d_A, v_A|\eta_A|-a_{M1\_}$min). In the examples shown in FIGS. 11 and 12, it is assumed that, during the approaching process, that the plausibility $\eta_A$ of these coordinate is increased to a value equal to or greater than the first-class threshold $\eta_{A\_}$th3.

In FIG. 11, two types of trajectories are drawn to the right of the first-class threshold $\eta_{A\_}$th3. The first trajectory (i.e., Case 1) represents the approaching process in which the start of the slowdown is postponed. The second trajectory (i.e., Case 2) represents the approaching process in which the slowdown is performed immediately. In FIG. 11, four types of trajectories are also drawn on the left side of the first-class threshold $\eta_{A\_}$th3. The trajectories shown in solid line (i.e., Cases 1.1 and 2.1) represent the approaching process where the detection of the vehicle M2 was correct. The trajectories shown in the broken line (i.e., Cases 1.2 and 2.2) represent the approaching process where the detection was really wrong. Note that, as explained in FIG. 10, the broken line trajectory is a trajectory which is drawn for convenience of explanation.

The case 1.2 corresponds to a case where the postponement performed in the case 1 did not result in a problem. The result in the case 1.2 is also applied to the case 2.1. However, in the case 1.1, since the postponement has been performed, the minimum value $-a_{M1\_}$min becomes smaller after the start of the slowdown (i.e., rapid deceleration is performed). In the case 2.2, a speedup is performed immediately after the start of the slowdown. Therefore, in the cases 1.1 and 2.2, the occupant may anxious about the running behavior of the vehicle M1.

In this regard, according to the driving policy (i-d), the first-class minimum value $-a_{M1\_}$min is changed in accordance with the first-class plausibility $\eta_A$ of $(d_A, v_A|\eta_A|-a_{M1\_}$min). In FIG. 12, three types of trajectories are drawn on the right side of the first-class threshold $\eta_{A\_}$th3. The first and second trajectories (i.e., Cases 1 and 2) are the same as those shown in FIG. 11. The third trajectory (i.e., Case 3) represents the approaching process in which the slowdown is performed with the first-class minimum value $-a_{M1\_}$min obtained by multiplying a coefficient α (0<α<1). The coefficient α is designed to approach 1 as the first-class plausibility $\eta_A$ of the coordinate increases. As described above, the first reflection degree of the driving policy (i-d) is 100·α%, thereby a slow deceleration is performed.

In FIG. 12, two types of trajectories are also drawn on the left side of the first-class threshold $\eta_{A\_}$th3. The trajectory shown in the solid line (i.e., Case 3.1) represents the approaching process where the detection of the vehicle M2 was correct. The trajectory shown in the broken line (i.e., Case 3.2) represents the approaching process where this detection was really wrong. Unlike the cases 1.1 and 2.2 described with reference to FIG. 11, beginnings of the trajectories in the cases 3.1 and 3.2 lead to an end of the trajectory of the case 3. Therefore, when comparing the cases 1 to 3, feeling of strangeness on the running behavior of the vehicle M1 is suppressed in the case 3.

The contents of the driving policies (ii-a) to (ii-d) are basically the same as those of the driving policies (i-a) to (i-d). The description of FIGS. 10 to 12 is applied to the driving policies (ii-a) to (ii-d). In this replacement of the explanation of FIG. 3, the replacement of terms in FIG. 3 is applied appropriately. However, the "approaching process" is understood the meaning of a "process in which the vehicle M3 approaches the vehicle M1". Also, the "detection of the vehicle M1" is replaced with the "detection of the vehicle M3" and "the first reflection degree" is replaced as a "second reflection degree". The "second reflection degree" is defined as a reflection degree of the second-class minimum value $-a_{M3\_}$min to the target acceleration $a_{M1\_}$tgt. The "running behavior of the vehicle M1" is not subject to the replacement.

2.2.3 Effect

According to the characteristics of the second embodiment, the first-class plausibility $\eta_A$ of the coordinate $(d_A, v_A|\eta_A|-a_{M1\_}$min), or the second-class plausibility $\eta_B$ of the coordinate $(d_B, v_B|\eta_B|-a_{M3\_}$min) is considered to determine the driving policy. The first-class minimum value $-a_{M1\_}$min or the second-class minimum value $-a_{M3\_}$min is reflected to the target acceleration $a_{M1\_}$tgt with the reflection degree of 0 to 100% (that is, the first or second reflection degree). Therefore, it is possible to obtain effects equal to or higher than the effects by the characteristics of the first embodiment.

2.3 Vehicle Control System

Next, a configuration example of the system in which the automated driving control including the characteristic processing is executed will be described.

2.3.1 System Configuration Example

Figure 13:
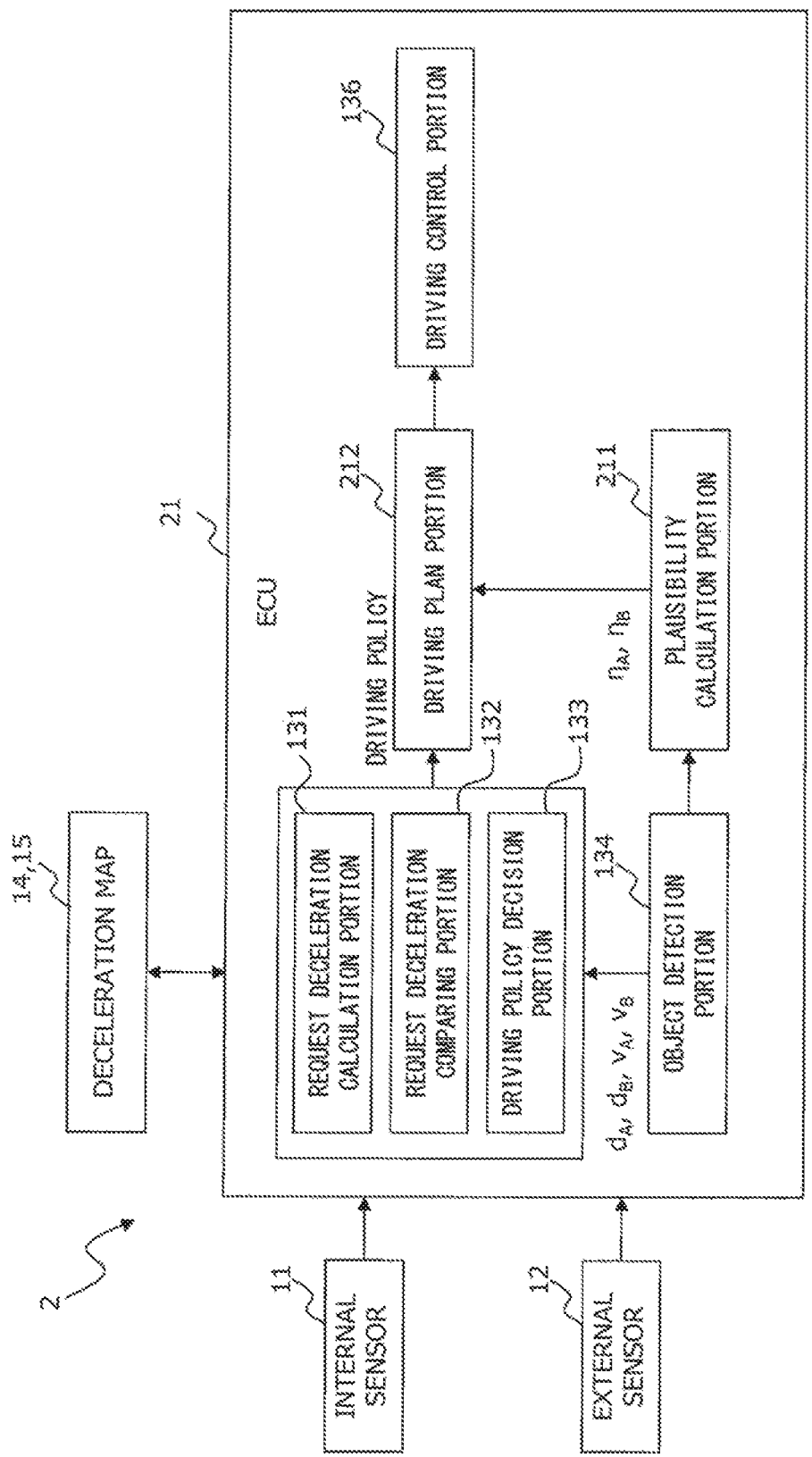
FIG. 13 is a block diagram for showing a configuration example of a vehicle control system according to a second embodiment.

FIG. 13 is a block diagram for showing a configuration example of a vehicle control system 2 according to the second embodiment. As shown in FIG. 13, the vehicle control system 2 comprises an ECU 21. The internal sensor 11, the external sensor 12 and the deceleration maps 14 and 15 are common to the configuration example of the system 1 shown in FIG. 5.

2.3.2 Configuration Example of ECU

As shown in FIG. 13, the ECU 21 comprises a plausibility calculation portion 211 and a driving plan portion 212. The other functions except for the plausibility calculation portion 211 and the driving plan portion 212 are the same as those of the ECU 13 shown in FIG. 5. These function blocks are realized when the processor of the ECU 21 executes various control programs stored in the memory. Hereinafter, for convenience of explanation, the plausibility calculation portion 211, the driving plan portion 212 and the like are abbreviated as the "calculation portion 211", the "planning portion 212" and the like.

The calculation portion 211 calculates the first-class plausibility $\eta_A$ and the second-class plausibility $\eta_B$. The first-class plausibility $\eta_A$ is calculated, for example, as a probability L of a plausibility model with a probability ρ is used as a variable in which the state of the slowdown target OBJ is correctly detected. If there are more than two states of the slowdown target OBJ, then the first-class plausibility $\eta_A$ is calculated for each of these state. Second-class plausibility $\eta_B$ is calculated, for example, by applying a model similar to plausibility model described above to following moving body FOB. The calculation portion 211 transmits the calculated first-class plausibility $\eta_A$ and the second-class plausibility $\eta_B$ to the planning portion 212.

The planning portion 212 plans the driving plan of the automated driving. The basic function of the planning portion 212 is the same as that of the planning portion 135 shown in FIG. 5. When the planning portion 212 receives the driving policy from the decision portion 133, it changes the information on the driving state in the target position while referring to the first-class plausibility $\eta_A$ and the second-class plausibility $\eta_B$ received from the calculation portion 211 appropriately. The planning portion 212 transmits to the control portion 136 the information on the driving trajectory TP including the information on the driving state.

From the decision portion 133, one of the driving policies (i-a) to (ii-d) is transmitted. The planning portion 212 reflects the first-class minimum value $-a_{M1\_}min$ or the second-class minimum value $-a_{M3\_}min$ to the target acceleration $a_{M1\_}tgt$, depending on the contents of the received driving policy. Otherwise, the planning portion 212 does not reflect any of these minimum values to the target acceleration $a_{M1\_}tgt$.

When the driving policy (i-a) is received, the planning portion 212 immediately reflects the first-class minimum value $-a_{M1\_}min$ to the target acceleration $a_{M1\_}tgt$. When the driving policy (i-c) is received and also the first-class plausibility $\eta_A$ corresponding to a first-class minimum value cell is equal to or greater than the first-class threshold $\eta_{A\_}th2$, the planning portion 212 immediately executes the reflection of the first-class minimum value $-a_{M1\_}min$. The "first-class minimum value cell" is defined as a cell on the deceleration map 14 that corresponds to the first-class minimum value $-a_{M1\_}min$.

When the driving policy (i-b) is received, the planning portion 212 prohibits the first-class minimum value $-a_{M1\_}min$ from being reflected to the target acceleration $a_{M1\_}tgt$. When the driving policy (i-c) is received and also the first-class minimum value cell that corresponds to the first-class plausibility $\eta_A$ is less than the first-class threshold $\eta_{A\_}th2$, the planning portion 212 prohibits the reflection of first-class minimum value $-a_{M1\_}min$.

When the driving policy (i-d) is received, the planning portion 212 changes the first-class minimum value $-a_{M1\_}min$ in accordance with the first-class plausibility $\eta_A$ corresponding to the first-class minimum value cell. The first-class minimum value $-a_{M1\_}min$ is changed by multiplying the coefficient $\alpha$ by the first-class minimum value $-a_{M1\_}min$.

When the driving policy (ii-a) is received, the planning portion 212 immediately reflects the second-class minimum value $-a_{M3\_}min$ to the target acceleration $a_{M1\_}tgt$. When the driving policy (ii-c) is received and also the second-class minimum value cell that corresponds to the second-class plausibility $\eta_B$ is equal to or greater than the second-class threshold $\eta_{B\_}th2$, the planning portion 212 immediately executes the reflection of the second-class minimum value $-a_{M3\_}min$.

When the driving policy (ii-b) is received, the planning portion 212 prohibits the second-class minimum value $-a_{M3\_}min$ from being reflected to the tgt target acceleration $a_{M1}$. When the driving policy (ii-c) is received and also the second-class minimum value cell that corresponds to the second-class plausibility $\eta_B$ is less than the second-class threshold $\eta_{B\_}th2$, the planning portion 212 prohibits the reflection of the second-class minimum value $-a_{M1\_}min$.

When the driving policy (ii-d) is received, the planning portion 212 changes the second-class minimum value $-a_{M3\_}min$ in accordance with the second-class plausibility $\eta_B$ corresponding to the second-class minimum value cell. The second-class minimum value $a_{M3\_}min$ is changed by multiplying the coefficient $\alpha$ by the second-class minimum value $-a_{M3\_}min$.

2.4 Processing Example Executed by ECU

Figure 14:
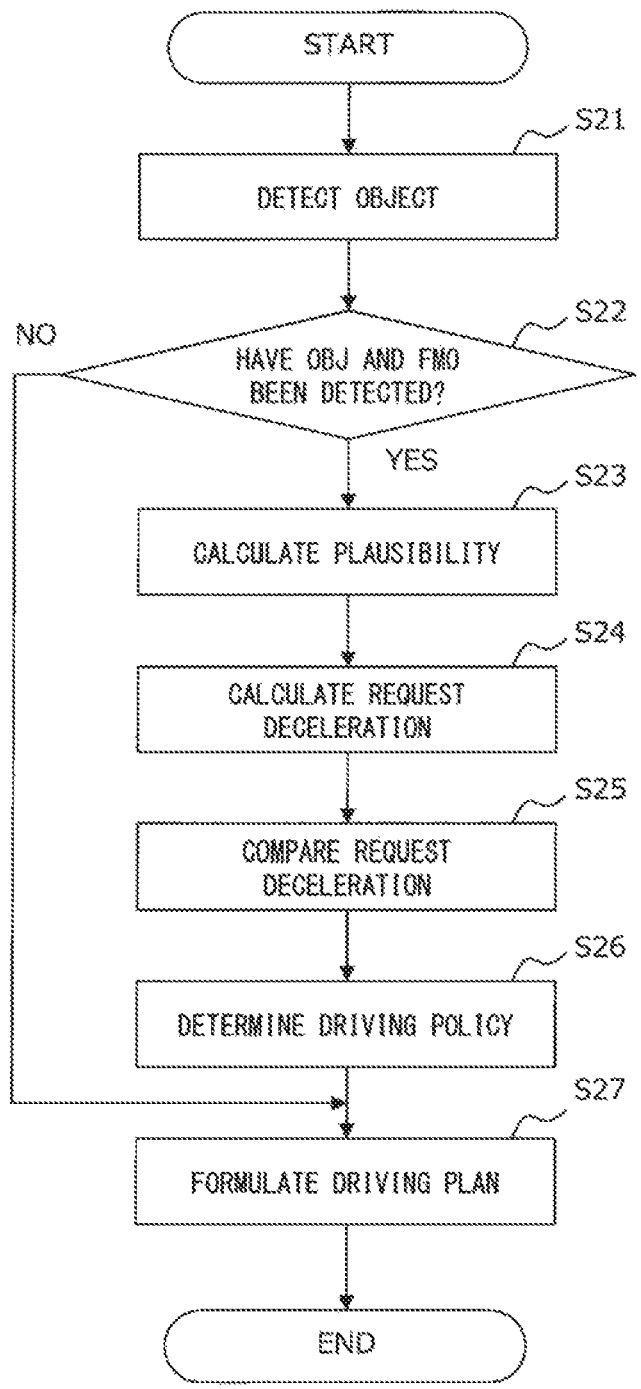
FIG. 14 is a flowchart for illustrating a flow of processing which is executed by the ECU for the automated driving control in the second embodiment.

FIG. 14 is a flowchart for illustrating a processing flow executed by the ECU 21 to execute the automated driving control. In the routine shown in FIG. 14, the ECU 21 executes the processing of steps S21 and S22. The processing of these steps is the same as that of the steps S11 and S12 shown in FIG. 8. If the judgement result of the step S22 is negative, the ECU 21 proceeds to step S27.

If judgement result of the step S22 is positive, the ECU 21 calculates the first-class plausibility $\eta_A$ and the second-class $\eta_B$ (step S23). Specifically, the ECU 21 extracts the information on the state of the slowdown target OBJ from the information on the object and calculates first-class plausibility $\eta_A$. If more than one information on the state of the slowdown target OBJ is included in the information on the object, the ECU 21 calculates the first-class plausibility $\eta_A$ for each of these states. The ECU 21 also extracts the information on the state of the following moving body FOB from the information of the object and then calculates the second-class plausibility $\eta_B$.

Subsequent to the step S23, the ECU 21 executes processing of steps from S24 to S26. The processing of these steps is the same as that of the steps from S13 to S15 shown in FIG. 8.

In the step S27, the ECU 21 calculates the driving plan. Specifically, the ECU 21 sets the driving trajectory TP repeatedly every time preset time elapses. When the driving policy is determined in the step S26, the ECU 21 reflects the first-class minimum value $-a_{M1\_}min$ and the second-class plausibility $\eta_B$ calculated in the step S23 to the target acceleration $a_{M1\_}tgt$ with the first reflection degree while appropriately referring to the first-class plausibility $\eta_A$. Otherwise, the ECU 21 reflects the second-class minimum value $-a_{M3\_}min$ to the target acceleration $a_{M1\_}tgt$ with the second reflection degree. In this way, the driving state in the target position is updated.

3. THIRD EMBODIMENT

Next, a third embodiment will be described with reference to FIGS. 15 to 20. Note that descriptions overlapping with those in the first or second embodiment are omitted as appropriate.

3.1 Assumption

Figure 15:
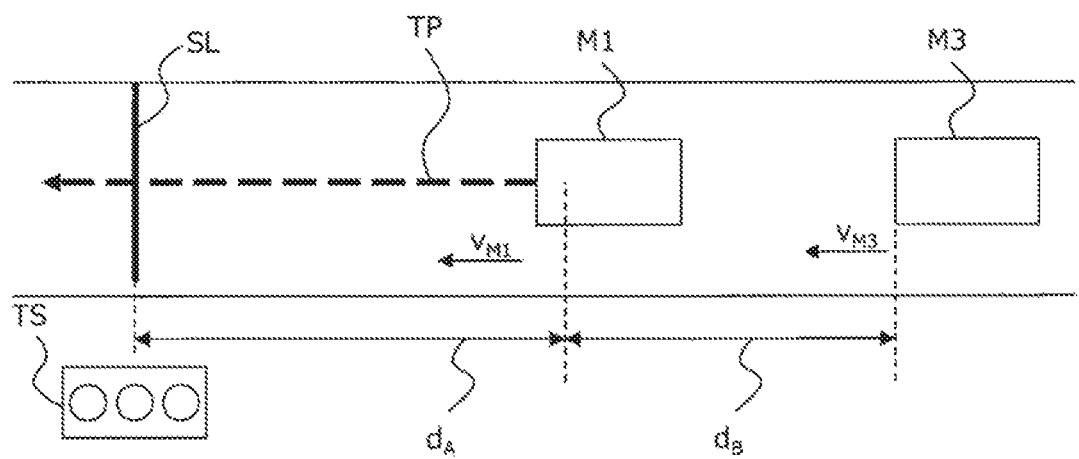
FIG. 15 is a diagram for illustrating a situation where a third embodiment is assumed.

FIG. 15 is a diagram for explaining a situation assumed by the third embodiment. On the vehicle M1 shown in FIG. 15, a vehicle control system according to the third embodiment (hereinafter also referred to as a "system" in the explanation of the third embodiment) is mounted.

In front of the vehicle M1 by a first-class distance $d_A$, there is a stop line SL. The stop line SL is a line attached to a nearest traffic signal TS of the vehicle M1 on the driving trajectory TP. The fact that the traffic light TS is the nearest traffic signal is specified based on the positional information of the vehicle M1 and the map information. According to the positional information of the vehicle M1 and the map information, the first-class distance $d_A$ is also specified. Note that there is no moving or static obstacle between the stop line SL and the vehicle M1. The situation where the moving or static obstacle exists corresponds to the situation described in FIG. 1.

The slowdown target OBJ of the first and second embodiments is a nearest moving or static obstacle. In contrast, the slowdown target OBJ of the third embodiment is the traffic light TS. When the slowdown target OBJ is the traffic light TS, the state of the slowdown target OBJ is the first-class relative speed $v_A$ of the traffic light TS (more precisely, the stop line SL) to vehicle M1 and the relative speed $v_A$ of the traffic light TS (more precisely, the stop line SL). However, the first-class distance $d_A$ is specified based on the positional information and the map information of the vehicle M1. The first-class relative speed $v_A$ is represented by $-v_{M1}$. That is, when the slowdown target OBJ is the traffic light TS, the accuracy on the detection of the state of it is expected to be high enough. In third embodiment, therefore, the plausibility $\eta_A$ is associated with the state of the traffic light TS that indicates an accuracy of the detection of lighting color Cs (red or yellow; the same shall apply hereinafter) of the traffic signal TS. In the following explanation of the third embodiment, the plausibility $\eta_A$ of the lighting color Cs is also referred to as the "first-class plausibility $\eta_A$" and the threshold $\eta_A$ thX is also referred to as the "first-class threshold $\eta_A$ thX".

Behind the vehicle M1 by the distance $d_B$, the vehicle M3 runs at the driving speed $v_{M3}$. The vehicle M3 is common to the assumptions of the first and second embodiments.

3.2 Characteristic of Third Embodiment

When the slowdown target OBJ is the traffic light TS, the first deceleration feature shown in FIG. 2 is understood as the relationship between the first-class distance $d_A$ and the first-class relative speed $v_A$ after detecting a red or yellow signal. Further the stopping position shown in FIG. 2 is replaced by the stop line SL position. Then, the combination of the first-class distance $d_A$ and the first-class relative speed $v_A$ when the lighting color Cs is not detected at all by the camera should be represented in the first deceleration feature. In addition, these combinations when the lighting color Cs is fully detected by the camera should be represented in the first deceleration feature.

In the following explanation of third embodiment, among the coordinate $(d_A, v_A)$ corresponding to the state of the traffic light TS, the coordinate $(d_A, v_A)$ having the first-class plausibility $\eta_A$ greater than the first-class threshold $\eta_A$_th0 is referred to as the "coordinate $(d_A, v_A|\eta_A)$".

3.2.1 Determination of Driving Policy

The driving policy is determined based on a single coordinate $(d_A, v_A|\eta_A)$. The reason for expressing "single coordinate $(d_A, v_A|\eta_A)$" is that the first-class distance $d_A$ and the first-class relative speed $v_A$ are specified in the third embodiment. And, as described in the first embodiment, when there is only one coordinate $(d_A, v_A|\eta_A)$, the first-class deceleration $-a_{M1}$ corresponding to the coordinate $(d_A, v_A|\eta_A)$ can be regarded as the substantial first-class minimum value $-a_{M1}$_min. Therefore, in the following explanation of the third embodiment, the coordinate $(d_A, v_A|\eta_A)$ having the first-class minimum value $-a_{M1}$_min is referred to as the "coordinate $(d_A, v_A|\eta_A|-a_{M1}$_min)".

The driving policy is determined based on the result of the comparison between the first-class minimum value $-a_{M1}$_min and the second-class minimum value $-a_{M3}$_min. The magnitude relationship of these minimum values is as follows.

$-a_{M1}\_min \geq -a_{M3}\_min$ (i)

$-a_{M1}\_min < -a_{M3}\_min$ (ii)

Figure 16:
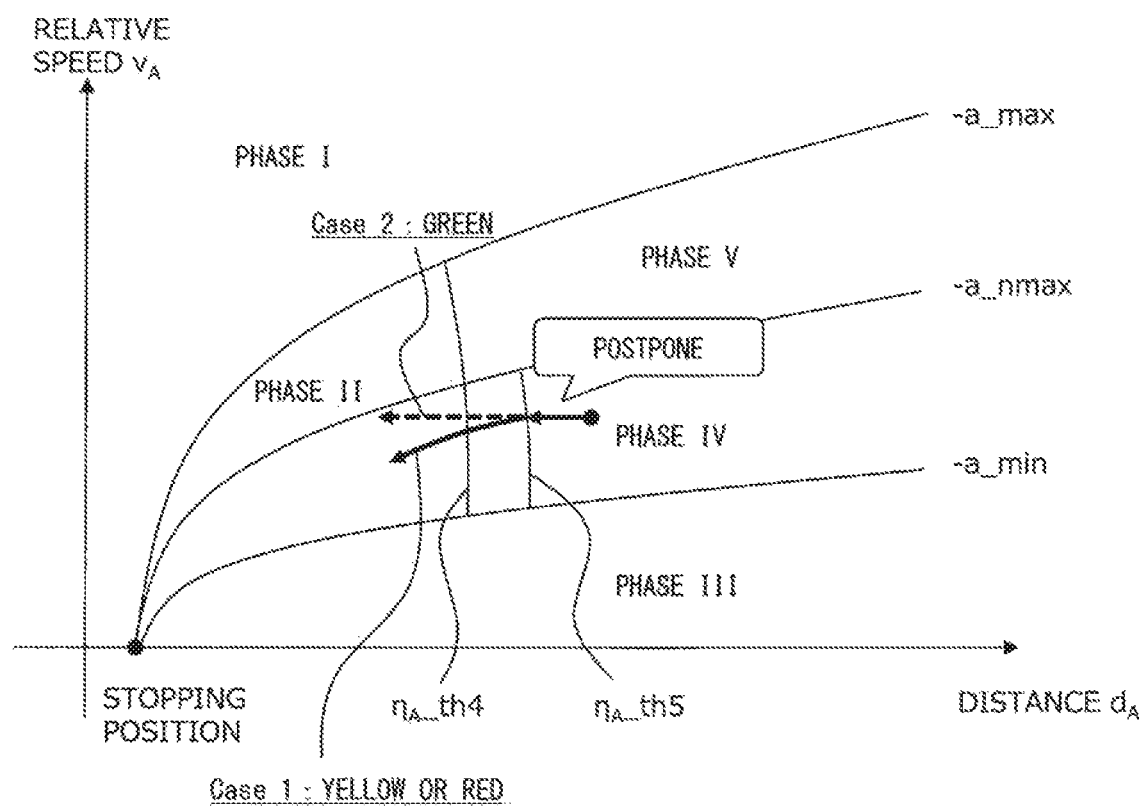
FIG. 16 is a diagram for explaining a reflection method of a driving policy (i-c)
Figure 17:
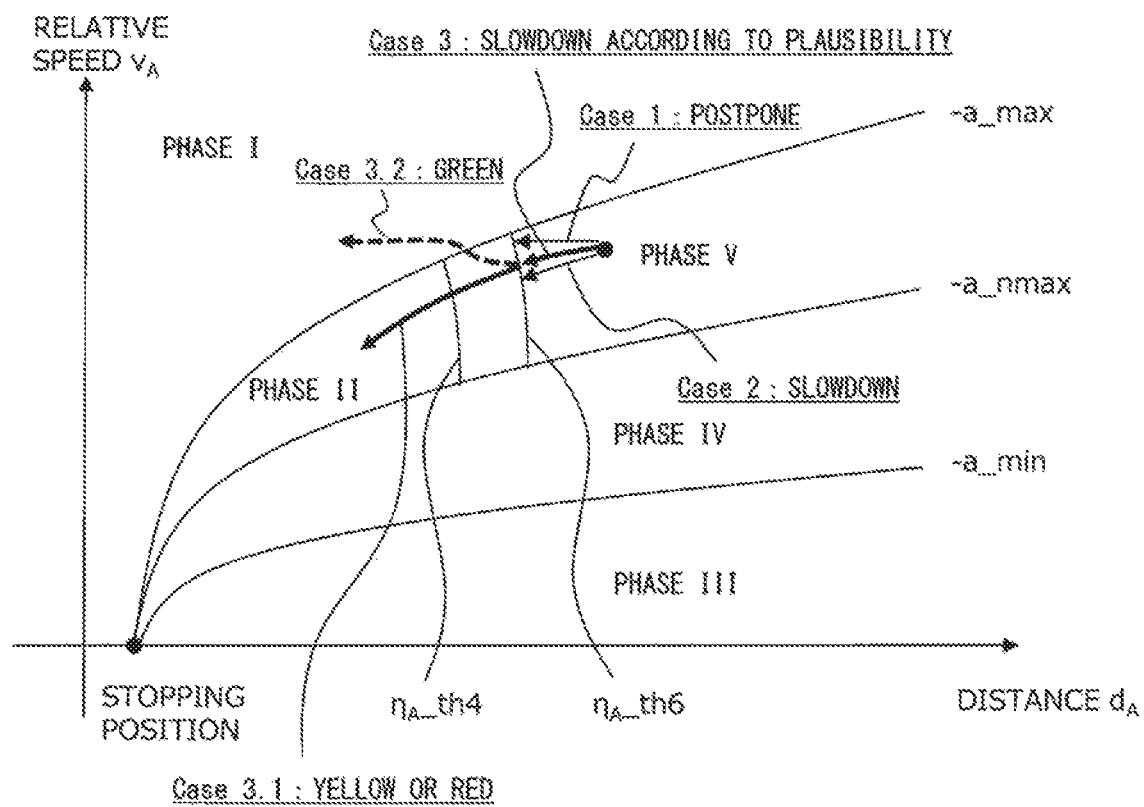
FIG. 17 is a diagram for illustrating a method to change the first-class minimum value.

The driving policy for the case of the relationship (ii) is common to that in the second embodiment. Therefore, the explanation of the determination examples of driving policy for the case of the relationship (ii) is omitted. Hereinafter, examples to determine the driving policy for the case of the relationship (i) will be described. First, thresholds $\eta_A$_th used in this description will be described. In FIGS. 16 and 17, the phases I to V explained in FIG. 9 are drawn. In these figures, the curves of first-class thresholds $\eta_A$_th4, $\eta_A$_th5, and $\eta_A$_th6 are also drawn.

The first-class threshold $\eta_A$_th4 corresponds to the first-class threshold $\eta_A$ when the lighting color Cs is completely detected by the camera. The first-class threshold $\eta_A$_th4 satisfies $\eta_A$_th4>$\eta_A$_th0. The first-class threshold $\eta_A$_th5 corresponds to the first-class threshold $\eta_A$ when a certain accuracy is observed in the detection of the lighting color Cs by the camera. The first-class threshold $\eta_A$_th5 satisfies $\eta_A$_th0<$\eta_A$_th5<$\eta_A$_th4. The definition of the first-class threshold $\eta_A$_th6 is the same as that of the first-class threshold $\eta_A$_th5. The first-class threshold $\eta_A$_th6 may be the same as the first-class threshold $\eta_A$_th5 or may be different from the first-class threshold $\eta_A$_th5.

If the first-class minimum value phase corresponds to the phase I, the driving policy is determined to "decelerate the vehicle M1 immediately at the first-class minimum value $-a_{M1}$_min." The reason for this is to stop the vehicle M1 in front of the stop line SL. Thus, if the coordinate $(d_A, v_A|\eta_A|-a_{M1}$_min) exists in the phase I, the driving policy is selected to prioritize the driving safety than the driving efficiency.

If the first-class minimum value phase corresponds to the phase III, the driving policy is determined to "maintain current acceleration or deceleration". This is because the vehicle M1 is able to stop in front of the stop line SL even if the slowdown of the vehicle M1 is not performed. Thus, if the coordinate $(d_A, v_A|\eta_A|-a_{M1}$_min) exists in the phase III, the driving policy is selected to prioritize the driving efficiency than the driving safety. In this case, "speedup of the vehicle M1 such that the driving speed $v_{M1}$ does not exceed an upper limit" may be applied as the driving policy.

If the first-class minimum value phase corresponds to the phase IV, the driving policy is determined to "postpone the start of the slowdown until the first-class plausibility $\eta_A$ of the coordinate $(d_A, v_A|\eta_A|-a_{M1}$_min) is equal to or greater than the first-class threshold $\eta_A$_th5". This is because there is a possibility that vehicle M1 stops in front of the stop line SL even if the slowdown of the vehicle M1 is performed immediately. As described above, if the coordinate $(d_A, v_A|\eta_A|-a_{M1}$_min) exists in the phase IV, the driving policy is selected to perform appropriate driving in accordance with the current situation.

If the first-class minimum value phase corresponds to the phase II or V, the driving policy is determined to "immediately perform the slowdown of the vehicle M1 with the first-class minimum value $-a_{M1}$_min if the first-class plausibility $\eta_A$ of the coordinate $(d_A, a_{M1}$_min) is equal to or greater than first-class threshold $\eta_A$_th4. Otherwise, perform the slowdown by changing the first-class minimum value $a_{M1}$_min in accordance with the first-class plausibility $\eta_A$". Unlike the second embodiment described above, in the third embodiment, the single coordinate $(d_A, v_A|\eta_A)$ is always specified. On the other hand, at the timing which the coordinate $(d_A, v_A|\eta_A|-a_{M1}$_min) is specified, it is impossible to narrow down whether this coordinate exists in the phase II or V. Therefore, in third embodiment, a judgment element for narrowing down is added to the driving policy.

3.2.2 Reflection of Driving Policy

The reflection of the driving policy is performed on the driving plan. The method to design the driving plan is basically the same as that of the first or second embodiment.

Focusing on the first-class and the second-class minimum value phases, and the magnitude relationship between the first-class minimum value $-a_{M1}\_min$ and the second-class minimum value $-a_{M3}\_min$, the driving policy in the case (i) are summarized as follows.

(i) In case of $-a_{M1}\_min \geq -a_{M3}\_min$ (i-a) If the first-class minimum value phase corresponds to the phase I Perform the slowdown of the vehicle M1 immediately with the first-class minimum value $-a_{M1}\_min$ (i-b) If the first-class minimum value phase corresponds to the phase III Maintain current acceleration or deceleration (i-c) If the first-class minimum value phase corresponds to the phase IV Postpone the start of the slowdown until first-class threshold $\eta_A$ of the coordinate $(d_A, v_A|\eta_A|-a_{M1}\_min)$ is equal to or greater than the first-class threshold $\eta_A\_th5$ (i-d) If the first-class minimum value phase corresponds to the phase II or V Immediately perform the slowdown with the first-class minimum value $-a_{M1}\_min$ if the first-class plausibility $\eta_A$ of the coordinate $(d_A, v_A|\eta_A|-a_{M1}\_min)$ is equal to or greater than the first-class threshold $\eta_A\_th4$. Otherwise, perform the slowdown by changing the first-class minimum value $-a_{M1}\_min$ in accordance with the first-class plausibility $\eta_A$.

According to the driving policy (i-a), the first-class minimum value $-a_{M1}\_min$ is immediately reflected to the target acceleration $a_{M1}\_tgt$. On the other hand, according to the driving policy (i-b), the first-class minimum value $-a_{M1}\_min$ is not reflected to the target acceleration $a_{M1}\_tgt$ at all. Therefore, the first reflection degree of the driving policy (i-a) is 100% and that of the driving policy (i-b) is 0%.

According to the driving policy (i-c), the first reflection degree is changed according to the result of comparing with the first-class threshold $\eta_A\_th5$. FIG. 16 is a diagram for explaining the reflection method of the driving policy (i-c). In FIG. 16, the phases I to V explained in FIG. 9 are drawn. The black circle shown in the phase IV of FIG. 16 represents the coordinate $(d_A, v_A|\eta_A|-a_{M1}\_min)$. In the example shown in FIG. 16, it is assumed that the first-class plausibility $\eta_A$ of this coordinate increases to a value equal to or greater than the first-class threshold $\eta_A\_th5$ during a process in which the vehicle M1 approaches the stop line SL (hereinafter referred to as an "approaching process" in the following explanation of the third embodiment).

According to the driving policy (i-c), the first-class minimum value $-a_{M1}\_min$ is not reflected to the target acceleration $a_{M1}\_tgt$ if the first-class plausibility $\eta_A$ of the coordinate $(d_A, v_A|\eta_A|-a_{M1}\_min)$ is less than the first-class threshold $\eta_A\_th5$. On the other hand, the first-class minimum value $-a_{M1}\_min$ is reflected to the target acceleration $a_{M1}\_tgt$ if the first-class plausibility $\eta_A$ of the coordinate $(d_A, v_A|\eta_A|-a_{M1}\_min)$ is equal to or greater than the first-class threshold $\eta_A\_th5$. Thus, according to the driving policy (i-c), the first reflection degree is changed between 0% and 100%.

In FIG. 16, two types of trajectories are drawn on the left side of the first-class threshold $\eta_A\_th5$. The trajectory shown in the solid line (i.e., Case 1) represents the approaching process where the detection of the lighting color Cs was correct (i.e. in case of red or yellow signal). The trajectory shown in the broken line (i.e., Case 2) represents the approaching process where this detection was really incorrect (i.e. in case of green signal). Note that, as described in FIG. 10, this broken line is a trajectory drawn which is drawn for convenience of explanation.

According to the driving policy (i-d), the first reflection degree changes according to the result of the comparison with the first-class threshold $\eta_A\_th4$ and the first-class plausibility $\eta_A$ of the coordinate $(d_A, v_A|\eta_A|-a_{M1}\_min)$. If the first-class plausibility $\eta_A$ of the coordinate $(d_A, v_A|\eta_A|-a_{M1}\_min)$ is equal to or greater than the first-class threshold $\eta_A\_th4$, the first-class minimum value $-a_{M1}\_min$ is reflected to the target acceleration $a_{M1}\_tgt$. As described above, the first reflection degree according to the driving policy (i-d) is 100% if the first-class plausibility $\eta_A$ of the coordinate $(d_A, v_A|\eta_A|-a_{M1}\_min)$ is equal to or greater than the first-class threshold $\eta_A\_th4$.

On the other hand, if the first-class plausibility $\eta_A$ of the coordinate $(d_A, v_A|\eta_A|-a_{M1}\_min)$ is less than first-class threshold $\eta_A\_th4$, the first-class minimum value $-a_{M1}\_min$ is changed in accordance with the same first-class plausibility $\eta_A$. FIG. 17 is a diagram illustrating a modification method of first-class minimum value $-a_{M1}\_min$ according to first-class plausibility $\eta_A$ of the coordinate $(d_A, v_A|\eta_A|-a_{M1}\_min)$. In FIG. 17, three types of trajectories are drawn on the right side of the first-class threshold $\eta_A\_th6$. The first and second trajectories (i.e., Cases 1 and 2) are the same as those shown in FIG. 6. The third trajectory (i.e., Case 3) represents the approaching process in which the slowdown is performed with the first-class minimum value $-a_{M1}\_min$ obtained by multiplying the coefficient $\beta$ ($0<\beta<1$). The coefficient $\beta$ is designed to approach 1 as the first-class plausibility $\eta_A$ of the coordinate increases. As described above, the first reflection degree according to the driving policy (i-d) is $100\beta\%$ when the first-class plausibility $\eta_A$ of the coordinate $(d_A, v_A|\eta_A|-a_{M1}\_min)$ is less than the first-class threshold $\eta_A\_th4$.

In FIG. 17, two types of trajectories are also drawn on the left side of the first-class threshold $\eta_A\_th6$. The trajectory shown in solid line (case 3.1) represents the approaching process where the detection of the lighting color Cs was correct. The trajectory shown in the broken line (i.e., Case 3.2) represents the approaching process where this detection was really wrong. Beginnings of the trajectories of the cases 3.1 and 3.2 lead to an end of the trajectory of the third case. Therefore, when comparing the cases 1 to 3, feeling of strangeness on the running behavior of the vehicle M1 is suppressed in the case 3.

3.2.3 Effect

According to the characteristics of the third embodiment, it is possible to obtain effects equivalent to those in the second embodiment.

3.3 Vehicle Control System

Next, a configuration example of the system in which the automated driving control including the characteristic processing is executed will be described.

3.3.1 System Configuration Example

Figure 18:
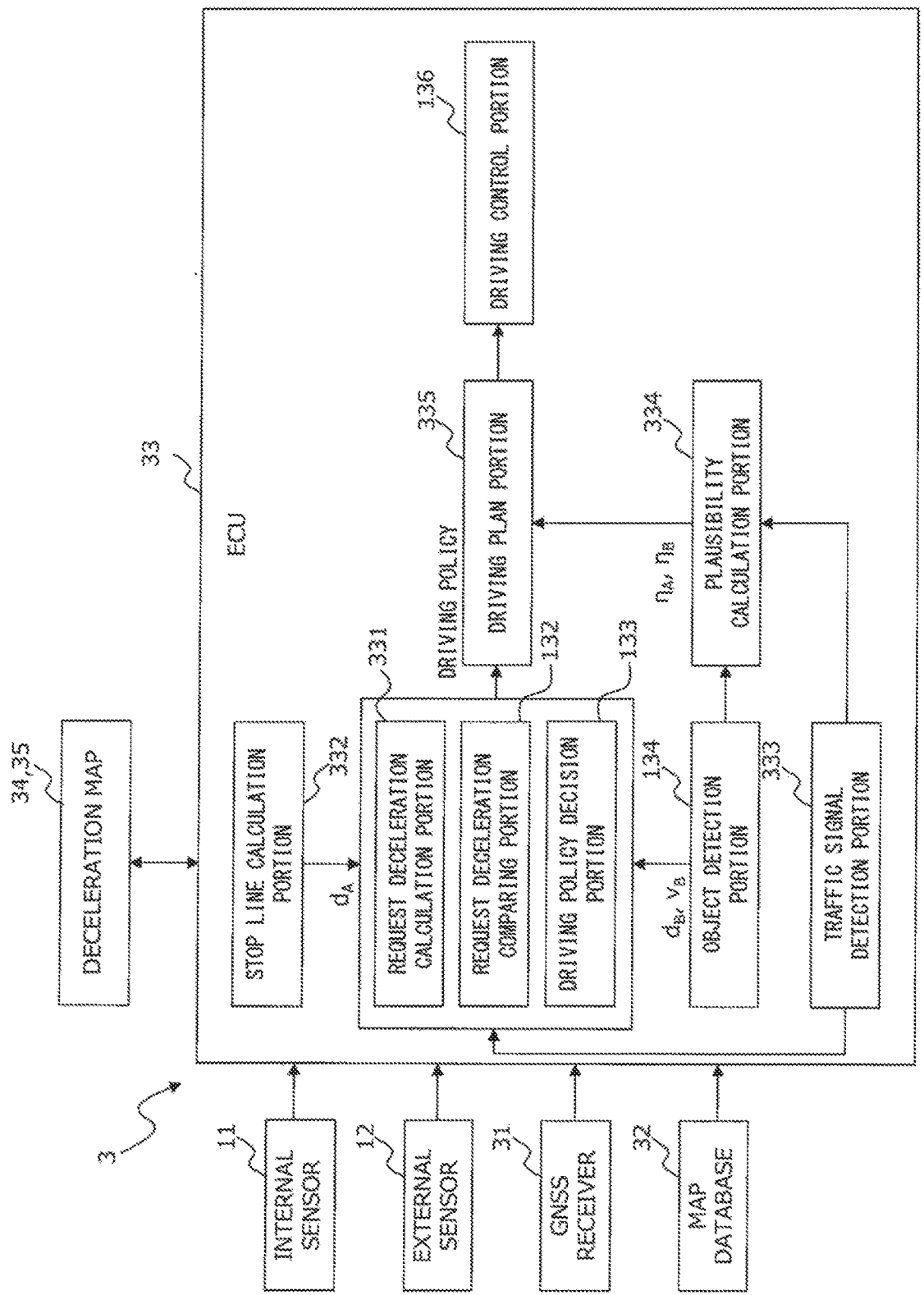
FIG. 18 is a block diagram for showing a configuration example of a vehicle control system according to a third embodiment.

FIG. 18 is a block diagram for showing a configuration example of a vehicle control system 3 according to the third embodiment. As shown in FIG. 18, the system 3 includes a GNSS (Global Navigation Satellite System) receiver 31, a map database 32, an ECU 33, and deceleration maps 34 and 35. The internal sensor 11 and the external sensor 12 are common to the configuration example of the system 1 shown in FIG. 5.

The GNSS receiver 31 is a device that receives signals from three or more satellites. The GNSS receiver 31 is also a device to obtain the position of the vehicle M1. The GNSS receiver 31 calculates the position and orientation of the vehicle M1 based on the received signals. The GNSS receiver 31 transmits the calculated information to the ECU 33.

The map database 32 is a data base in which map information is stored. The map information include positional information on roads, road shape information (e.g., curve, line type and curvature), positional information on intersections and divergent points, and positional information on constructions. The map information also includes information on the traffic regulation. The information on the traffic regulation includes a statutory speed which is associated with the positional information on the roads. The map information may include information on regions where the automated driving control is executable. The map database 32 is formed in a storage device (e.g., a hard disk and a flash memory) mounted on the vehicle M1. The map database 32 may be formed in the computer of the facility (e.g., a management center) capable of communicating with the vehicle M1.

The information on the position and orientation of the vehicle M1 and the map information are included in the driving environment information of the vehicle M1. That is, the GNSS receiver 31 and the map database 32 are included in the "acquiring device to acquire the driving environment information".

The hardware configuration of the ECU 33 is the same as that of the ECU 13 described in FIG. 5. The functional configuration of the ECU 33 will be described in detail in the following section "3.3.2".

The deceleration map 34 is a cell map in which the relationship is specified between the first-class deceleration $-a_{M1}$ and the state of slowdown target OBJ (i.e., the first-class distance $d_A$ and the first-class relative speed $v_A$). The basic configuration of the deceleration map 34 is the same as that of the deceleration map 14 described in FIG. 6. That is, each of cells ($d_{Ai}$, $v_{Aj}$) in the deceleration map 34 has the first-class deceleration $-a_{M1}$. In addition, each of the cells ($d_{Ai}$, $v_{Aj}$) is allocated to the four segmented area by the boundary deceleration.

The deceleration map 35 is a cell map in which the relationship is specified between the second-class deceleration $-a_{M3}$ and the state of vehicle M1 (i.e., the second-class distance $d_B$ and the second-class relative speed $v_B$) as viewed from the vehicle M3. The configuration of the deceleration map 35 is the same as that of the deceleration map 15 described in the first embodiment.

3.3.2 Configuration Example of ECU

As shown in FIG. 18, the ECU 33 includes a request deceleration calculation portion 331, a stop line calculation portion 332, a traffic signal detection portion 333, a plausibility calculation portion 334, and a driving plan portion 335. The functions of the request deceleration comparing portion 132, the driving policy decision portion 133 and the driving control portion 136 are the same as those of the ECU 13 shown in FIG. 5. These function blocks are realized when the processor of the ECU 33 executes various control programs stored in the memory. Hereinafter, for convenience of explanation, the request deceleration calculation portion 331, the stop line calculation portion 332 and the like are abbreviated as the "calculation portion 331", the "calculation portion 332" and the like.

The calculation portion 331 calculates the first-class request value and second-class request value. The first-class request value is calculated by referring to the deceleration map 34. The deceleration map 34 is referenced by using the information on the state of the slowdown target OBJ. The second-class request value is calculated by referring to the deceleration map 35. The deceleration map 35 is referenced by using the information on the state of the following moving body FMO. As described above, the calculation of the first-class and second-class request values executed by the calculation portion 331 is essentially the same as that executed by the calculation portion 131 described in FIG. 5. The calculation portion 331 transmits the first-class and second-class request values to both the comparison portion 132 and the decision portion 133.

The calculation portion 332 calculates the distance (i.e., the first-class distance $d_A$) from the vehicle M1 to the stop line SL. The first-class distance $d_A$ is calculated based on the positional information and the map information of the vehicle M1. The positional information of the vehicle M1 is obtained from the GNSS receiver 31. The map information is obtained from the map database 32. The calculation portion 332 transmits the calculated first-class distance $d_A$ to the calculation portion 331.

The detection portion 333 detects a lighting state (i.e., green, yellow, red, or unknown) of the traffic light TS. The lighting state is detected, for example, as follows. First, the traffic light TS is extracted from the images captured by the camera. Then, based on brightness of the extracted traffic light TS, the lighting state is determined. When the brightness of red is highest, the lighting state is determined to be red. The detection portion 333 transmits the detected lighting state to the calculation portions 331 and 334.

The calculation portion 334 calculates the first-class plausibility $\eta_A$. The first-class plausibility $\eta_A$ is calculated as, for example, a probability L of a plausibility model in which a probability p is used as a variable that a red or yellow signal is correctly detected based on the detection information of the camera, the detection history of the camera, the detection information of traffic light around the vehicle M1 which is predicted from the movement of a peripheral vehicle around the vehicle M1. The calculation portion 334 transmits the calculated first-class plausibility $\eta_A$ to the planning portion 335.

The planning portion 335 plans the driving plan of the automated driving. The basic function of the planning portion 335 is the same as that of the planning portion 135 described in FIG. 5. When receiving the driving policy from the decision portion 133, the planning portion 335 changes the driving state in the target position while referring to the first-class plausibility $\eta_A$ from the calculation portion 334 appropriately. The planning portion 335 transmits to the control portion 136 the information on the driving trajectory TP including the information on the driving state.

From the decision portion 133, one of the driving policies (i-a) to (ii-d) is transmitted. The planning portion 335 reflects the first-class minimum value $-a_{M1\_}$min or the second-class minimum value $-a_{M3\_}$min to the target acceleration $a_{M1\_}$tgt, depending on the contents of the received driving policy.

When the driving policy (i-a) is received, the planning portion 335 immediately reflects the first-class minimum value $-a_{M1\_}$min to the target acceleration $a_{M1\_}$tgt. When the driving policy (i-c) is received and also the first-class plausibility $\eta_A$ corresponding to the first-class minimum value cell is equal to or greater than the first-class threshold $\eta_A\_$th5, the planning portion 335 immediately executes the reflection of the first-class minimum value $-a_{M1\_}$min. The immediate reflection of the first-class minimum value $-a_{M1\_}$min is also executed when the driving policy (i-d) is received and also the first-class plausibility $\eta_A$ corresponding to the first-class minimum value cell is equal to or greater than the first-class threshold $\eta_A\_$th4. Note that the "first-class minimum value cell" in the third embodiment is defined as a cell on the deceleration map 34 that corresponds to the first-class minimum value $-a_{M1\_}$min.

When the driving policy (i-b) is received, the planning portion 335 prohibits the first-class minimum value $-a_{M1\_min}$ from being reflected to the target acceleration $a_{M1\_tgt}$. The reflection of the first-class minimum value $-a_{M1\_min}$ is also prohibited when the driving policy (i-c) is received and the first-class plausibility $\eta_A$ corresponding to the first-class minimum value cell is less than the first-class threshold $\eta_{A\_th5}$.

When the driving policy (i-d) is received and also the first-class plausibility 11A corresponding to the first-class minimum value cell is less than the first-class threshold $\eta_{A\_th4}$, the planning portion 335 changes the first-class minimum value $-a_{M1\_min}$ in accordance with the same first-class plausibility $\eta_A$. The first-class minimum value $-a_{M1\_min}$ is changed by multiplying the coefficient $\beta$ by the first-class minimum value $-a_{M1\_min}$.

The method of reflecting the second-class minimum value $-a_{M3\_min}$ to the target acceleration $a_{M1\_tgt}$ in a case where any one of the driving policies (ii-a) to (ii-d) is received is basically the same as that in the second embodiment. Note that the "second-class minimum value cell" in third embodiment is defined as a cell on the deceleration map 35 that corresponds to the second-class minimum value $-a_{M3\_min}$.

3.4 Processing Example Executed by ECU

Figure 19:
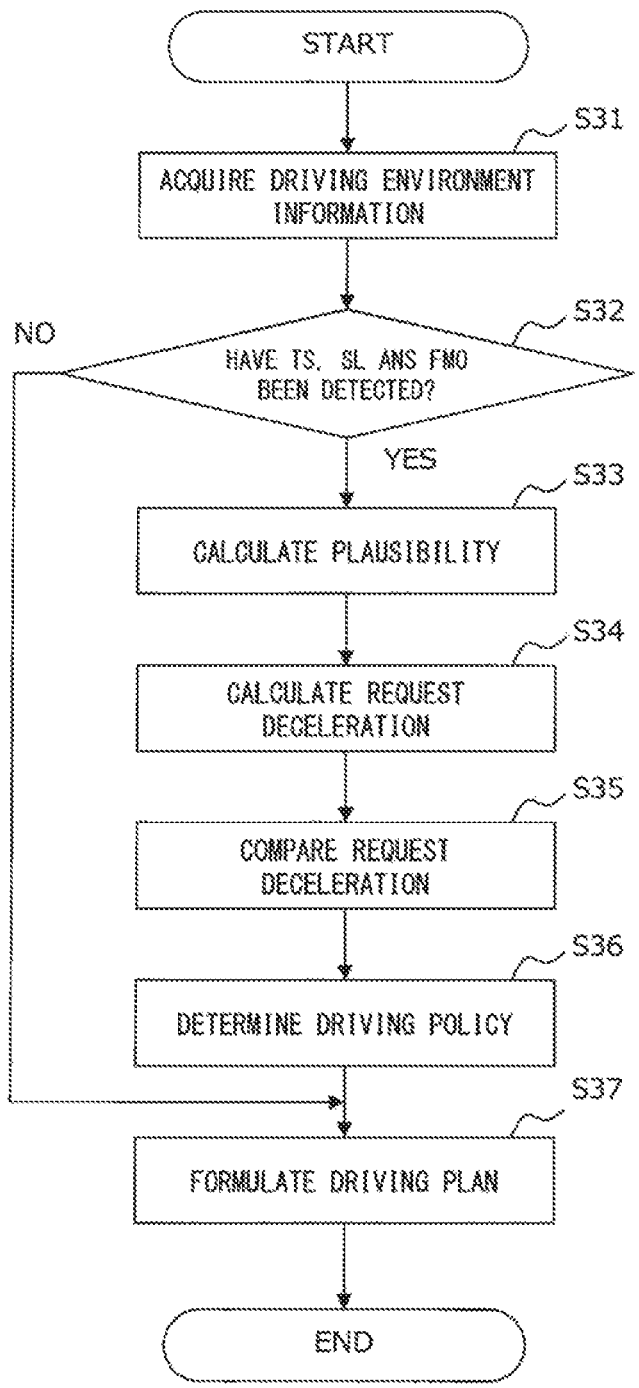
FIG. 19 is a flowchart for illustrating a flow of processing which is executed by the ECU for the automated driving control in the third embodiment.

FIG. 19 is a flowchart for illustrating a processing flow executed by the ECU 33 to execute the automated driving control. In the routine shown in FIG. 19, the ECU 33 first acquires the driving environment information (step S31). Specifically, the ECU 33 acquires the information on the driving state of the vehicle M1 and the information on the situation around the vehicle M1. The ECU 33 also acquires the positional information and the map information of the vehicle M1.

Subsequent to the step S31, the ECU 33 determines whether or not the traffic light TS, the stop line SL and the following moving body FMO have been detected (step S32). Specifically, the ECU 33 determines whether or not the information acquired in the step S31 includes the information on the traffic light TS and stop line SL and the information on the state of the following moving body FOB. If the judgement result of the step S32 is negative, the ECU 33 proceeds to step S37.

If the judgement result of the step S32 is positive, the ECU 33 calculates the first-class plausibility $\eta_A$ and the second-class plausibility $\eta_B$ (step S33). Specifically, the ECU 33 extracts the traffic light TS from the images captured by the camera and then calculates the first-class plausibility $\eta_A$. The ECU 33 also extracts the information on the state of the following moving body FOB from the information on the object and then calculates the second-class plausibility $\eta_B$.

Subsequent to the step S33, the ECU 33 executes processing of the steps from S34 to S37. The processing of the steps from S34 to S36 is the same as the processing of the steps from S13 to S15 shown in FIG. 8. The processing of the step S37 is the same as that of the step S27 shown in FIG. 14.

4. FOURTH EMBODIMENT

Next, a fourth embodiment will be described with reference to FIGS. 20 to 23. Note that descriptions overlapping with those in the first, second or third embodiment are omitted as appropriate.

4.1 Assumption

Figure 20:
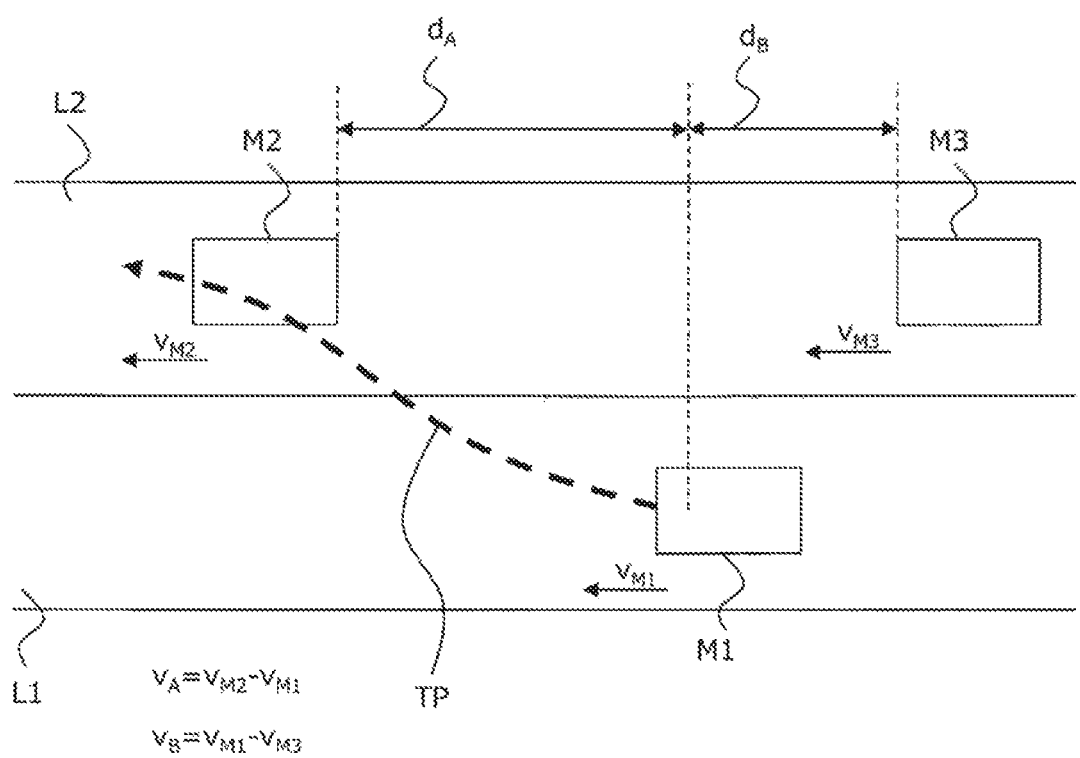
FIG. 20 is a diagram for illustrating a situation where a fourth embodiment is assumed.

FIG. 20 is a diagram for illustrating a situation where the fourth embodiment is assumed. The vehicle M1 shown in FIG. 20 is a vehicle on which a vehicle control system (hereinafter also referred to as a "system" in the explanation of the fourth embodiment) according to the fourth embodiment is mounted. The vehicle M1 runs on a first lane L1. The first lane L1 may be a lane which interflows in its downstream to a second lane L2.

The vehicle M1 will change its cruising lane from the first lane L1 to the second lane L2 according to lane change control executed by the system. The lane change control is executed as a part of the automated driving control. The driving trajectory TP shown in FIG. 20 defines as a collection of the target positions that the reference position of the vehicle M1 should reach during the execution of the lane change control.

In front of the vehicle M1 by the first-class distance $d_A$, there is the vehicle M2 running at the driving speed $v_{M2}$. Behind the vehicle M1 by the first-class distance $d_B$, there is the vehicle M3 running at the driving speed $v_{M3}$. The assumptions so far are the same as those in the first or second embodiment. However, in the fourth embodiment, the vehicles M2 and M3 are present on the second lane L2. Note that there is no moving or static obstacle on the first lane L1 between the vehicles M1 and M2. There is no following moving body on the first lane L1 between vehicles M1 and M3. The situation in which such the obstacle or the following moving body exists corresponds to the situation described in FIG. 1.

The lane change control is executed such that the vehicle M1 cuts into between the vehicles M2 and M3. In this case, the vehicle M2 is recognized as an object for which the slowdown of the vehicle M1 after the change of the cruising lane should be considered (hereinafter also referred to as a "future slowdown target OBJ*"). The vehicle M3 is recognized as a "future following moving object FMO*" after the change of the cruising lane. For convenience of explanation, the term "future slowdown target OBJ*" is also referred to as the "slowdown target OBJ*", and the term "future following moving object FMO*" is referred to as the "following moving body FMO*".

4.2 Characteristic of Fourth Embodiment

In the fourth embodiment, the first and second deceleration features are applied to the lane change control. However, since the vehicles M2 and M3 exist on the second lane L2, the first and second deceleration features cannot be directly applied to these vehicles. Therefore, in the fourth embodiment, a potential position PP of the vehicle M1 is set in the second lane L2. The "potential position PP" is defined as the position of the vehicle M1 when it is assumed that the vehicle M1 exists on the second lane L2.

Figure 21:
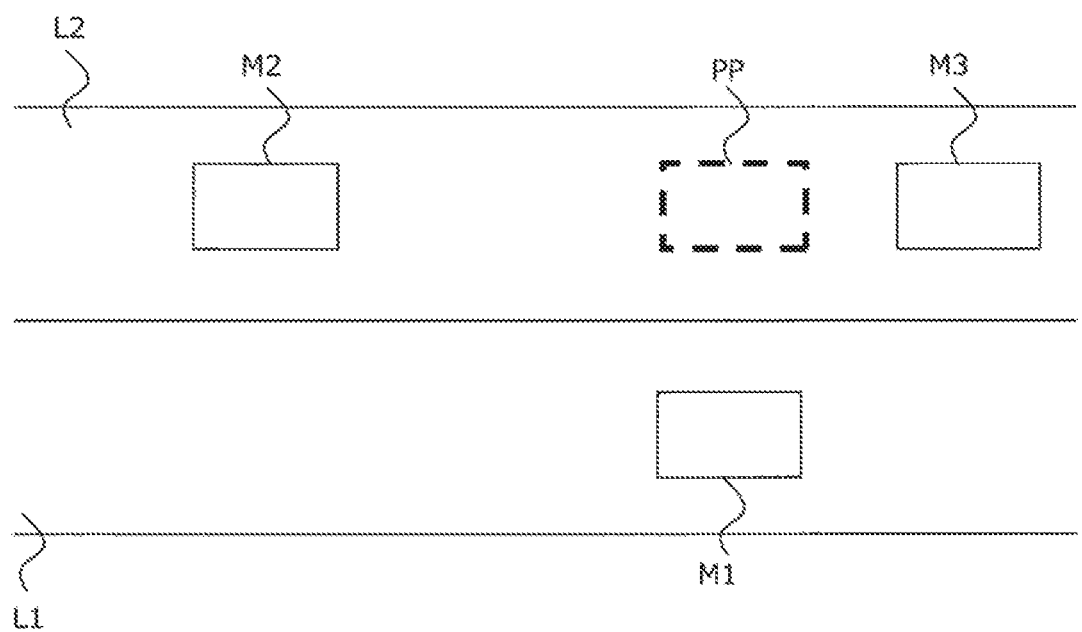
FIG. 21 is a diagram for illustrating an example of a potential position.

FIG. 21 is a diagram for illustrating an example of the potential position PP. In the example shown in FIG. 21, the potential position PP is set between the vehicles M2 and M3. The lateral position of the potential position PP is the same as that of the vehicle M1 on the first lane L1.

By combining the first and second deceleration features with the potential position PP, it is possible to determine the driving policy regarding the acceleration or deceleration during the execution of the lane change control. As the determination method of the driving policy, the method described in the first or second embodiment is applied. The same is true for the reflection method of the driving policy to the driving plan. Note that there is no particular limitation on the method to determine the driving policy and tp reflection the driving plan relating to the steering angle during the execution on the lane change control, and a known method can be applied thereto.

As described above, according to the characteristics of the fourth embodiment, it is possible to obtain the same effect as that according to the first or second embodiment even during the execution of the lane change control.

4.3 Vehicle Control System

Next, configuration example of the system to execute the lane change control including the characteristic processing will be described.

4.3.1 System Configuration Example

Figure 22:
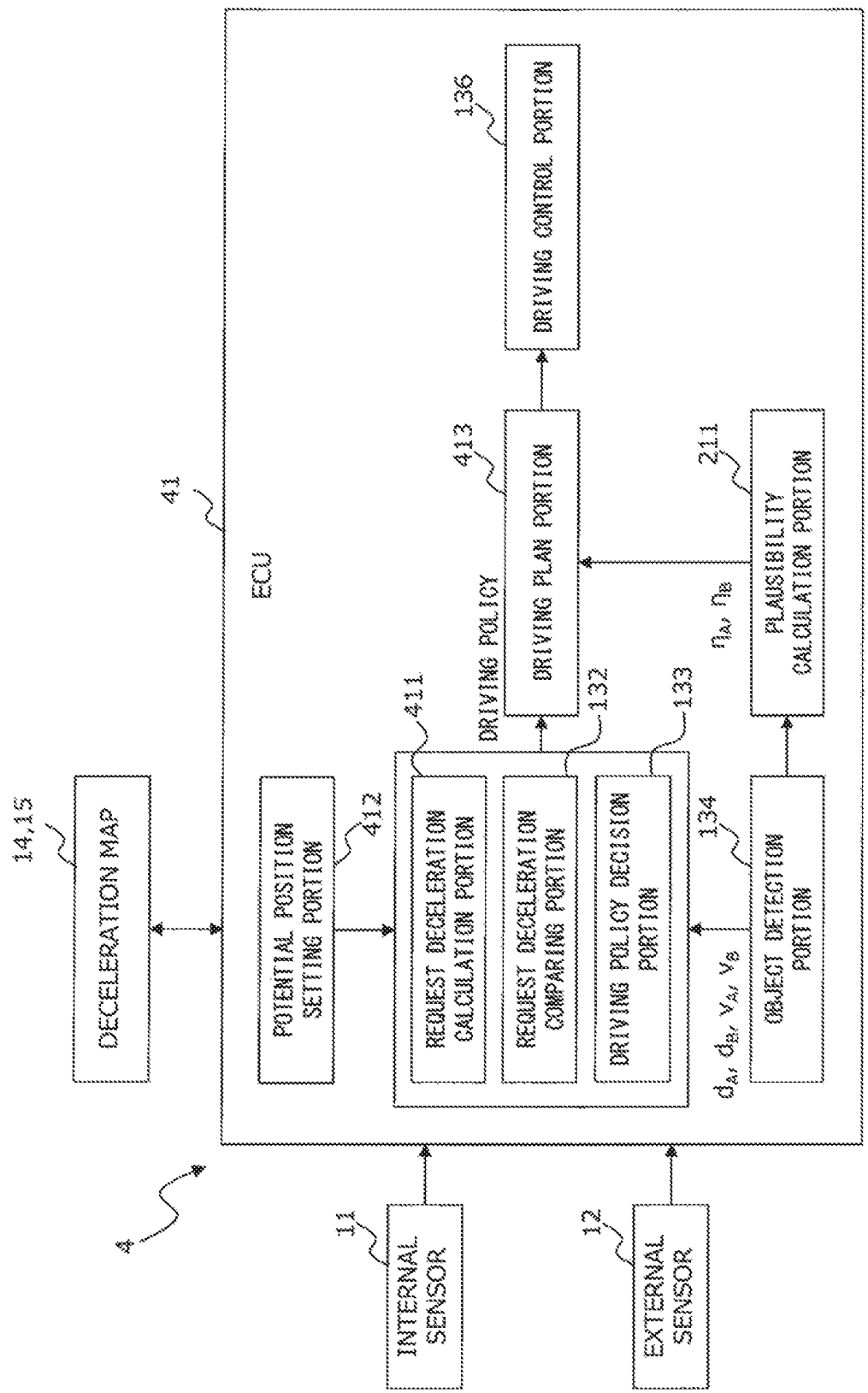
FIG. 22 is a block diagram for showing a configuration example of a vehicle control system according to a fourth embodiment.

FIG. 22 is a block diagram for showing a configuration example of a vehicle control system 4 according to the fourth embodiment. As shown in FIG. 22, the systems 4 comprises an ECU 41. The internal sensor 11, the external sensor 12 and the deceleration maps 14 and 15 are common to the configuration example of the system 1 shown in FIG. 5.

4.3.2 Configuration Example of ECU

As shown in FIG. 22, the ECU 41 includes a request deceleration calculation portion 411, a potential position setting portion 412, and a driving plan portion 413. The other functions except for the request deceleration calculation portion 411, the potential position setting portion 412 and the driving plan portion 413 are the same as those of the ECU 13 shown in FIG. 5 or the ECU 21 shown in FIG. 13. These function blocks are realized when the processor of the ECU 41 executes various control programs stored in the memory. Hereinafter, for convenience of explanation, the request deceleration calculation portion 411, the potential position setting portion 412 and the like are abbreviated as the "calculation portion 411", the "setting portion 412" and the like.

The calculation portion 411 calculates the first-class request value and second-class request value. The first-class request value is calculated by referring to the deceleration map 14. The deceleration map 14 is referenced by using the state of the slowdown target OBJ*. The second-class request value is calculated by referring to the deceleration map 15. The deceleration map 15 is referenced by using the state of the following moving body FMO*. The calculation portion 411 transmits the first-class and second-class request values to both the comparison portion 132 and the decision portion 133.

The setting portion 412 sets the potential position PP on the second lane L2. The potential position PP is set when a request for lane change is issued and the slowdown target OBJ* and the following moving body FMO* are detected on the second lane L2. The potential position PP is set between the slowdown target OBJ* and the following moving body FMO*.

The planning portion 413 plans the lane change plan. The planning of the lane change is executed by repeatedly setting the driving trajectory TP for the lane change every time preset time elapses, with the current time as a reference. The method to set the driving trajectory TP for the lane change is not particularly limited, and a known method can be applied. When the planning portion 413 receives the driving policy from the decision portion 133, it changes the information on the driving state in the target position (more precisely, the information on the target acceleration $a_{M1\_tgt}$). The planning portion 413 transmits to control portion 136 the information on the driving trajectory TP for the lane change, including the information on the driving state.

4.4 Processing Example Executed by ECU

Figure 23:
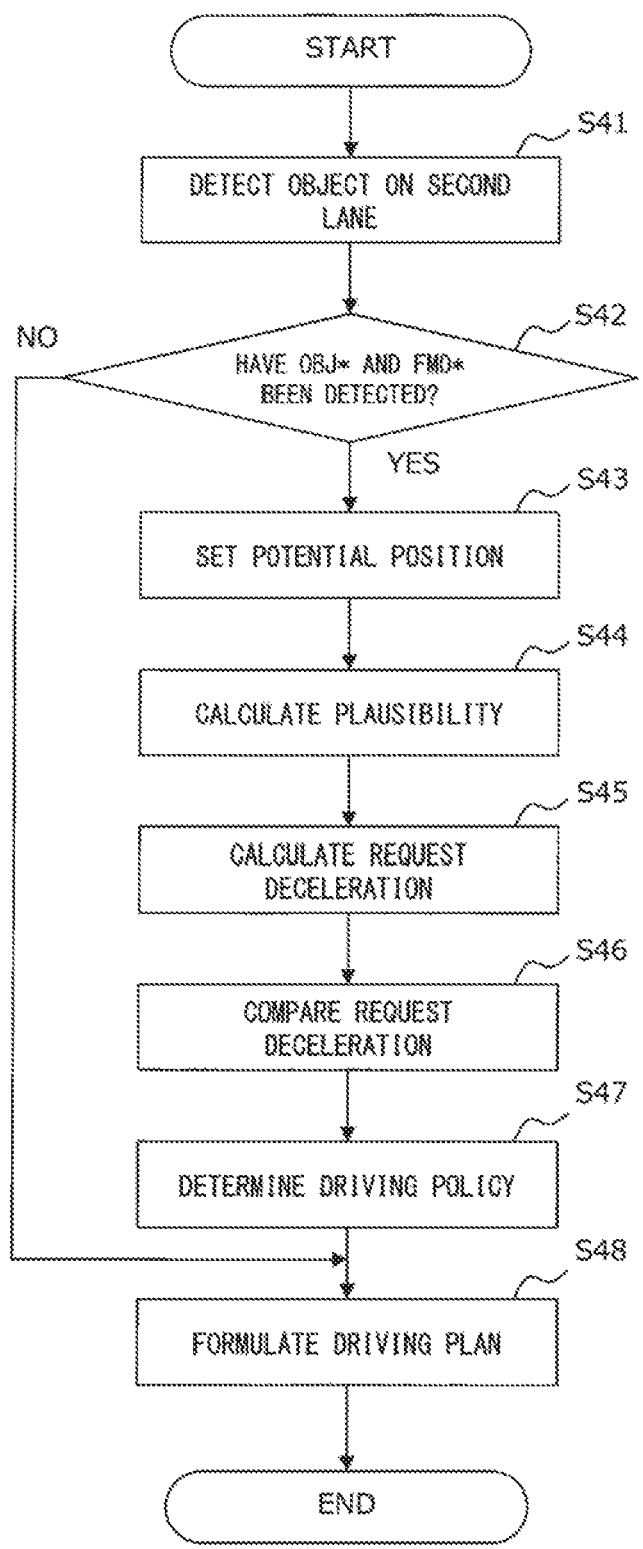
FIG. 23 is a flowchart for illustrating a flow of processing which is executed by the ECU for lane change control in the fourth embodiment.

FIG. 23 is a flowchart for illustrating a flow of processing which is executed by the ECU 41 for the lane change control. The routine shown in FIG. 23 is executed repeatedly when the ECU 41 receives the request for lane change.

In the routine shown in FIG. 23, the ECU 41 first detects the object on the second lane L2 (step S41). Specifically, the ECU 41 detects the object on the second lane L2 based on the information detected by the external sensor 12.

Subsequent to the step S41, the ECU 41 determines whether or not the slowdown target OBJ* and the following moving body FMO* on the second lane L2 have been detected (step S42). Specifically, the ECU 41 determines whether or not the information on the object detected in the step S41 includes the information on the state of the slowdown target OBJ* and that on the state of the following moving body FOB*. If the judgement result of the step S42 is negative, the ECU 41 proceeds to the step S48.

If the judgement result of the step S42 is positive, the ECU 41 sets the potential position PP (step S43). The ECU 41 specifically sets the potential position PP between the slowdown target OBJ* and the following moving body FOB* detected in the step S41.

Subsequent to the step S43, the ECU 41 calculates the first-class plausibility $\eta_A$ and the second-class plausibility $\eta_B$ (step S44). In the fourth embodiment, the "first-class plausibility $\eta_A$" is defined as an accuracy of the detection of the slowdown target OBJ*. In addition, the "second-class plausibility $\eta_B$" is defined as the accuracy of the detection of the following moving body FOB*.

Subsequent to the step S44, the ECU 41 calculates the requested deceleration (step S45). Specifically, the ECU 41 calculates the requested deceleration (i.e., the first-class request value) by referring to the deceleration map 14 with the information on the extracted state of the slowdown target OBJ*. The ECU 41 also calculates the requested deceleration (i.e., the second-class request value) by referring to the deceleration map 15 with the information on the extracted state of the following moving body FOB*.

Subsequent to the step S45, the ECU 41 executes the processing of the steps S46 and S47. The processing of these steps is the same as that of the steps S14 and S15 shown in FIG. 8.

In the step S48, the ECU 41 formulates the driving plan. Specifically, ECU 41 repeatedly sets driving trajectory TP for lane change every time preset time elapses. When the driving policy is determined in the step S47, the ECU 41 reflects the first-class minimum value $-a_{M1\_min}$ to the target acceleration $a_{M1\_tgt}$ with the first reflection degree while appropriately referring to the first-class plausibility $\eta_A$ and the second-class plausibility $\eta_B$ calculated in the step S44. Otherwise, the ECU 41 reflects the second-class minimum value $-a_{M3\_min}$ to the target acceleration $a_{M1\_tgt}$ with the second reflection degree.

5. FIFTH EMBODIMENT

Next, a fifth embodiment will be described with reference to FIGS. 24 to 27. Note that descriptions overlapping with those in the first, second, third or fourth embodiment are omitted as appropriate.

5.1 Assumption

Figure 24:
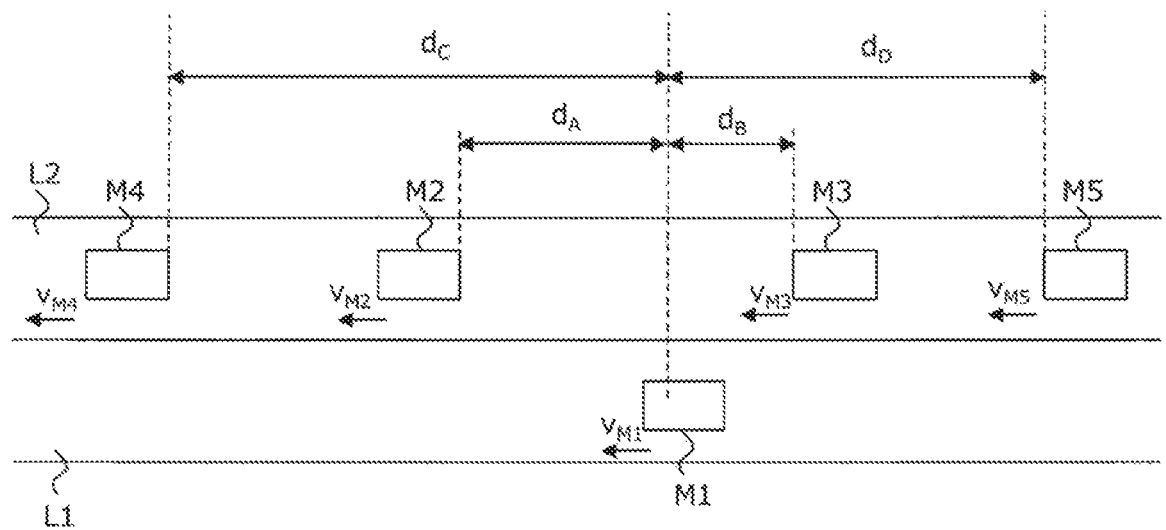
FIG. 24 is a diagram for illustrating a situation where a fourth embodiment is assumed.

FIG. 24 is a diagram for illustrating a situation where a fifth embodiment is assumed. The vehicle M1 shown in FIG. 24 is a vehicle on which a vehicle control system (hereinafter also referred to as a "system" in the explanation of the fifth embodiment) according to the fifth embodiment is mounted. The vehicle M1 runs on the first lane L1. The fact that the first lane L1 may be the interflow lane is the same as the premise of the fourth embodiment described above.

The assumption is common with the fourth embodiment where the cruising lane is to be changed from the first lane L1 to the second lane L2 according to the lane change control executed by the system. In addition, the assumption is common with the fourth embodiment where the vehicles M2 and M3 exist on the second lane L2. The vehicle M2 runs in front of the vehicle M1 by a distance $d_A$ at driving speed $v_{M2}$. The vehicle M3 runs at driving speed $v_{M3}$ behind of the vehicle M1 by a distance $d_B$.

However, in the situation shown in FIG. 24, vehicles M4 and M5 are also present on the second lane L2. The vehicle M4 runs in front of the vehicle M1 by a distance $d_C$ at driving speed $v_{M4}$. The vehicle M5 runs at driving speed $v_{M5}$ behind the vehicle M1 by a distance do. Note that there is no moving or static obstacle on the first lane L1 between the vehicles M1 and M4, and there is no following moving body on the first lane L1 between the vehicles M1 and M5. The situation in which such an obstacle and following moving body exist corresponds to the situation described in FIG. 1.

5.2 Characteristic of Fifth Embodiment

In the fourth embodiment, the potential position PP is set between the vehicles M2 and M3 during the execution of the lane change control. In the fifth embodiment, a plurality of candidates of the potential position PP are set. These candidates are set in a search area SA. The search area SA is set to an extent on the second lane L2 where the vehicle M1 is movable from the current position. The search area SA is calculated based on the current position of the vehicle M1, the driving speed $v_M$, and a physical modeling of the vehicle M1. The map information may be used to calculate the search area SA. This map information includes the information on the length of the first lane L1 and the information on the shape of the first lane L1 (or that of the second lane L2).

Figure 25:
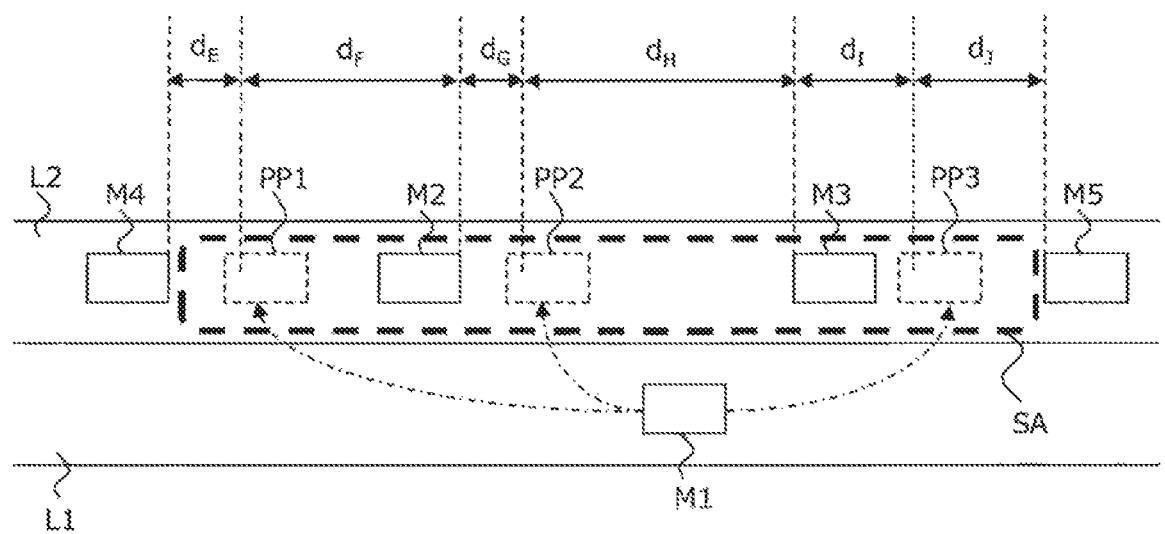
FIG. 25 is a diagram for showing an example in which a search area and the potential position are combined.

FIG. 25 is a diagram for showing an example of a combination of the search area SA and the candidates of the potential position PP. In the examples shown in FIG. 25, an area from a rear portion of the vehicle M4 to a front portion of the vehicle M5 corresponds to the search area SA. Candidates PP1 to PP3 are the candidates of the potential position PP set in the search area SA. The candidate PP1 is located between the vehicles M4 and M2. The candidate PP2 is located between the vehicles M2 and M3. The candidate PP3 is located between the vehicles M3 and M5.

Assume that the lane change is executed to cut into between the vehicles M4 and M2. In this situation, the vehicle M4 is considered as the "slowdown target OBJ*" and the vehicle M2 is considered as the "following moving body FMO*". Also, the distance $d_E$ from the vehicle M4 to the candidate PP1 is considered as the "first-class distance $d_E$", and the distance $d_F$ from the candidate PP1 to the vehicle M2 is considered as the "second-class distance $d_F$". Moreover, the relative speed $v_E$ of the vehicle M4 to the vehicle M1 is considered as the "first-class relative speed $v_E$", and the relative speed $v_F$ of the vehicle M1 to the vehicle M2 is considered as the "second-class relative speed $v_F$".

In the lane change control to cut into between the vehicles M2 and M3, the vehicle M2 is considered as the "slowdown target OBJ*" and the vehicle M3 is considered as the "following moving body FMO*". Also, the distance $d_G$ from the vehicle M2 to the candidate PP2 is considered as the "first-class distance $d_G$", and the distance $d_x$ from candidate PP2 to the vehicle M3 is considered as the "the second-class distance $d_H$". Moreover, the relative speed $v_G$ of the vehicle M2 to the vehicle M1 is considered as the "first-class relative speed vs", and the relative speed $v_H$ of the vehicle M1 to the vehicle M3 is considered as the "second-class relative speed $v_H$".

In the lane change control to cut into between the vehicles M3 and M5, the vehicle M3 is considered as the "slowdown target OBJ*" and the vehicle M5 is considered as the "following moving body FMO*". Also, the distance $d_I$ from the vehicle M3 to the candidate PP3 is considered as the "first-class distance $d_I$", and the distance $d_J$ from candidate PP3 to the vehicle M5 is considered as the "the second-class distance $d_J$". Moreover, the relative speed $v_I$ of the vehicle M3 to the vehicle M1 is considered as the "first-class relative speed $v_I$", and the relative speed $v_J$ of the vehicle M1 to the vehicle M5 is considered as the "second-class relative speed $v_J$".

In the fifth embodiment, the first and second deceleration features are combined with each of the candidates PP1 to PP3. Then, for each candidate PP1 to PP3, the driving policy on the speedup or slowdown during the execution of the lane change control is determined. These driving policies include a deceleration candidate to be reflected to the target acceleration $a_{M1\_tgt}$ (for example, the first-class minimum value $-a_{M1\_min}$, the second-class minimum value $-a_{M2\_min}$, the second-class minimum value $-a_{M3\_min}$ and the second-class minimum value $-a_{M5\_min}$).

Here, the "first-class minimum value $-a_{M1\_min}$" is defined as a minimum value of the first-class deceleration $-a_{M1}$ corresponding to each of these coordinates $(d_\gamma, v_\gamma|\eta_\gamma)$ when there are two or more coordinates $(d_\gamma, v_\gamma|\eta_\gamma)$ ($\gamma$ represents E, G, or I). The "second-class minimum value $-a_{MY\_min}$" is defined as the minimum value of the second-class deceleration $-a_{MY}$ corresponding to each of these coordinates $(d_\delta, v_\delta|\eta_\delta)$ when there are two or more coordinates $(d_\delta, v_\delta|\eta_\delta)$ (MY represents the M2, M3 or M5, and $\delta$ represents F, H or J).

In addition, the "coordinate $(d_\gamma, v_\gamma|\eta_\gamma)$" is defined as a coordinate $(d_\gamma, v_\gamma)$ of the coordinate $(d_\gamma, v_\gamma)$ corresponding to the first-class state having the first-class plausibility $\eta_\gamma\gamma$ larger than the first-class threshold $\eta_\gamma\_th0$. The "first-class state" is defined as a state of the slowdown target OBJ* corresponding to the candidate PP1 (i.e., the vehicle M4), the candidate PP2 (i.e., the vehicle M2), or the candidate PP3 (i.e., the vehicle M3). The "first-class plausibility $\eta_\gamma$" is defined as an accuracy of the detection of the slowdown target OBJ* corresponding to the candidate PP1, PP2 or PP3.

In addition, the "coordinate $(d_\delta, v_\delta|\eta_\delta)$" is defined as a coordinate $(d_\delta, v_\delta)$ of the coordinates $(d_\delta, v_\delta)$ corresponding to the second-class state having the second-class plausibility $\eta_\delta$ greater than second-class threshold $\eta_\delta\_th0$. The "second-class state" is defined as a state of the following moving body FMO* corresponding to the candidate PP1 (i.e., the vehicle M2), the candidate PP2 (i.e., the vehicle M3) or the candidate PP3 (i.e., the vehicle M5). The "second-class plausibility $\eta_\delta$" is defined as an accuracy of the detection of the following moving body FMO* corresponding to the candidate PP1, PP2 or PP3.

In the fifth embodiment, a candidate having smallest difference from the current acceleration or deceleration of the vehicle M1 is selected from these pieces of deceleration candidates. Then, the change in deceleration (or acceleration) during the execution of the lane change control is kept low. Therefore, according to the characteristics of the fifth embodiment, it is possible to execute the lane change control focusing on the driving efficiency.

5.3 Vehicle Control System

Next, configuration example of the system to execute the lane change control including the characteristic processing will be described.

5.3.1 System Configuration Example

Figure 26:
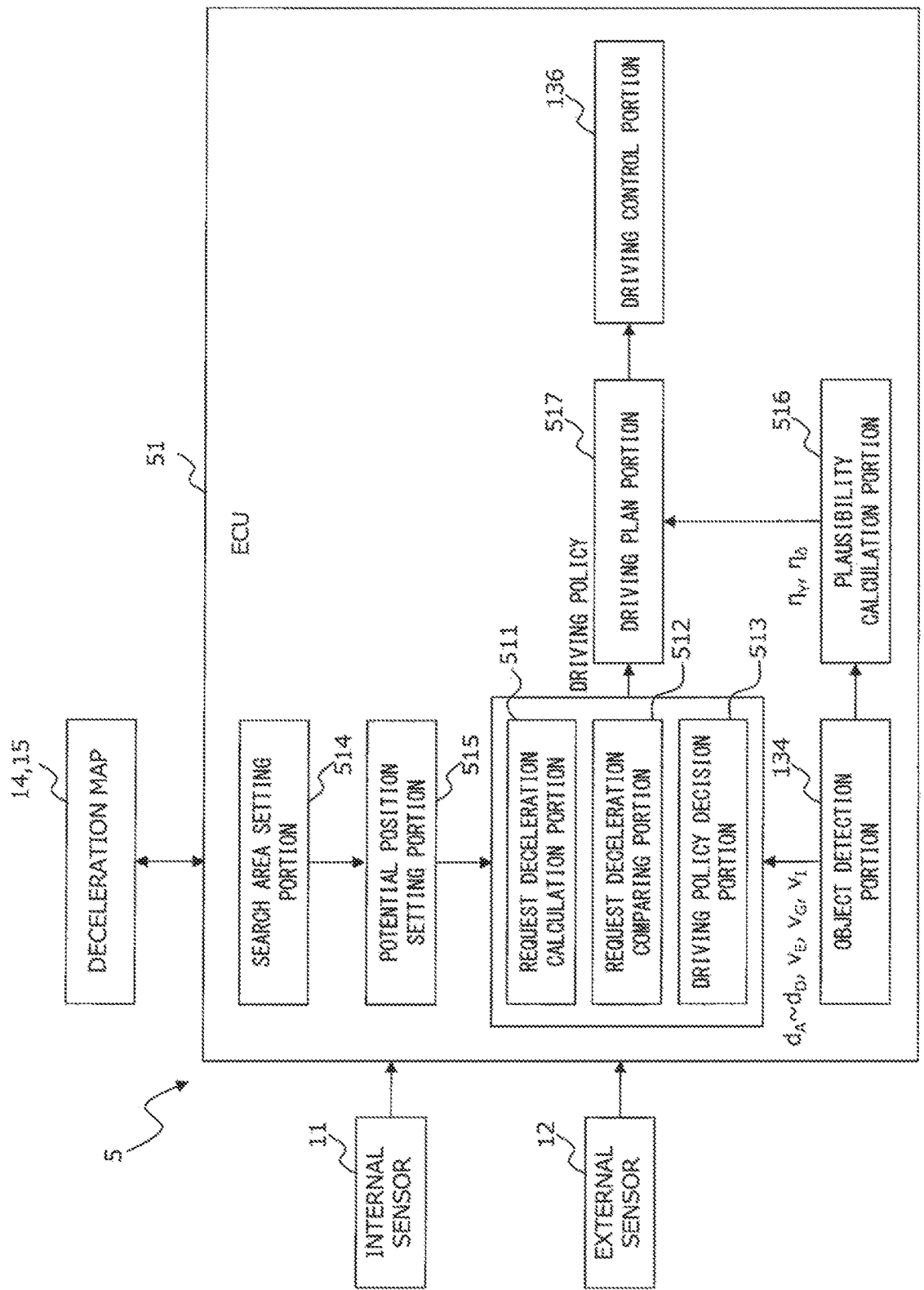
FIG. 26 is a block diagram for showing a configuration example of a vehicle control system according to a fifth embodiment.

FIG. 26 is a block diagram for showing a configuration example of a vehicle control system 5 according to the fifth embodiment. As shown in FIG. 26, the systems 5 comprise an ECU 51. The internal sensor 11, the external sensor 12 and the deceleration maps 14 and 15 are common to the configuration example of the system 1 shown in FIG. 5. The GNSS receiver 31 and the map database 32 are the same as configuration example of the system 3 shown in FIG. 18.

5.3.2 Configuration Example of ECU

As shown in FIG. 26, the ECU 51 includes a request deceleration calculation portion 511, a request deceleration comparing portion 512, a driving policy decision portion 513, a search area setting portion 514, a potential position setting portion 515, a plausibility calculation portion 516, and a driving plan portion 517. The functions of the object detection portion 134 and the driving control portion 136 are the same as those of the ECU 13 shown in FIG. 5. These function blocks are realized when the processor of the ECU 51 executes various control programs stored in the memory. Hereinafter, for convenience of explanation, the request deceleration calculation portion 511, the request deceleration comparing portion 512 and the like are abbreviated as the "calculation portion 511", the "comparison portion 512" and the like.

The calculation portion 511 executes calculation of the first-class and second-class request values for each candidate of the potential positions PP. The first-class request value is a request value of the first-class deceleration $-a_{M1}$. The first-class request value is calculated by referring to the deceleration map 14. The deceleration map 14 is referenced by using the state of the slowdown target OBJ*. The second-class request value is a request value of the second-class deceleration $-a_{MY}$. The second-class request value is calculated by referring to the deceleration map 15. The deceleration map 15 is referenced by using the state of the following moving body FMO*. The calculation portion 511 transmits the first-class and second-class request values to both the comparison portion 512 and the decision portion 513.

The comparative portion 512 compares the first-class minimum value $-a_{M1\_}min$ with the second-class minimum value $-a_{MY\_}min$ for each candidate of the potential positions PP. The method to specify the first-class minimum value $-a_{M1\_}min$ and the second-class minimum value $-a_{MY\_}min$ is basically the same as that executed by the comparison portion 132 described in FIG. 5. The comparison portion 512 calculates the magnitude relationship between the two specified types of the minimum values for each candidate from PP1 to PP3. The comparison portion 512 transmits the result of the comparison to the decision portion 513.

The decision portion 513 determines the driving policy for each candidate of potential positions PP. The decision portion 513 first identifies the first-class minimum value $-a_{M1\_}min$ and the second-class minimum value $-a_{MY\_}min$ for each candidate of potential positions PP. The decision portion 513 then specifies the first-class and the second-class minimum value cells for each candidate of potential positions PP. Then, the decision portion 513 determines the driving policy based on the segmented areas to which the first-class and second-class minimum value cells belong and the result of the comparison received from the comparison portion 512, and transmits the driving policy to the planning portion 517. Note that the driving policy is explained by replacing the "second-class minimum value $-a_{M3\_}min$" with the "second-class minimum value $-a_{MY\_}min$" in the explanation in the section "2.2.1".

The setting portion 514 sets the search area SA. The search area SA is calculated based on the current position of the vehicle M1, the driving speed $v_M$, and the physical model of vehicle M1. The setting portion 514 transmits the set search area SA to the setting portion 515.

The setting portion 515 sets the candidates of the potential positions PP in the search area SA. The potential positions PP are set between two adjacent objects detected in the search area SA. The number of candidates of the potential positions PP varies depending on the number of the objects detected in the search area SA. If the number of the detected object is k, then candidate number of the potential positions PP is k−1 (k represents a natural number equal to or greater than 3).

The calculation portion 516 calculates the first-class plausibility $\eta_\gamma$ and the second-class plausibility $\eta_\delta$. The first-class plausibility $\eta_\gamma$ is calculated by applying a model similar to the plausibility model described above to the slowdown target OBJ*. The first-class plausibility $\eta_\gamma$ of the first-class state is calculated for each first-class state. The calculation method of the second-class plausibility $\eta_\delta$ is based on that of the first-class plausibility $\eta_\gamma$. The calculation portion 516 transmits the calculated first-class plausibility $\eta_\gamma$ and the calculated second-class plausibility 116 to the planning portion 413.

The planning portion 517 plans the lane change plan. When planning portion 517 receives the driving policy from the decision portion 513, it selects the driving policy containing the deceleration candidate with the smallest difference from current acceleration or deceleration of the vehicle M1 as deceleration candidate to be reflected to the target acceleration $a_{M1\_}tgt$ (hereinafter also referred to as "final deceleration"). Then, the planning portion 517 changes the driving state data in the target position based on the final deceleration. The planning portion 517 transmits to the control portion 136 the information on the driving trajectory TP for the lane change, including the information on the driving state.

5.4 Processing Example Executed by ECU

Figure 27:
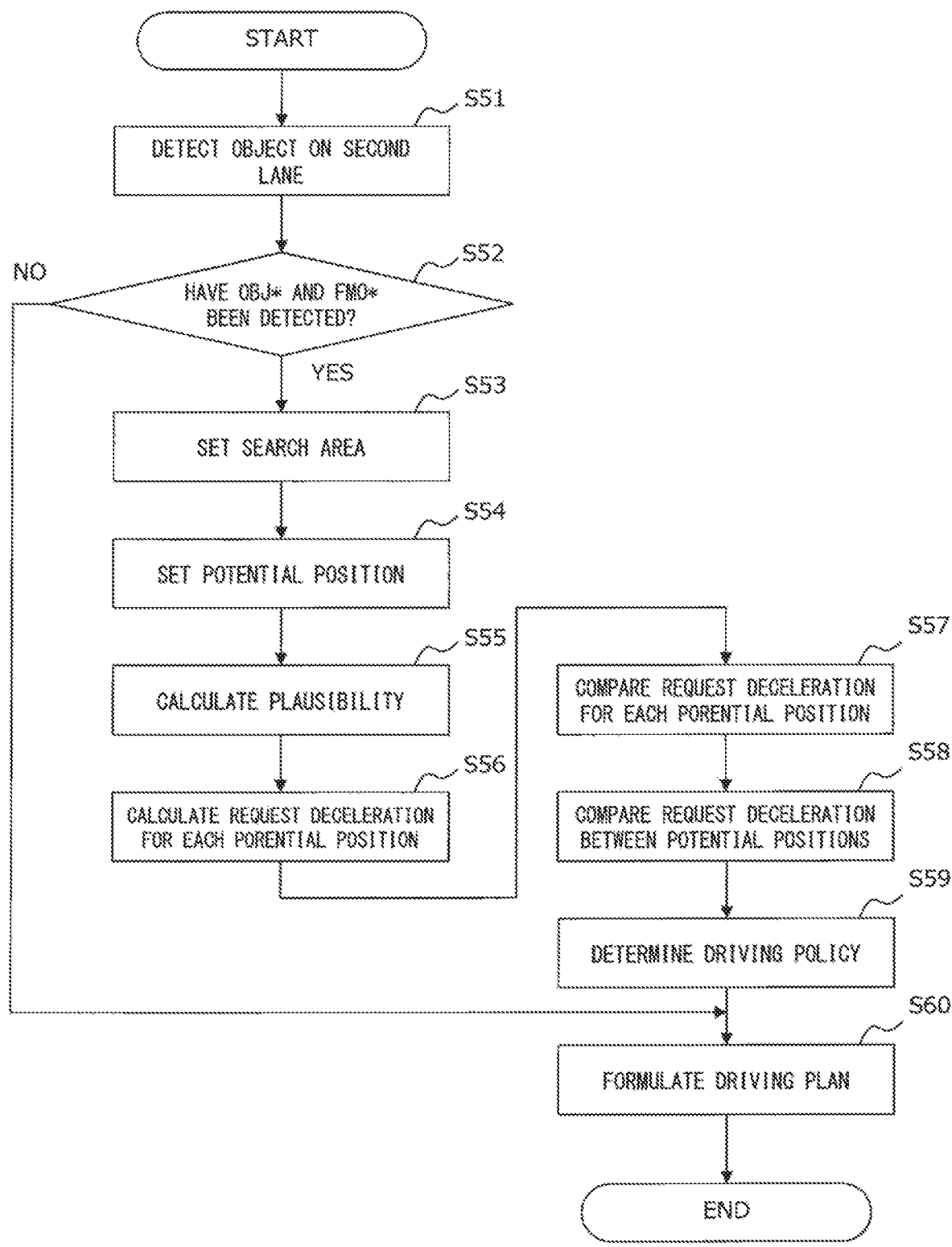
FIG. 27 is a flowchart for illustrating a flow of processing which is executed by the ECU for lane change control in the fifth embodiment.

FIG. 27 is a flow chart for illustrating a flow of processing which is executed by the ECU 51 for the lane change control. The routine shown in FIG. 27 is executed repeatedly when the ECU 51 receives the request for lane change.

In the routine shown in FIG. 27, the ECU 51 first detects the object on the second lane L2 (step S51). The processing of step S51 is the same as that of the step S41 shown in FIG. 22.

Subsequent to the step S51, the ECU 51 determines whether or not a plurality of the slowdown target OBJ* and the following moving body FMO* are detected on the second lane L2 (step S52). Specifically, the ECU 51 determines whether or not the information on the object that was detected in the step S51 includes the information on the states of the at least two slowdown target OBJ* and that on the states of the at least two following moving body FOB*. If the judgement result of the step S52 is negative, the ECU 51 proceeds to the step S60.

If judgement result of the step S52 is positive, the ECU 51 sets the search area (step S53), and sets the potential positions PP in this search area (step S54). Specifically, the ECU 51 sets the potential positions PP between the slowdown target OBJ* and the following moving body FOB* adjacent to the same slowdown target OBJ*.

Subsequent to the step S54, the ECU 51 calculates the first-class plausibility $\eta_\gamma$ and the second-class plausibility $\eta_\delta$ (step S55). The first-class plausibility $\eta_\gamma$ and the second-class plausibility and $\eta_\delta$ are calculated for each potential position PP set in the step S54.

Subsequent to the step S55, the ECU 51 executes the processing of steps from S56 and S58. The processing of the steps from S56 to S58 is executed by executing the processing of the steps from S45 to S47 shown in FIG. 22 for each potential position PP.

In the step S59, the ECU 51 formulates the driving plan. Specifically, the ECU 51 repeatedly sets the driving trajectory TP for the lane change every time preset time elapses. If the driving policy is determined in the step S58, the deceleration candidate (i.e., the final deceleration) having the smallest difference from the current acceleration or deceleration of the vehicle M1 is selected. The ECU 51 also reflect the final deceleration to the target acceleration $a_{M1\_tgt}$ while appropriately referring to the first-class plausibility $\eta_\gamma$ and the second-class plausibility $\eta_\delta$.

What is claimed is:

1. A vehicle control system in which automated driving control of a vehicle is executed, the vehicle control system comprising:
    an acquiring device which is configured to acquire driving environment information of the vehicle; and
    a controller which is configured to execute the automated driving control based on the driving environment information,
    wherein, in the automated driving control, the controller is configured to execute deceleration setting processing in which a target deceleration is set based on first and second deceleration features, wherein:
    the first deceleration feature defines a relationship between a first-class state indicating a state of a slowdown target of the vehicle and deceleration of the vehicle, wherein the first-class state is divided into multiple phases by a first-class boundary; and
    the second deceleration feature defines a relationship between a second-class state indicating a state of the vehicle as viewed from a following moving body and deceleration of the following moving body, wherein the second-class state is divided into multiple phases by a second-class boundary,
    wherein, in the deceleration set processing, the controller is configured to:
    specify, based on the driving environment information and the first deceleration feature, at least one first-class deceleration indicating deceleration of the vehicle corresponding to the first-class state;
    specify a first-class minimum value indicating a minimum value of the at least one first-class deceleration;
    specify, based on the driving environment information and the second deceleration feature, at least one second-class deceleration indicating deceleration of the following moving body corresponding to the second-class state;
    specify a second-class minimum value indicating a minimum value of the at least one second-class deceleration;
    compare the first-class minimum value and the second-class minimum value;
    if the first-class minimum value is equal to or greater than the second-class minimum value, set the target deceleration to the first-class minimum value; and
    if the first-class minimum value is less than the second-class minimum value, set the target deceleration to deceleration equal to or more than the second-class minimum value, based on a second-class minimum value phase indicating a phase to which the second-class minimum value belongs in the second deceleration feature
    wherein, in the deceleration set processing, the controller is configured to:
    if the first-class minimum value is less than the second-class minimum value and the second-class minimum value is located closer to a rapid deceleration side than the second-class boundary deceleration, set the target deceleration to the second-class minimum; and
    if the first-class minimum value is less than the second-class minimum value and the second-class minimum value is located closer to a slow deceleration side than the second-class boundary deceleration, set the target deceleration to deceleration greater than the second-class minimum.

2. The vehicle control system according to claim 1, wherein:
    the automated driving control includes lane change control in which a cruising lane of the vehicle is changed from a first lane to a second lane; and
    the driving environment information includes information on a plurality of objects on the second lane,
    wherein, in the deceleration set processing which is executed during the execution of the lane change control, the controller is configured to:
    set a potential position of the vehicle between the plurality of objects adjacent to each other;
    specify the first-class minimum value by applying the first deceleration feature to a future slowdown target, existing in front of the potential position, among the vehicle of the plurality of objects adjacent to each other; and
    specify the second-class minimum value by applying the second deceleration feature to a future following moving body, existing behind the potential position, among the plurality of objects adjacent to each other.

3. The vehicle control system according to claim 2,
    wherein, in the deceleration set processing, the controller is further configured to:
    set a search area of the potential position;
    if a plurality of the potential positions are set in the search area, calculate a candidate of the target deceleration for each of the plurality of potential positions; and
    set the candidate of the target deceleration that minimizes a difference from current acceleration or deceleration of the vehicle as the target deceleration.

4. A vehicle control system in which automated driving control of a vehicle is executed, the vehicle control system comprising:
    an acquiring device which is configured to acquire driving environment information of the vehicle; and
    a controller which is configured to execute the automated driving control based on the driving environment information,
    wherein, in the automated driving control, the controller is configured to execute deceleration setting processing in which a target deceleration is set based on first and second deceleration features, wherein:
    the first deceleration feature defines a relationship between a first-class state indicating a state of a slowdown target of the vehicle and deceleration of the vehicle, wherein the first-class state is divided into multiple phases by a first-class boundary; and
    the second deceleration feature defines a relationship between a second-class state indicating a state of the vehicle as viewed from a following moving body and deceleration of the following moving body, wherein the second-class state is divided into multiple phases by a second-class boundary, wherein, in the deceleration set processing, the controller is configured to:

specify, based on the driving environment information and the deceleration feature, at least one first-class deceleration indicating deceleration of the vehicle that corresponds to the first-class state;

calculate for each of the at least one first-class deceleration a first-class plausibility indicating an accuracy of information on the first-class state or the accuracy of information associated with the first-class state;

specify a first-class minimum value of the at least one first-class deceleration;

specify, based on the driving environment information and the second deceleration feature, at least one second-class deceleration indicating deceleration of the following moving body corresponding to the second-class state;

calculate, for each second-class deceleration, a second-class plausibility indicating an accuracy of information on the second-class state;

specify a second-class minimum value of the at least one second-class deceleration;

compare the first-class minimum value and the second-class minimum value;

if the first-class minimum value is equal to or greater than the second-class minimum value, the first-class minimum value is reflected in a first-class reflection degree of 0 to 100%, based on a first-class minimum value phase indicating a phase to which the first-class minimum value belongs in the second deceleration feature and the first-class plausibility corresponding to the first-class minimum value; and if the first-class minimum value is less than the second-class minimum value, the second-class minimum value is reflected in a second-class reflection degree of 0 to 100%, based on a second-class minimum value phase indicating a phase to which the second-class minimum value belongs in the second deceleration feature and the second-class plausibility corresponding to the second-class minimum value.

5. The vehicle control system according to claim 4, wherein:

the first-class boundary includes a first-class maximum deceleration, wherein the first-class maximum deceleration indicates a maximum deceleration of the vehicle; and the controller is configured to, in the deceleration set processing:

set the first reflection degree to 100%, if the first-class minimum value is equal to or greater than the second-class minimum value and the first-class minimum value phase is located closer to a rapid deceleration side than the first-class maximum deceleration, regardless of the first-class plausibility corresponding to the first-class minimum value.

6. The vehicle control system according to claim 4, wherein:

the first-class boundary deceleration includes a first-class minimum deceleration, wherein the first-class minimum deceleration indicates minimum deceleration of the vehicle; and the controller is configured to, in the deceleration set processing:

set the first reflection degree to 0%, if the first-class minimum value is equal to or greater than the second-class minimum value and the first-class minimum value phase is located closer to a slow deceleration side than the first-class minimum deceleration, regardless of the first-class plausibility corresponding to the first-class minimum value.

7. The vehicle control system according to claim 4, wherein:

the first-class boundary deceleration includes a first-class maximum deceleration, a first-class minimum deceleration, and a first-class middle deceleration, wherein the first-class maximum deceleration indicates a maximum deceleration of the vehicle, wherein the first-class minimum deceleration indicates minimum deceleration of the vehicle, and wherein the first-class middle deceleration is between the first-class maximum deceleration and the first-class minimum deceleration; and the controller is configured to, in the deceleration set processing:

if the first-class minimum value is equal to or greater than the second-class minimum value and the first-class minimum value phase is located between the first-class maximum deceleration and the first-class middle deceleration, change the first reflection degree according to specified total number of the first-class deceleration, wherein the first reflection degree is set to:

100% if the specified total number is one, and a value between 0 and 100% depending on the first-class plausibility corresponding to the first-class minimum value if the specified total number is two or more.

8. The vehicle control system according to claim 4, wherein:

the first-class boundary deceleration includes a first-class maximum deceleration, a first-class minimum deceleration, and a first-class middle deceleration, wherein the first-class maximum deceleration indicates a maximum deceleration of the vehicle, wherein the first-class minimum deceleration indicates minimum deceleration of the vehicle, and wherein the first-class middle deceleration is between the first-class maximum deceleration and the first-class minimum deceleration; and the controller is configured to, in the deceleration set processing:

if the first-class minimum value is equal to or greater than the second-class minimum value and the first-class minimum value phase is located between the first-class middle deceleration and the first-class minimum deceleration, change the first reflection degree according to a result of comparing the minimum value plausibility corresponding to the first-class minimum value with a first-class threshold, wherein the first reflection degree is set to:

100% if the first-class plausibility corresponding to first-class minimum value is more than the first-class threshold, and 0% if the first-class plausibility corresponding to first-class minimum value is less than the first-class threshold.

9. The vehicle control system according to claim 4, wherein:
the second-class boundary includes a second-class maximum deceleration, wherein the second-class maximum deceleration indicates a maximum deceleration of the following moving body; and
the controller is configured to, in the deceleration set processing:
if the first-class minimum value is less than the second-class minimum value and the second-class minimum value phase is located in a rapid deceleration side than the second-class maximum deceleration, set the second reflection degree to 100%, regardless of the second-class plausibility corresponding to the second-class minimum value.

10. The vehicle control system according to claim 4, wherein:
the second-class boundary includes a second-class minimum deceleration, wherein the second-class minimum deceleration indicates a minimum deceleration of the following moving body; and
the controller is configured to, in the deceleration set processing:
if the first-class minimum value is less than the second-class minimum value and the second-class minimum value phase is located in a slow deceleration side than the second-class minimum deceleration, set the second reflection to 0%, regardless of the second-class plausibility corresponding to the second-class minimum value.

11. The vehicle control system according to claim 4, wherein:
the second-class boundary deceleration includes a second-class maximum deceleration, a second-class minimum deceleration, and a second-class middle deceleration,
wherein the second-class maximum deceleration indicates a maximum deceleration of the following moving body,
wherein the second-class minimum deceleration indicates a minimum deceleration of the following moving body, and
wherein the second-class middle deceleration is between the second-class maximum deceleration and the second-class minimum deceleration; and
the controller is configured to, in the deceleration set processing:
if the first-class minimum value is less than the second-class minimum value and the second-class minimum value phase is located between the second-class maximum deceleration and the second-class middle deceleration, change the second reflection degree according to specified total number of the second-class deceleration,
wherein the second reflection degree is set to:
100% if the specified total number is one, and
a value between 0 and 100% according to the second-class plausibility corresponding to the second-class minimum value 0% if the specified total number is two or more.

12. The vehicle control system according to claim 4, wherein:
the second-class boundary deceleration includes a second-class maximum deceleration, a second-class minimum deceleration, and a second-class middle deceleration,
wherein the second-class maximum deceleration indicates a maximum deceleration of the following moving body,
wherein the second-class minimum deceleration indicates a minimum deceleration of the following moving body, and
wherein the second-class middle deceleration is between the second-class maximum deceleration and the second-class minimum deceleration; and
the controller is configured to, in the deceleration set processing:
if the first-class minimum value is less than the second-class minimum value and the second-class minimum value phase is located between the second-class middle deceleration and the second-class minimum deceleration, change the second reflection degree according to a result of comparing the second-class plausibility corresponding to the second-class minimum value with a second-class threshold,
wherein the second reflection degree is set to:
100% if the second-class plausibility corresponding to the second-class minimum value is equal to or more than the second-class threshold, and
0% if the second-class plausibility corresponding to second-class minimum value is less than the second-class threshold.

13. The vehicle control system according to claim 4, wherein:
the slowdown target is a nearest moving or static obstacle of the vehicle on a driving trajectory of the vehicle;
the following moving body is a moving body present behind the vehicle;
the driving environment information includes a first-class distance indicating a distance from the moving or static obstacle to the vehicle, a second-class distance indicating a distance from the following moving body to the vehicle, first-class relative speed indicating relative speed of the moving or static obstacle, and second-class relative speed indicating relative speed of the following moving body;
the first-class state is the first-class distance and the first-class relative speed;
the second-class state is the second-class distance and the second-class relative speed;
the first-class plausibility is an accuracy of the first-class distance and the first-class relative speed; and
the second-class plausibility is an accuracy of the second-class distance and the second-class relative speed.

14. The vehicle control system according to claim 4, wherein:
the slowdown target is a nearest traffic signal of the vehicle on a driving trajectory of the vehicle;
the following moving body is a moving body present behind the vehicle;
the driving environment information includes a first-class distance indicating a distance from the traffic light to the vehicle, a second-class distance indicating a distance from the following moving body to the vehicle, first-class relative speed indicating relative speed of the traffic light, and second-class relative speed indicating relative speed of the following moving body;
the first-class state is the first-class distance and the first-class relative speed;
the second-class state is the second-class distance and the second-class relative speed;

the first-class plausibility is an accuracy where lighting color of traffic light is red or yellow, associated with the first-class distance and the first-class relative speed; and
the second-class plausibility is an accuracy of the second-class distance and the second-class relative speed.

* * * * *